(12) United States Patent
Aubery et al.

(10) Patent No.: US 8,032,423 B2
(45) Date of Patent: Oct. 4, 2011

(54) ONLINE RETAIL STORE FEATURING A GOLF BAG CUSTOMIZATION ENGINE TO CUSTOMIZE GOLF BAGS AND GOLF BAG ASSEMBLY KITS

(75) Inventors: Jeffrey Aubery, Santa Barbara, CA (US); Richard Wood, Santa Barbara, CA (US)

(73) Assignee: Golf Sales West, Inc., Oxnard, CA (US)

( * ) Notice: Subject to any disclaimer, the term of this patent is extended or adjusted under 35 U.S.C. 154(b) by 0 days.

(21) Appl. No.: 12/818,149

(22) Filed: Jun. 18, 2010

(65) Prior Publication Data
US 2011/0078039 A1   Mar. 31, 2011

Related U.S. Application Data

(63) Continuation of application No. 12/818,147, filed on Jun. 17, 2010.

(60) Provisional application No. 61/246,635, filed on Sep. 29, 2009, provisional application No. 61/291,341, filed on Dec. 30, 2009, provisional application No. 61/187,672, filed on Jun. 17, 2009.

(51) Int. Cl.
*G06Q 30/00* (2006.01)
(52) U.S. Cl. ...................................... 705/26.5
(58) Field of Classification Search ............ 705/26, 705/27, 26.1, 26.5
See application file for complete search history.

(56) References Cited

U.S. PATENT DOCUMENTS

| | | | |
|---|---|---|---|
| 2,751,955 | A | 6/1956 | Nahon |
| 4,709,814 | A | 12/1987 | Antonious |
| 4,753,344 | A | 6/1988 | Antonious |
| 4,796,752 | A | 1/1989 | Reimers |
| 5,048,777 | A | 9/1991 | Quellais |

(Continued)

FOREIGN PATENT DOCUMENTS

GB    2402625 A   * 12/2004

OTHER PUBLICATIONS

Author unknown, "Golf: Top Gear: Bag Covers Storm Master Pro; Doc rates best golf kit . . . then lets you win it," Daily Record. Glasgow (UK), Oct. 6, 2004, p. 6.*

(Continued)

*Primary Examiner* — Jeffrey A Smith
*Assistant Examiner* — Brandy A Zukanovich
(74) *Attorney, Agent, or Firm* — Julio M. Loz; Loza & Loza, LLP

(57) ABSTRACT

In one embodiment, a method effectuated over an online ordering system for customized golf bags, comprising: prompting a consumer with one or more options for one or more components of the golf bag that are customizable through an online website; receiving selections made by the consumer for the one or more options for the one or more components through the online website; packaging the selected one or more components of the golf bag as a kit; and distributing the consumer to the consumer for final assembly of the golf bag. In one embodiment, a final assembly of the golf bag by the consumer is substantially completed using manual and tool-less techniques. The options for the one or more components comprises at least one of: a color of a golf bag body, a color of a cuff, a color of a collar, a color of a top portion.

18 Claims, 51 Drawing Sheets

U.S. PATENT DOCUMENTS

| | | |
|---|---|---|
| 5,096,148 A | 3/1992 | Quellais et al. |
| 5,147,089 A | 9/1992 | Anderson |
| 5,178,273 A | 1/1993 | Igarashi |
| 5,209,350 A | 5/1993 | Maeng |
| 5,339,951 A | 8/1994 | Chen |
| 5,356,003 A | 10/1994 | Gretz et al. |
| 5,361,899 A | 11/1994 | Reimers |
| 5,407,155 A | 4/1995 | Chung |
| 5,445,267 A | 8/1995 | Biafore, Jr. |
| 5,458,240 A | 10/1995 | Rich |
| 5,482,160 A | 1/1996 | Perrin |
| 5,518,113 A | 5/1996 | Boone |
| 5,528,813 A | 6/1996 | Biafore, Jr. |
| 5,573,112 A | 11/1996 | Kim |
| 5,632,496 A * | 5/1997 | Nelson ............... 280/30 |
| 5,638,954 A | 6/1997 | Hsien |
| 5,769,219 A | 6/1998 | Shimel |
| 5,785,173 A | 7/1998 | Kim |
| 5,806,675 A | 9/1998 | Kim |
| 5,845,773 A | 12/1998 | Kim |
| 5,857,567 A | 1/1999 | Cheng |
| 5,911,322 A | 6/1999 | Lombardo et al. |
| 5,918,737 A | 7/1999 | Young-Joon Kwong |
| 5,941,383 A | 8/1999 | Cheng |
| 5,996,789 A | 12/1999 | Suggs et al. |
| 6,010,101 A | 1/2000 | Stein et al. |
| 6,036,009 A | 3/2000 | Kim |
| 6,062,383 A | 5/2000 | Han |
| 6,076,245 A | 6/2000 | Sutter |
| 6,115,872 A | 9/2000 | Welsh |
| 6,220,433 B1 | 4/2001 | Kang |
| 6,227,503 B1 | 5/2001 | Chen |
| 6,386,362 B1 | 5/2002 | Cheng |
| 6,390,295 B2 | 5/2002 | Rhee |
| 6,435,345 B1 | 8/2002 | Wang |
| 6,510,944 B2 | 1/2003 | Chang |
| 6,568,527 B1 | 5/2003 | Te-Pin |
| 6,598,744 B2 | 7/2003 | Chen |
| 6,634,497 B1 | 10/2003 | Chang |
| 6,712,206 B2 | 3/2004 | Chen |
| 6,817,469 B2 | 11/2004 | Chang |
| 6,935,496 B2 | 8/2005 | Chang |
| 6,938,762 B2 | 9/2005 | Cheng |
| 6,985,876 B1 * | 1/2006 | Lee ............... 705/27 |
| 7,107,235 B2 | 9/2006 | Lyden |
| 7,152,524 B2 | 12/2006 | Davidson |
| 7,328,177 B1 | 2/2008 | Lin-Hendel |
| 7,350,460 B2 | 4/2008 | Davidson |
| 7,577,583 B2 | 8/2009 | Litke et al. |
| 2001/0025802 A1 * | 10/2001 | Sutter et al. ............... 206/315.3 |
| 2002/0147732 A1 * | 10/2002 | Lee et al. ............... 707/200 |
| 2003/0056866 A1 | 3/2003 | Sheppard, Jr. |
| 2003/0089629 A1 | 5/2003 | Tan |
| 2004/0026280 A1 | 2/2004 | Herold |
| 2004/0211688 A1 | 10/2004 | Doss |
| 2005/0040059 A1 * | 2/2005 | Herold ............... 206/315.3 |
| 2005/0061692 A1 | 3/2005 | Chen |
| 2005/0072695 A1 | 4/2005 | Shaanan |
| 2005/0187817 A1 | 8/2005 | Hall et al. |
| 2006/0006082 A1 | 1/2006 | Fair et al. |
| 2006/0006083 A1 | 1/2006 | Fair et al. |
| 2006/0006084 A1 | 1/2006 | Burgess et al. |
| 2006/0108243 A1 | 5/2006 | Tan |
| 2006/0108244 A1 | 5/2006 | Tan |
| 2006/0163093 A1 | 7/2006 | Kronenberger |
| 2006/0201832 A1 | 9/2006 | Tan |
| 2007/0043582 A1 | 2/2007 | Peveto et al. |
| 2009/0057180 A1 | 3/2009 | Smeltzer |
| 2009/0261004 A1 | 10/2009 | Davidson |
| 2009/0307109 A1 | 12/2009 | Litke et al. |
| 2009/0308768 A1 | 12/2009 | Quartarone |

OTHER PUBLICATIONS

Timothy Boone. Advocate. Baton Rouge, La.: Dec. 19, 2004. p. 1.I (http://proquest.umi.com/pqdweb?did=768736641&sid=3&Fmt=3&cli entId=19649&RQT=309& VName=PQD).

Jeff Walsh. InfoWorld. San Mateo: Jun 28, 1999. vol. 21, Iss. 26; p. 46, 1 pgs (http://proquest.umi.com/pqdweb?did=42664894&sid=3&Fmt=3&clie ntId=19649&RQT=309& VName=PQD).

* cited by examiner

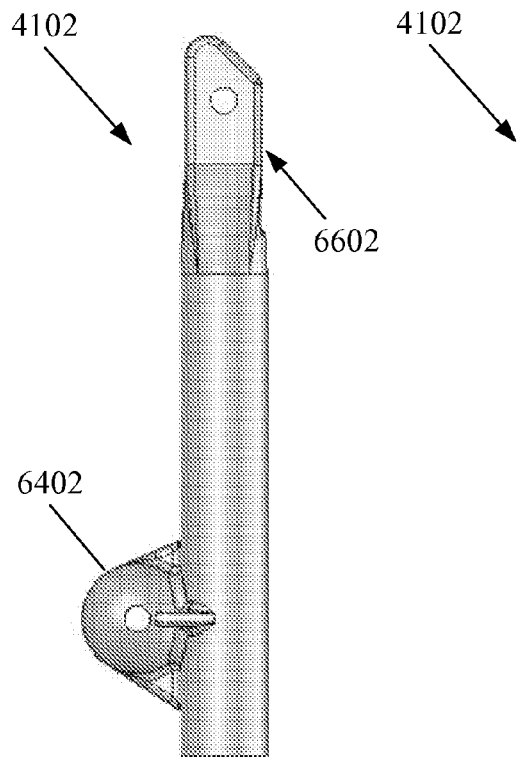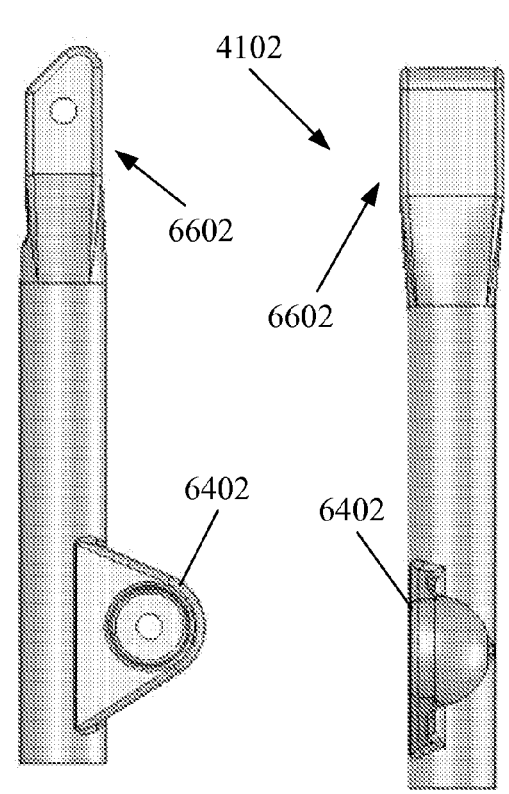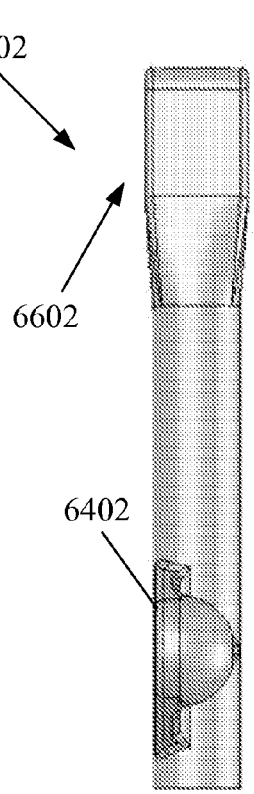
FIG. 68  FIG. 69  FIG. 70
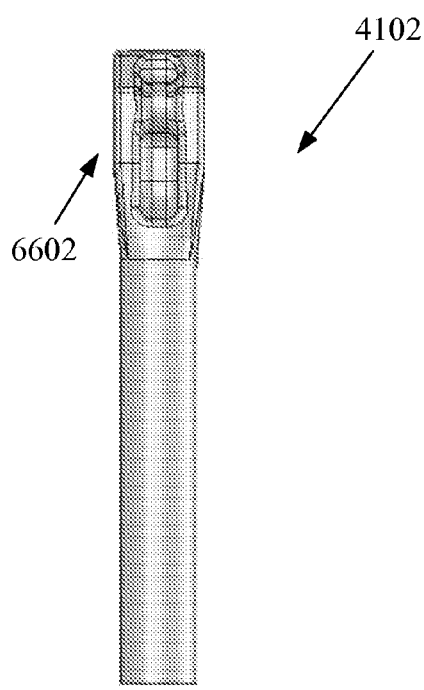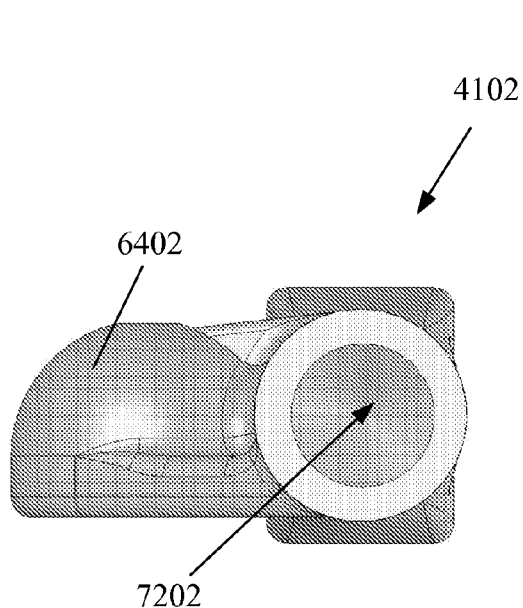
FIG. 71  FIG. 72

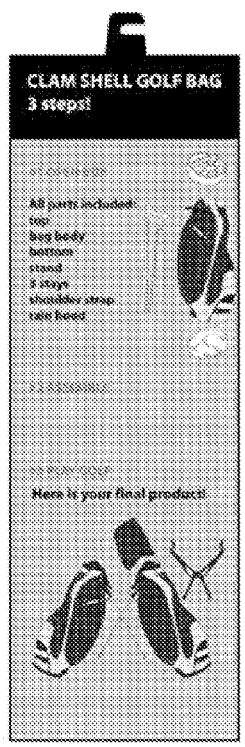
FIG. 73
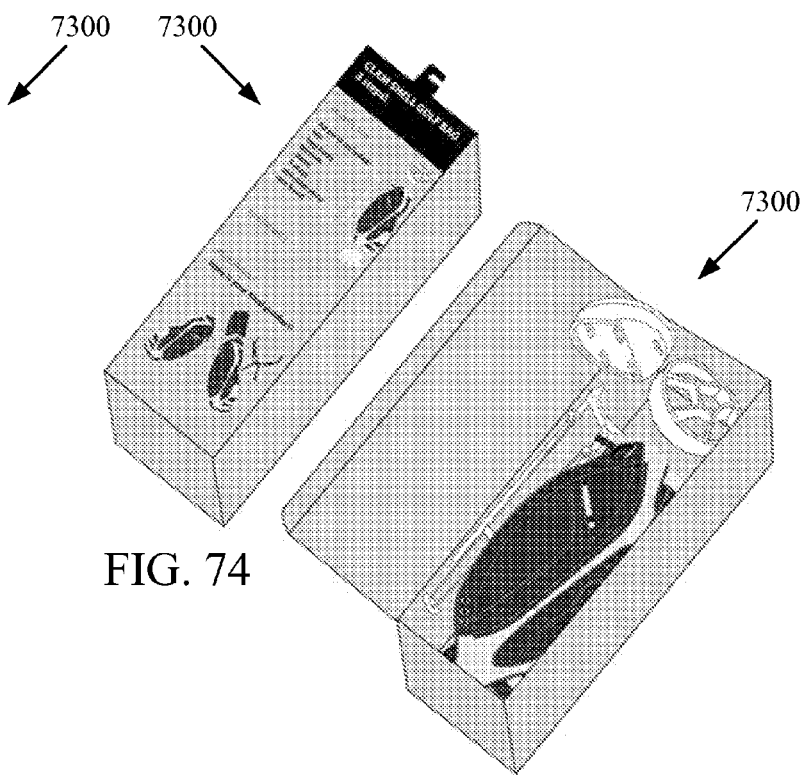
FIG. 74
FIG. 75

ONLINE RETAIL STORE FEATURING A GOLF BAG CUSTOMIZATION ENGINE TO CUSTOMIZE GOLF BAGS AND GOLF BAG ASSEMBLY KITS

CLAIM OF PRIORITY UNDER 35 U.S.C. §119

The present application for patent is a continuation application of, and claims priority to, Non-Provisional application Ser. No. 12/818,147 entitled "Modular Golf Bag Kickstand" filed Jun. 17, 2010, and also claims priority to Provisional Application No. 61/187,672 entitled "Golf Bag Kit" filed Jun. 17, 2009, Provisional Application No. 61/246,635 entitled "Golf Bag and Method of Assembly Thereof" filed Sep. 29, 2009, and Provisional Application No. 61/291,341 entitled "Golf Bag Construction and Delivery" filed Dec. 30, 2009, the entire disclosures of which are hereby expressly incorporated by reference herein.

FIELD

Generally, the present application relates to golf bags. Specifically, the application relates to modular golf bag assemblies, golf bag stands, golf bag kits, and methods of delivery, ordering, and/or assembly thereof.

BACKGROUND

Golf bags have been in widespread use as standard equipment for golf for many years. Golf bags typically have a tubular construction with a closed bottom and have a carrying strap of sling attached between an upper and a lower portion of the bag. The bag is open at the top for receiving one or more golf clubs. Conventional golf bags are constructed of an outer skin or shell which is reinforced with a supporting inner structure so that the golf bag is self-supporting and can be stood up in an upright position with or without benefit of external support. This type of golf bag is generally a bulky item, about three feet high and available in various diameters, such as nine or twelve inches. Due to the volume it occupies, an article of this size is costly to stock in inventory and to ship in commerce. In fact, the cost of transportation of golf bags represents a substantial fraction of the ultimate retail price of the article. Additionally, golf bags are typically manufactured in volume which makes it inconvenient to customize each golf bag for a particular user. Moreover, reducing the labor and/or time involved in the construction of a golf bag would also be beneficial in reducing overall costs.

Consequently, a golf bag which alleviates problems associated with conventional golf bags is needed.

SUMMARY

In one embodiment, a golf bag assembly is disclosed, comprising: a golf bag body having a top opening and a bottom opening; a collar coupled along an inner surface of the golf bag body adjacent to the top opening, the collar having a plurality of pole receiving collar ends; a cuff coupled along an inner surface of the golf bag body adjacent to the bottom opening; a base member having a plurality of pole receiving base ends, the base member removeably coupled to the cuff; a top support removeably coupled to the collar; and a plurality of connecting poles that extend between the plurality of pole receiving base ends of the base member and the plurality of pole receiving collar ends of the collar thereby retaining the base member against the cuff and providing structural support to the golf bag body. The collar and the cuff of the golf bag assembly may be both flexible. In yet another embodiment, the golf bag assembly's collar and cuff are fixedly attached to the golf bag body. In yet another embodiment, the golf bag body, the cuff, and the collar are adapted to be substantially flattened for shipping. In other embodiments, the base member includes a flat support surface and an angled support surface that is angled relative to the flat support surface, wherein the flat support surface supports the golf bag assembly when the golf bag assembly is positioned in a substantially upright position, and the angled support surface supports the golf bag assembly when positioned at an angled position. The base member may include an outer perimeter lip that abuts against and engages an upper cuff perimeter rim of the cuff to restrict movement of the base member. In other embodiments, the top support includes an outer perimeter lip that abuts against an upper collar perimeter rim of the collar. In other embodiments, the top support includes a plurality of clasps that engage with a lower collar perimeter portion of the collar to restrict movement of the top support. The golf bag assembly's base member may include one or more anti-rotation tabs that engage with one or more corresponding anti-rotation notches of the cuff to prevent rotational movement of the base member relative to the cuff. In yet other embodiments, the base member includes one or more fitting ridges that engage with one or more fitting grooves of the cuff to stabilize the base member relative to the cuff. In yet other embodiments, the top support includes a divider configured to separate a plurality of golf clubs into different sections. According to another feature, the golf bag assembly may further comprise a stand assembly configured to support the golf bag assembly at an angle relative to a support surface. In one embodiment, the stand assembly comprises: at least one stand leg for supporting the golf bag assembly at an angle; and an actuating mechanism coupled to the stand leg, the actuating mechanism causing to deploy the stand leg when the golf bag assembly is positioned at an angle, wherein the actuating mechanism includes separable modular pieces that are removeably coupled to each other along a length of the actuating mechanism. In another embodiment, the actuating mechanism may comprise: an elongated actuating member including a lever actuator, a stand leg actuating rod, and an actuator connector that couples a first end of the lever actuator to a first end of the stand leg actuating rod.

In yet another embodiment, a collapsible golf bag is disclosed that comprises: a collapsible golf bag body having a top portion and a bottom portion; a collar fixedly coupled along an inner surface of the top portion of the golf bag body, the collar having a plurality of pole receiving collar ends; a base member adapted to removeably couple to the bottom portion of the golf bag body, the base member having a plurality of pole receiving base ends; and a plurality of connecting poles that extend between the plurality of pole receiving base ends of the base member and the plurality of pole receiving collar ends of the collar, the connecting poles providing an extension force in an outward direction between the collar and the base member to provide structural rigidity to the golf bag body. In one embodiment, the collapsible golf bag may further comprise: a top support configured to removeably couple to the collar, the top support providing structural rigidity to the top portion of the golf bag body; and a cuff fixedly coupled along an inner surface of the bottom portion of the golf bag body, wherein the base member is configured to removeably couple to the cuff, and the base member provides structural rigidity to the bottom portion of the golf bag body. The cuff and the collar may be flexible. The top support may include a divider that comprises a plurality of sectional separators that allow separating golf clubs. The golf bag body, the cuff, and the collar may be adapted to be substantially flattened for shipping. In yet other embodiments, the base member includes an outer perimeter lip that abuts against and engages an upper cuff perimeter rim of the cuff to restrict movement of the base member, the top support includes an outer perimeter lip that abuts against an upper collar perimeter rim of the collar, and the top support includes a plurality of clasps that engage with a lower collar perimeter portion of the collar to restrict movement of the top support. In yet another embodiment, the base member may include one or more anti-rotation tabs that engage with one or more ant-rotation notches of the cuff to prevent rotational movement of the base member relative to the cuff, and the base member includes one or more fitting ridges that engage with one or more fitting grooves of the cuff to stabilize the base member relative to the cuff.

In one embodiment, a kit for assembling a golf bag is disclosed, the kit comprising: a collapsible golf bag body having a top portion and a bottom portion; a collar fixedly coupled along an inner surface of the top portion of the golf bag body, the collar having a plurality of pole receiving collar ends; a base member adapted to removeably couple to the bottom portion of the golf bag body, the base member having a plurality of pole receiving base ends; and a plurality of connecting poles that extend between the plurality of pole receiving base ends of the base member and the plurality of pole receiving collar ends of the collar, the connecting poles providing an extension force in an outward direction between the collar and the base member to provide structural rigidity to the golf bag body. In other embodiment, the kit may further comprise: a top support configured to removeably couple to the collar, the top support providing structural rigidity to the top portion of the golf bag body; and a cuff fixedly coupled along an inner surface of the bottom portion of the golf bag body, wherein the base member is configured to removeably couple to the cuff, and the base member provides structural rigidity to the bottom portion of the golf bag body. In other embodiments, the cuff and the collar are flexible.

In other embodiments, the top support of the kit includes a divider that comprises a plurality of sectional separators that allow separating golf clubs. In another embodiment, the golf bag body, the cuff, and the collar are adapted to be substantially flattened for shipping. In yet another embodiment of the kit, the base member includes an outer perimeter lip that abuts against and engages an upper cuff perimeter rim of the cuff to restrict movement of the base member, the top support includes an outer perimeter lip that abuts against an upper collar perimeter rim of the collar, and the top support includes a plurality of clasps that engage with a lower collar perimeter portion of the collar to restrict movement of the top support. In yet another embodiment of the kit, the base member includes one or more anti-rotation tabs that engage with one or more ant-rotation notches of the cuff to prevent rotational movement of the base member relative to the cuff, and the base member includes one or more fitting ridges that engage with one or more fitting grooves of the cuff to stabilize the base member relative to the cuff. In yet another embodiment of the kit, the golf bag body, the top support, the base member, and the connecting poles are packaged within a clamshell package.

Also disclosed herein is a method of assembling a golf bag, the method comprising: receiving a golf bag body having a flexible collar fixedly attached to a top portion of the golf bag body, and a flexible cuff attached to a bottom portion of the golf bag body, the golf bag body adapted to be compressed to occupy less volume during shipping; inserting a base member into the golf bag body to removeably couple the base member to the cuff, the base member providing rigidity to the bottom portion of the golf bag body; inserting a plurality of connecting poles into the golf bag body, the connecting poles each having a top end and a bottom end; removeably coupling each bottom end of the plurality of connecting poles to a corresponding pole receiving base end of the base member; removeably coupling each top end of the plurality of connecting poles to a corresponding pole receiving collar end of the collar by temporarily bending the connecting poles to secure the top end of each of the plurality of connecting poles; and removeably coupling a top support to the collar, the top support providing rigidity to the top portion of the golf bag body. In one embodiment of the method, the connecting poles provide an extension force to push the collar and base member outward in opposite directions to provide the golf bag body with structural support. In another embodiment of the method, the method comprises the step of removeably coupling a stand assembly to the top portion of the golf bag body.

In yet another exemplary embodiment, a kickstand assembly for a golf bag is disclosed, the kickstand assembly comprising: at least one stand leg for supporting the golf bag at an angle; an actuating mechanism coupled to the stand leg, the actuating mechanism causing to deploy the stand leg when the golf bag is positioned at an angle, wherein the actuating mechanism includes separable modular pieces that are removeably coupled to each other along a length of the actuating mechanism. The actuating mechanism of the kickstand assembly may also comprise: an elongated actuating member including a lever actuator, a stand leg actuating rod, and an actuator connector that couples a first end of the lever actuator to a first end of the stand leg actuating rod. In one embodiment, the actuator connector comprises: a first portion of the actuator connector coupled to the lever actuator; and a second portion of the actuator connector coupled to the stand leg actuating rod, wherein a detachable fastening mechanism couples the first portion of the actuator connector to the second portion of the actuator connector. In another embodiment of the kickstand assembly, the lever actuator, the first portion of the actuator connector, the second portion of the actuator connector, and the stand leg actuating rod couple together substantially using snap-on fastening techniques. The first portion of the actuator connector may be configured to open about a hinge to receive the lever actuator, and the second portion of the actuator connector is configured to open about another hinge to receive the stand leg actuating rod. In yet another embodiment the kickstand assembly may further comprise: at least one stand leg receiver having a first end and an opposite second end, wherein the first end of the stand leg receiver couples to a leg bracket hinge of a leg bracket, and the opposite second end of the stand leg receiver couples to the stand leg. In yet another embodiment, the kickstand assembly may further comprise: a bendable kickstand lever having an anchor that is coupled at one end to an elongated actuating member, the bendable kickstand lever also coupled to a base member of the golf bag at an opposite end of bendable kickstand lever, wherein response to positioning the golf bag at an angle relative to the bendable kickstand lever, the bendable kickstand lever is configured to, bend thereby allowing an angled support surface of the base member to approach the bendable kickstand lever; and push on the elongated actuating member to deploy the stand leg in an outward direction away from the golf bag to support the golf bag. The length of the actuating mechanism may be parallel to a longitudinal direction of the golf bag. In yet another embodiment, the kickstand assembly may further comprise: a base member pedestal having a diameter larger than a base member of the golf bag and configured to couple to an underside portion of the base member of the golf bag and allow the golf bag to pivot at an angle within the base member pedestal, one end of an elongated actuating member coupled to an anchor of the base member pedestal, wherein pivoting the golf bag at an angle relative to the anchor within the base member pedestal causes an opposite second end of the elongated actuating member to automatically deploy the stand leg in an outward direction away from the golf bag body.

In yet another embodiment, a kickstand assembly for a golf bag is disclosed, the kickstand assembly comprising: at least one stand leg for supporting the golf bag at an angle; and a base member pedestal that couples to a base member of the golf bag and allows the golf bag to pivot at an angle with respect to the base member pedestal, the base member pedestal having a perimeter with a diameter larger than the golf bag and an anchor positioned along the perimeter configured to couple to an actuating mechanism that automatically deploys the stand leg when the golf bag pivots at an angle with respect to the base member pedestal. In another embodiment, the actuating mechanism may comprise: a lever actuator having a first end and a second end, the first end of the lever actuator coupled to the anchor of the base member pedestal, and the second end of the lever actuator coupled to a first portion of an actuator connector; and a stand leg actuating rod having a first end and a second end, the first end of the stand leg actuating rod coupled to a second portion of the actuator connector. In another embodiment, the kickstand assembly may comprise: at least one stand leg receiver having a first end and an opposite second end, wherein the first end of the stand leg receiver couples to a leg bracket hinge of a leg bracket, and the opposite second end of the stand leg receiver couples to the stand leg. In yet another embodiment, a detachable fastening mechanism couples the second portion of the actuator connector to the first portion of the actuator connector. In yet another embodiment, one or more pins located on an underside of the base member of the golf bag pivotably couple to at least one pin receiver located on the base member pedestal. In yet another embodiment, the lever actuator, the first portion of the actuator connector, the second portion of the actuator connector, the stand leg actuating rod, the base member pedestal, and the stand leg are configured to couple substantially using snap-on fastening techniques. In yet another embodiment, the first portion of the actuator connector is configured to open about a hinge to receive the lever actuator, and the second portion of the actuator connector is configured to open about another hinge to receive the stand leg actuating rod.

In another embodiment, a modular golf bag stand is disclosed, comprising: at least one stand leg; a first section having a lever actuator, the lever actuator having a first end and a second end; a second section having a stand leg actuating rod, the stand leg actuating rod each having a first end and a second end; and an actuator connector removeably couples the first section to the second section, and the second section is coupled to the at least one stand leg. In one embodiment, the first end of the lever actuator removeably couples to a first portion of the actuator connector, and the first end of the stand leg actuating rod couples to a second portion of the actuator connector. In another embodiment, the modular stand may further comprise: a leg bracket having at least one hinge; and at least one stand leg receiver, the stand leg receiver having a first end and a hollow second end, the first end of the stand leg receiver configured to couple to the hinge of the leg bracket and the hollow second end of the stand leg receiver configured to couple to the stand leg, wherein the second end stand leg actuating rod removeably couples to a connector portion of the stand leg receiver. In another embodiment, the second end of the lever actuator couples to an actuator device that causes the stand leg to deploy when the golf bag is tilted.

BRIEF DESCRIPTION OF THE FIGURES

FIGS. 42 and 43 illustrate how the leg bracket tabs of the top support slide through the leg bracket tab receivers to lock the leg bracket in place.

FIGS. 66-72 illustrate various views of one embodiment of the stand leg receivers.

FIGS. 73-75 illustrate a golf bag kit and associated packaging that allows a user to assemble a golf bag using components included within the kit.

DETAILED DESCRIPTION

Figure 1A:
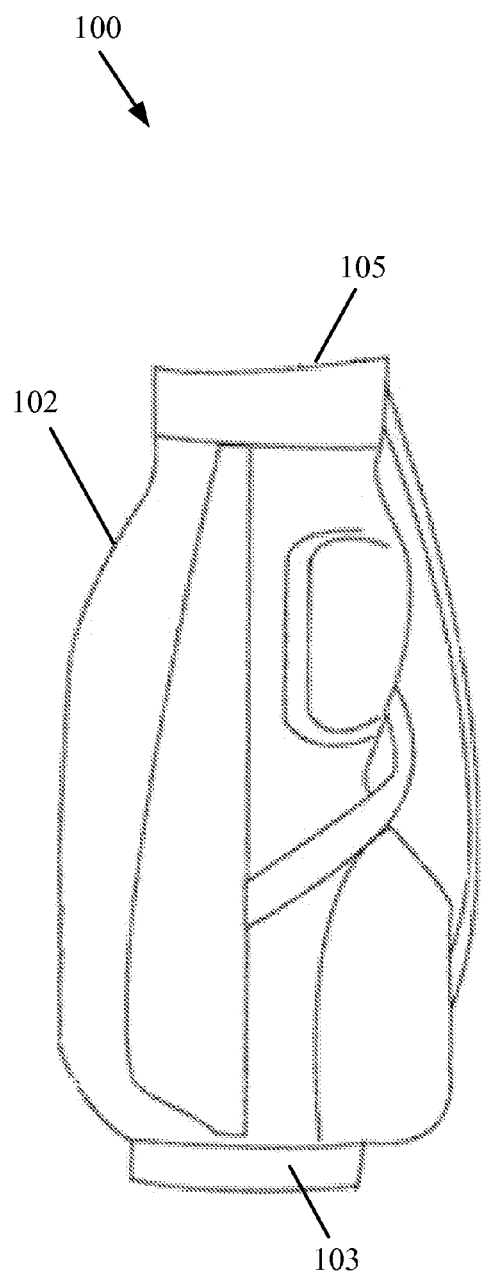
FIGS. 1A and 1B illustrate one embodiment of a novel golf bag assembly used to assemble a golf bag.

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

Overview

Various embodiments of the invention are directed to a modular golf bag assembly that facilitates ease of manufacturing, customization, and/or final assembly of such golf bag. The modular golf bag assembly allows assemblying the golf bag components with minimal labor, minimal use of machines/tools, and/or in a tool-less manner.

In one example, a golf bag includes an outer shell or body that has a top inner retainer ring, also known as a collar, attached to the inside of a top opening of the golf bag. The golf bag shell or body also has a bottom inner retainer ring, also known as a cuff, attached to the inside of a bottom opening of the golf bag. The cuff and collar may be flexible so that the golf bag can be flattened during shipment. To fully assemble the golf bag, a base member may be inserted at the bottom opening and is kept from falling out of place by the cuff. Similarly, a top support is inserted at the top opening and is kept from falling out of place by the collar. Both the top support and the base member may be kept in place without any fasteners. Instead, in one embodiment the top support may be secured (at least temporarily or partially) to the collar by a plurality of clasps. Moreover, a plurality of connecting poles are extended in tension between the collar and the base member, thereby providing structure to the golf bag and keeping the golf bag body from folding in on itself or otherwise collapsing. By extending between the collar and base member, the connecting poles maintain the base member engaged to the cuff.

According to one feature, the golf bag may be partially assembled and shipped in a substantially flattened state and subsequently finished or assembled with minimal labor and/or time resources. For instance, the cuff and collar may be attached (e.g., glued, sewn, riveted, etc.) to the golf bag body, and then the partial assembly (e.g., golf bag body with cuff and collar) may be flattened and/or folded for packaging and/or shipping.

According to another feature, the golf bag assembly may be completed by a receiver. That is the partial assembly may be unfolded, the base member and top support may then be manually inserted and engaged to the cuff and collar, respectively. The one or more poles may then be manually inserted within the golf bag body and coupled to receiving points at the base member and collar. In order to have some tension between the base member and collar, the one or more poles may be manually bent or flexed as they are inserted and/or attached between the base member and collar.

According to yet another feature, the modular golf bag assembly may be sold as an unassembled kit for final assembly by an end-consumer. For example, the partial assembly (e.g., golf bag body with cuff and collar) may be shipped in a box with the separate base member, collar, poles, and/or a golf bag stand. The end-consumer may then manually assemble (without the need for any tools) the golf bag for use.

According to yet another feature, a modular and/or collapsible golf bag stand is provided. The golf bag stand may be attachable to a golf bag to permit supporting the golf bag at an angled orientation (e.g., as when the golf bag is tilted). The golf bag stand may have an actuating mechanism that causes one or more stand legs to automatically deploy away from the golf bag when the golf bag is angled or tilted.

According to yet another feature, an online ordering system is provided that permits a consumer to customize a golf bag by selecting from predefined colors, shapes, and/or sizes of golf bag components. Using a modular golf bag assembly, the online ordering system permits a consumer to select from components of various colors, shapes, and/or sizes. Once the consumer selects the components for the golf bag, these components may be shipped unassembled or only partially assembled to the consumer, who can assemble the golf bag as described herein. Alternatively, the golf bag may be assembled, from the modular components, prior to shipment to the consumer.

Modular Golf Bag Components

Figure 1B:
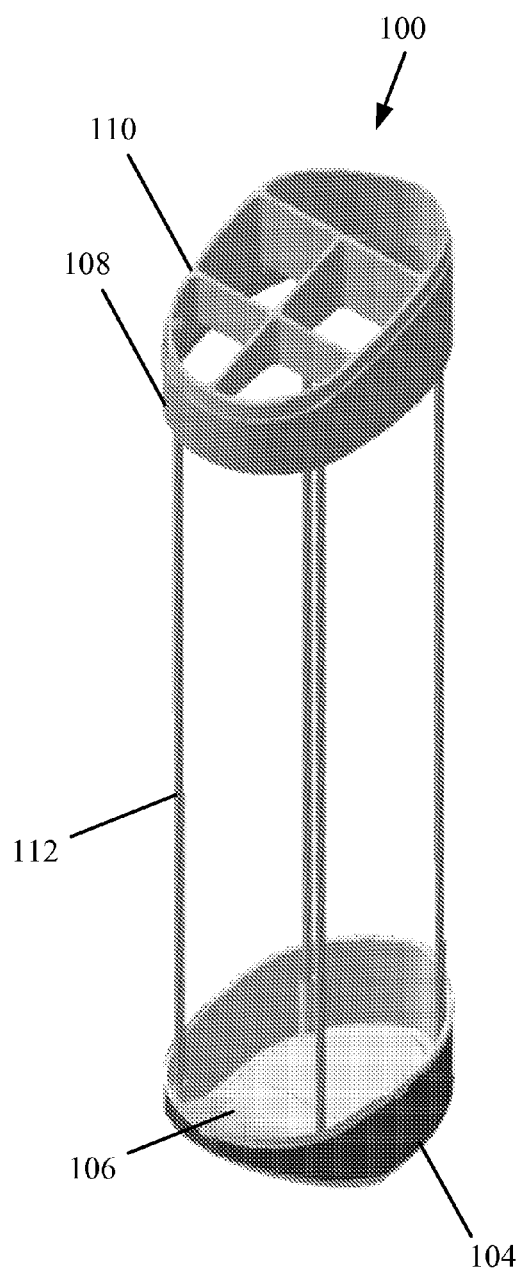

FIGS. 1A and 1B illustrate one embodiment of a novel golf bag assembly 100 used to assemble a modular golf bag. FIG. 1A illustrates an external view of the golf bag assembly 100 while FIG. 1B illustrates a view of internal (e.g., structural components) of the golf bag assembly 100. For example, the golf bag assembly 100 may include a golf bag body 102 (e.g., outer skin or body of the golf bag), a cuff 104, a base member 106, a collar 108, a top support 110, and a plurality of connecting poles 112 (e.g., rods, stays, elongated supporting members, vertical supports, etc.). The golf bag body 102 may be an elongated body having an approximately cylindrical or circular cross-section, and is designed to hold a plurality of golf clubs, golf ball, and/or other golf accessories. In various examples, the golf bag body 102 may include or be made from various materials such as leather, reinforced nylon, fabric, plastic, or any other suitable material or composite known by one of ordinary skill in the art. The golf bag body 102 may include a plurality of pockets thereon for storing, e.g., a rain hood (permanently attached or removable), a strap, golf supplies, etc.

Generally, the golf bag body 102 may have a bottom portion or first end 103 capable of coupling to the cuff 104 and base member 106. The golf bag body 102 may also have a top portion or second end 105 capable of coupling to the collar 108 and top support 110. In one configuration, the cuff 104 may be fixedly attached or coupled (e.g., glued, sewn, riveted, etc.) to the internal surface of the bottom portion or first end 103 of the golf bag body 102. Similarly, the collar 108 may be fixedly attached or coupled (e.g., glued, sewn, riveted, etc.) to the internal surface of the top portion or second end 105 of the golf bag body 102. Subsequently, the top support 110 engages with the collar 108 while the base member 106 engages with the cuff 104. The top support 110 and collar 108 subassembly connects to the base member 106 and cuff 104 subassembly via the plurality of connecting poles 112 to support the golf bag body 102.

Figure 2:
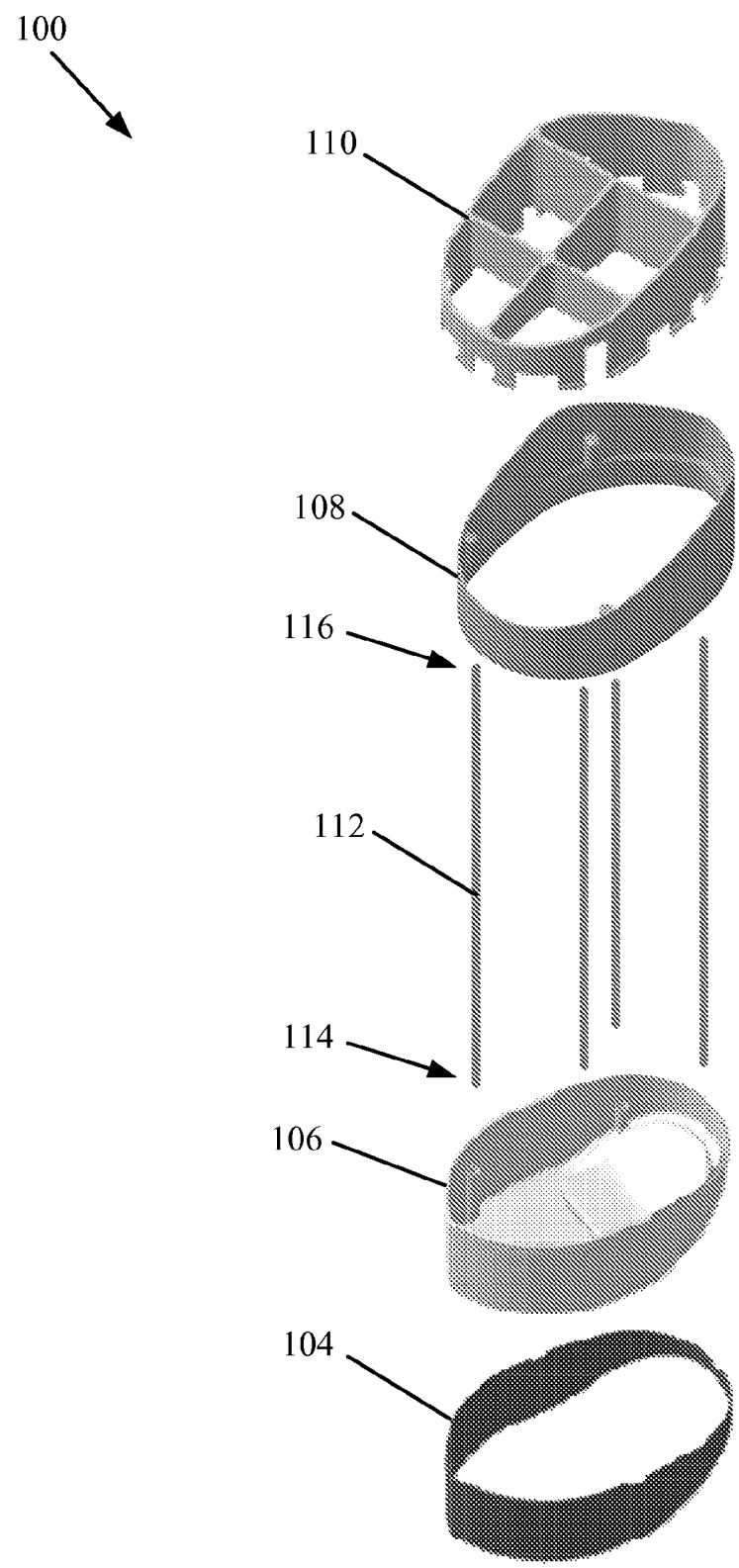
FIG. 2 illustrates an exploded view of one embodiment of the internal structure of a golf bag assembled by the golf bag assembly.

FIG. 2 illustrates an exploded view of one embodiment of the internal structure of the modular golf bag assembly 100 comprising the cuff 104, the base member 106, the collar 108, the top support 110, and the plurality of connecting poles 112 (e.g., also referred to as rods, stays, etc.). When connected together, these components act as a structural frame to support the golf bag body 102. In one configuration, a first or top end of the connection poles 112 engage a first set of connection points on the collar 108 while the second or bottom end of the connection poles 112 engage a second set of connection points on the cuff 104. Since the collar 108 is fixedly coupled to the golf bag body 102 and the base member 106 is engaged to the cuff 104, the connecting poles 112 are inserted between the collar 108 and base 106 under tension so that the base member 106 is secured in place between the poles 112 and the cuff 104.

Figure 3:
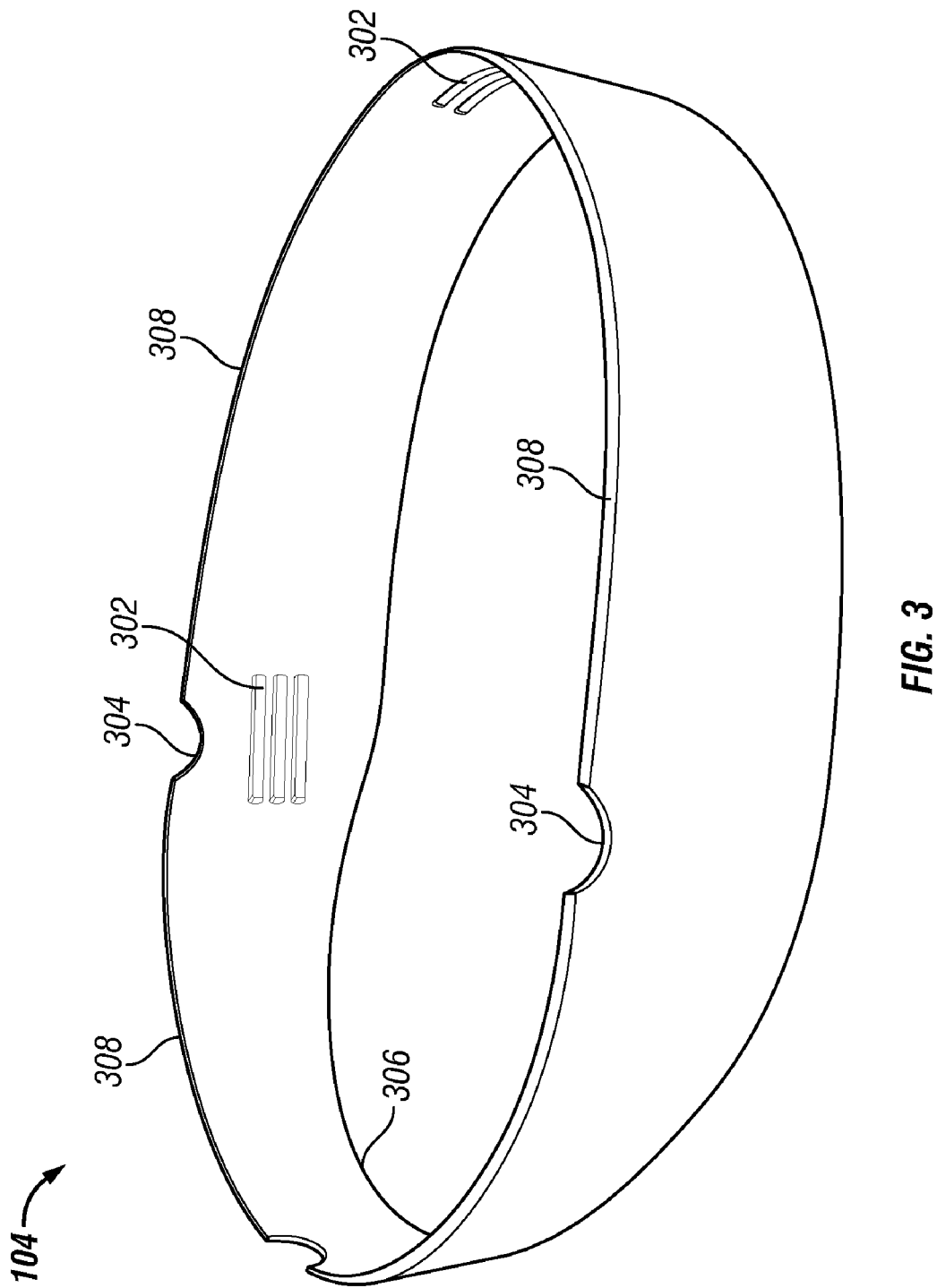
FIG. 3 illustrates a perspective view of one embodiment of a cuff for a golf bag assembly.

FIG. 3 illustrates a perspective view of one embodiment of a cuff for a golf bag assembly. The cuff 104, also known as a bottom inner retaining ring, may be approximately oval or circular in shape, and is sized to conform to a bottom opening at the bottom portion or first end 103 of the golf bag body 102. The cuff 104 may be composed of a thin, wide band of flexible material, such as plastic, or foam, arranged in a ring formation. The cuff 104 may also include one or more fitting grooves 302, one or more anti-rotation notches 304, and an upper cuff perimeter rim 308. The cuff 104 may also feature a curved, angled, and/or slanted underside portion 306 to accommodate features of the base member 106 which it helps secure. The fitting grooves 302, the anti-rotation notches 304, and the upper cuff perimeter rim 308 may mate with corresponding features located on the base member 106 to help keep the base member 106 properly positioned and aligned (at least temporarily and/or during assembly of the golf bag).

Figure 4:
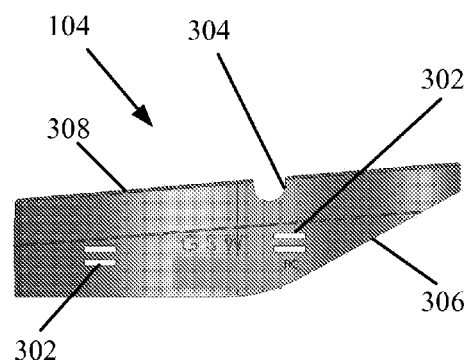
FIGS. 4-7 illustrate various views of one embodiment of the cuff for a golf bag assembly.
Figure 5:
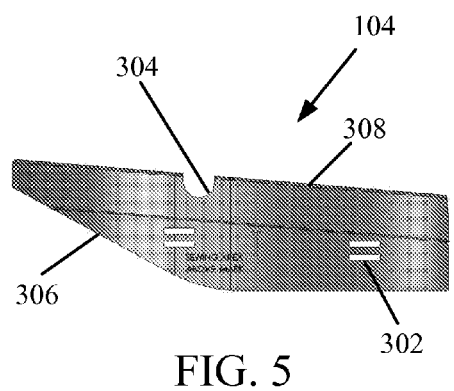
Figure 6:
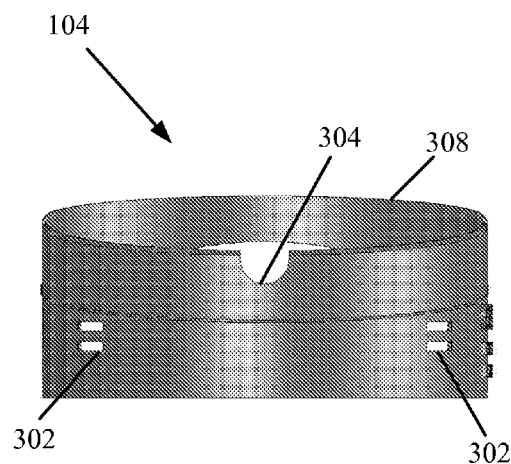
Figure 7:
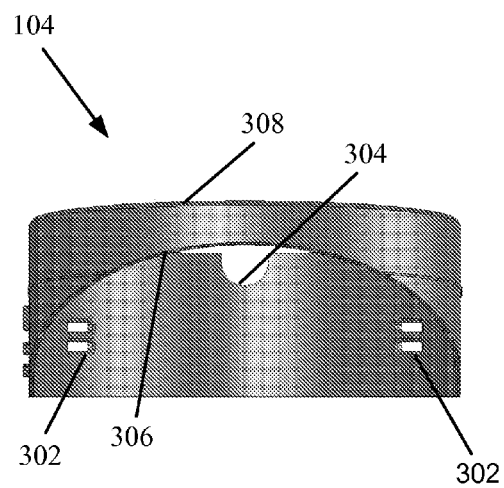

FIGS. 4-7 illustrate various views (left side, right side, back, and front) of one embodiment of the cuff 104 featuring the one or more fitting grooves 302, the one or more anti-rotation notches 304, the curved, angled, and/or slanted underside portion 306, and the upper cuff perimeter rim 308. FIG. 4 illustrate sides views of the cuff 104 while FIGS. 6 and 7 illustrate front/back views.

Figure 8:
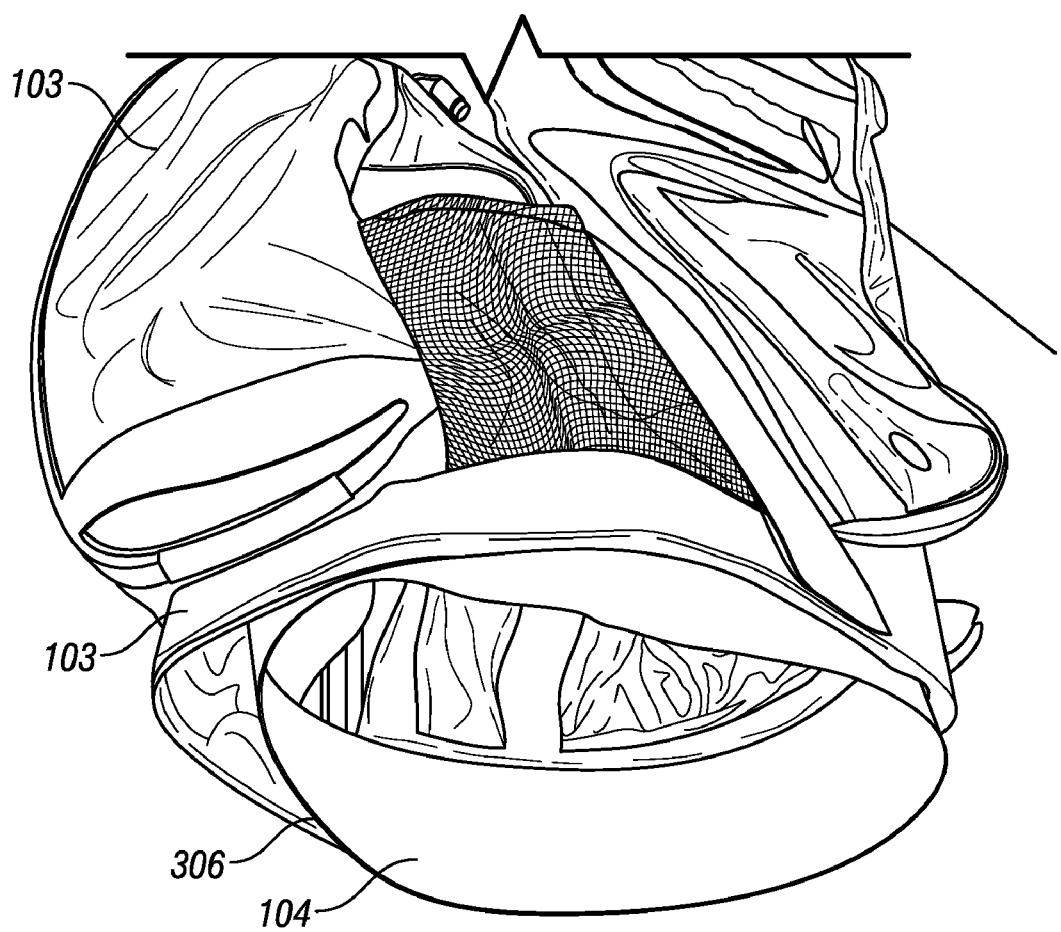
FIG. 8 illustrates the cuff coupled to an inner surface of the bottom portion of the golf bag body.

As illustrated in FIG. 8, the cuff 104 is attached/coupled to the inner surface of an opening at the bottom portion or first end 103 of the golf bag body 102 during one stage of assembly of the golf bag. The cuff 104 may be fixedly attached by stitches, rivets, glue, or any other adhesive techniques known in the art. In one example, the cuff 104 may be attached to the bottom portion 103 of the golf bag body 102 during a manufacturing stage that precedes shipment of the golf bag assembly 100. The cuff 104 is oriented such that the upper cuff perimeter rim 308 faces toward the inside of the golf bag body 102. Since the cuff 104 is made of a flexible material, the golf bag body 102 including the cuff 104 can still be compressed (e.g., flattened), and packaged accordingly to minimize the volume occupied during shipment.

Figure 9:
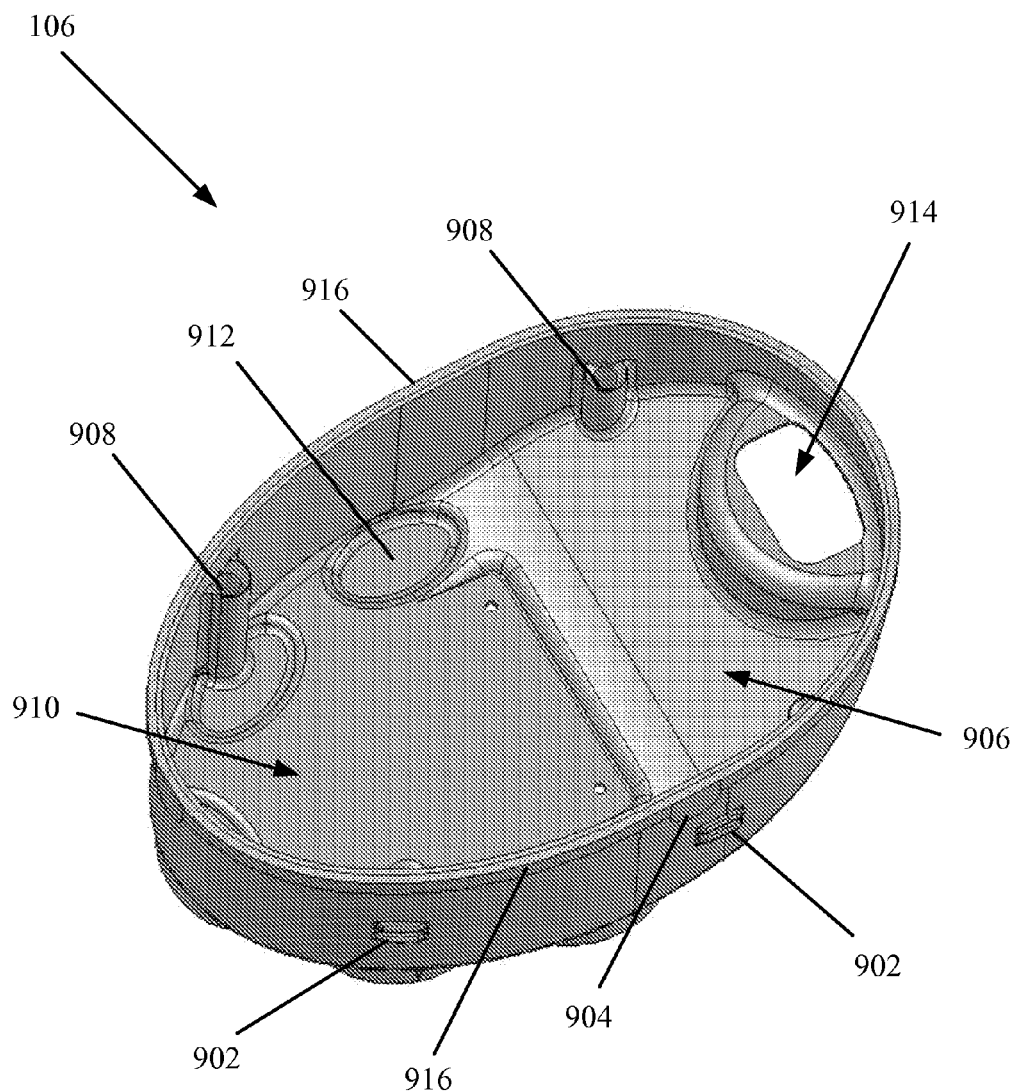
FIGS. 9 and 10 illustrate top and bottom perspective views, respectively, of one embodiment of a base member for a golf bag assembly.
Figure 10:
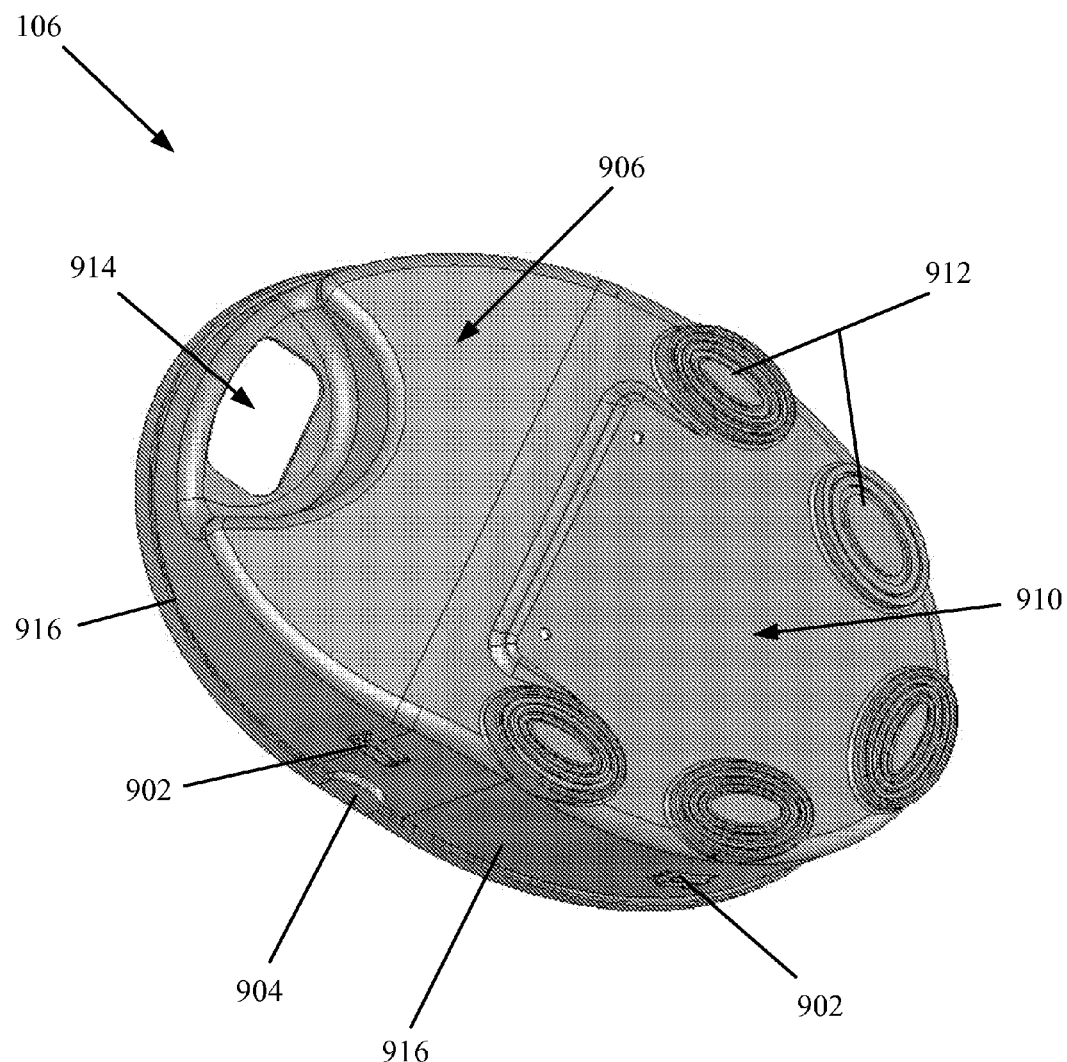

FIGS. 9 and 10 illustrate top and bottom perspective views, respectively, of one embodiment of the base member 106. The base member 106 adheres to the cuff 104 to generally close the bottom portion 103 of the golf bag body 102. The base member 106 comprises one or more fitting ridges 902 (e.g., at an external surface of the base member), one or more anti-rotation tabs 904 (e.g., along an upper edge circumference of the base member), one or more pole receiving base ends 908, one or more pedestals 912, and an outer perimeter lip 916 that runs along the perimeter of the base member 106. The base member 106 may also comprise a flat support surface 910, an angled support surface 906, and an actuator slot or opening 914. The material from which the base member 106 is made may be sufficiently sturdy to withstand repeated scraping and is capable of supporting the weight of a plurality of golf clubs and the golf bag.

The base member 106 may be approximately circular or elliptical in configuration and made of a material which is sufficiently rigid to generally retain its shape and support the golf bag. The base member 106 couples or engages to the cuff 104 by placing the base member 106 within the golf bag body 102 near the bottom portion 103 of the golf bag 102. Specifically, the base member 106 is positioned so that the upper cuff perimeter rim 308 of the cuff 104 abuts the corresponding outer perimeter lip 916 of the base member 106. This prevents the base member 106 from falling out through the bottom end 103 of the golf bag body 102. Moreover, the base member's fitting ridges 902 mate with the corresponding fitting grooves 302 of the cuff 104 to help stabilize the base member 106 with the cuff 104, particularly along the vertical axis (axis parallel to the height of the golf bag). The base member's anti-rotation tabs 904 mate with the corresponding anti-rotation notches 304 found on the cuff 104 to help prevent the base member 106 from rotating relative to the cuff 104 and within the golf bag body 102. Another benefit of the stabilization offered by the fitting ridges 902 when mated with the fitting grooves 302 is that the base member 106 is temporarily held steadfast while the connecting poles' bottom ends 114 are placed into position within the pole receiving base ends 908.

If desired, the golf bag may be placed in an upright position by allowing the flat support surface 910 and/or the pedestals 912 of the base member 106 to come into contact with the ground (or whatever surface the bag is to rest upright on). The pedestals 912, if present, may be composed of a thick durable material to withstand scraping, and wear and tear caused by contact with gravel, concrete, other hard surfaces, and grass. The angled support surface 906 is angled with respect to the flat support surface 910. With the assistance of a stand (illustrated in FIGS. 53-55), the golf bag may also be positioned at an angle with respect to the ground by leaning the golf bag so that the angled support surface 906 comes into parallel contact with the ground. In this manner, the user can alternate between resting the golf bag in an upright or angled/tilted position.

Figure 11:
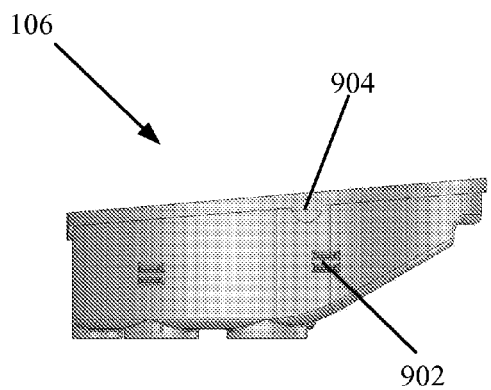
FIGS. 11-15 depict various views of one embodiment of the base member for a golf bag assembly.
Figure 12:
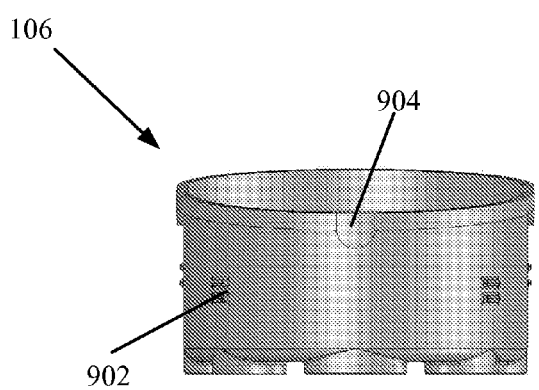
Figure 13:
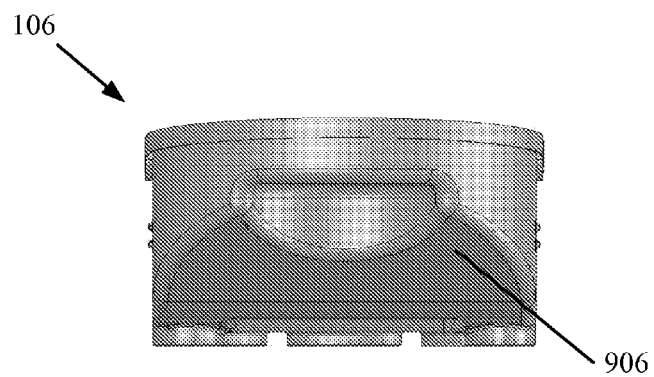
Figure 14:
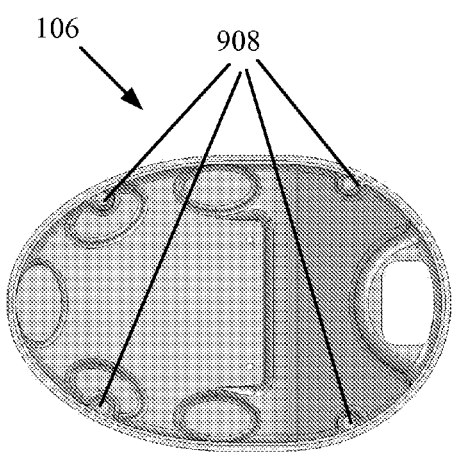
Figure 15:
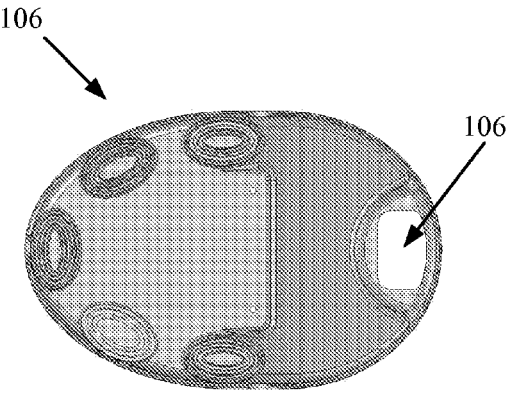

FIGS. 11-15 depict various views (side, back, front, top, and bottom) of one embodiment of the base member 106. FIG. 11 illustrates a side view of the base member 106, which may have symmetrical sides. FIG. 12 illustrates a front end of the base member 106. FIG. 13 illustrates a back end of the base member 106. FIG. 14 illustrates a top inner view of the base member 106. FIG. 15 illustrates a bottom view of the base member 106.

Figure 16:
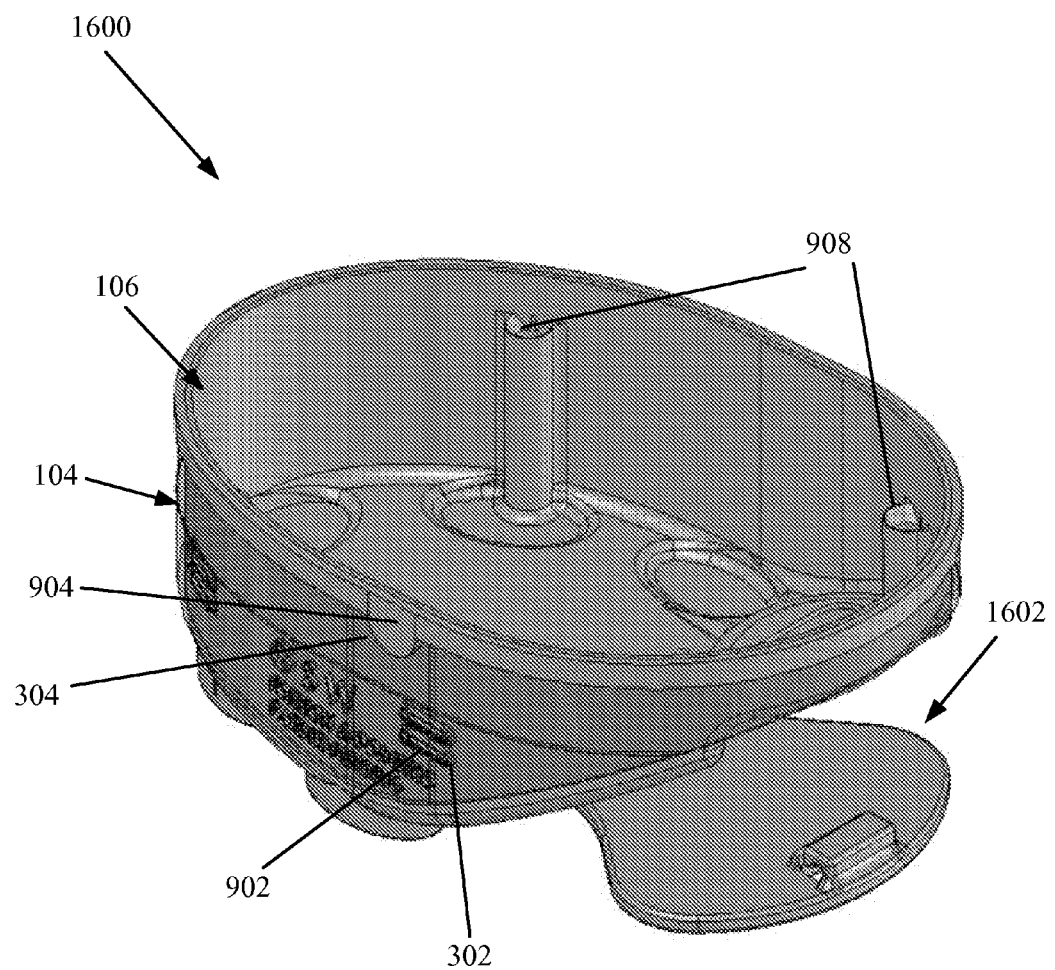
FIGS. 16 and 17 illustrate top and bottom perspective views, respectively, of one embodiment of the cuff and base member joined together to create a cuff-base member subassembly for a golf bag assembly.
Figure 17:
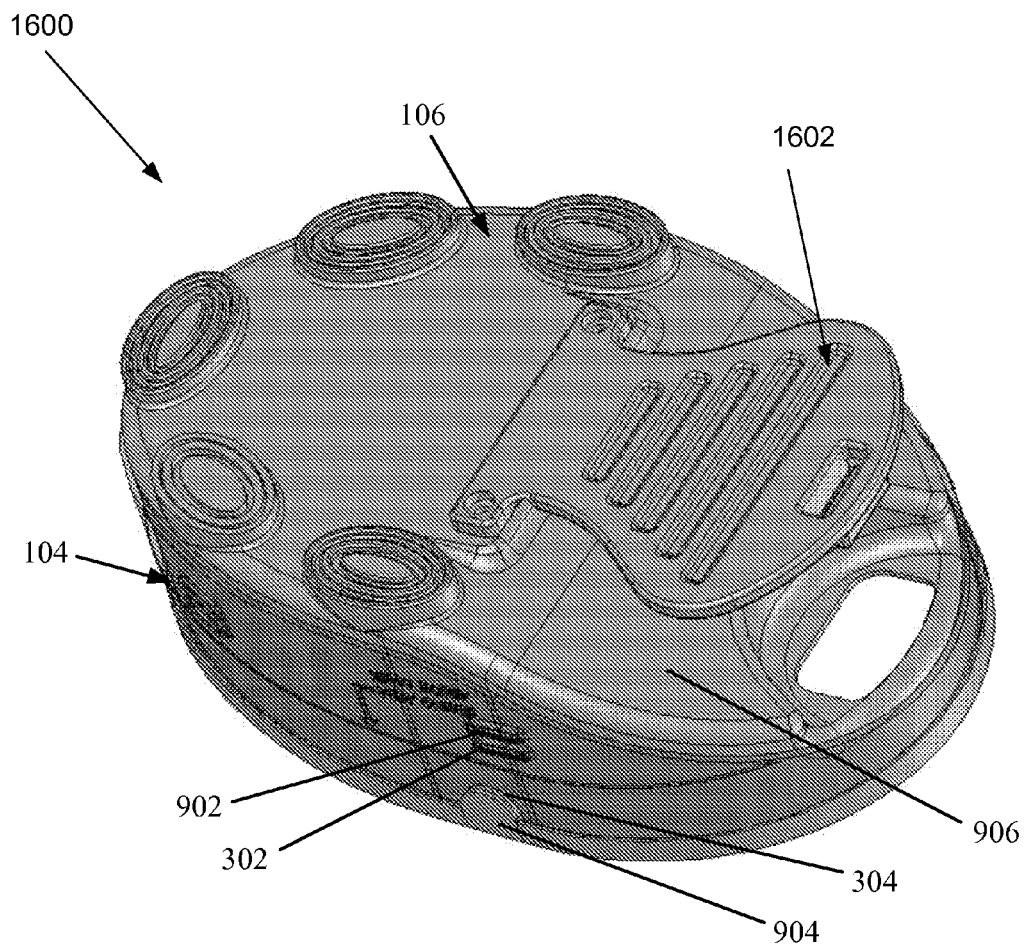

FIGS. 16 and 17 illustrate top and bottom perspective views, respectively, of one embodiment of the cuff 104 and base member 106 joined together to create a cuff-base member subassembly 1600. FIGS. 16 and 17 further illustrate how the fitting grooves 302 and anti-rotation notches 304 of the cuff 104 engage and lock with the fitting ridges 902 and anti-rotation tabs 904 of the base member 106. The cuff-base member subassembly 1600 may also feature a bendable kickstand lever 1602 that when depressed deploys the legs of a golf bag stand (illustrated in FIGS. 53-55).

Figure 18:
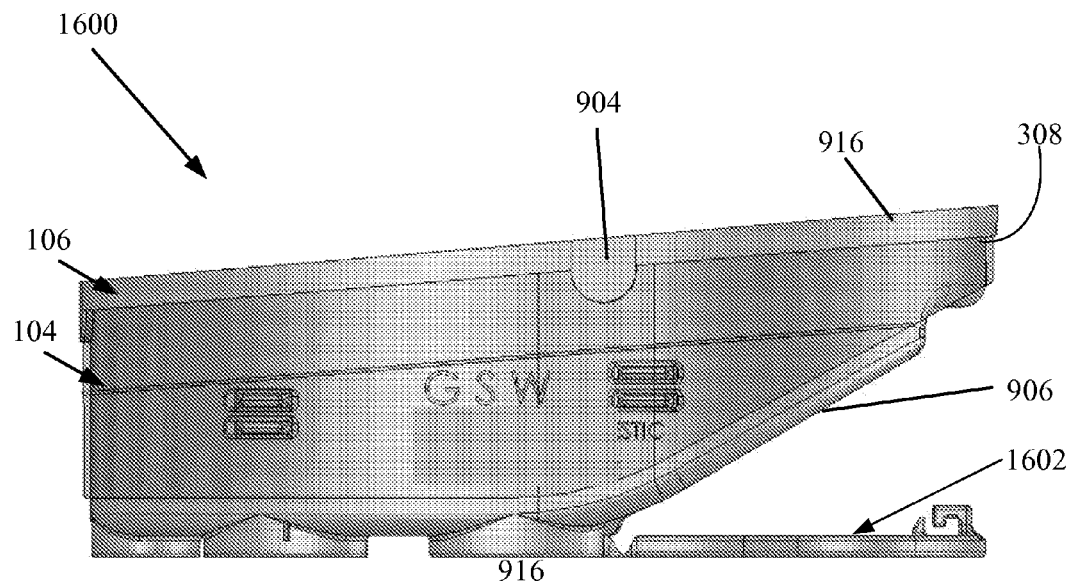
FIGS. 18-21 illustrate various views of one embodiment of the cuff-base subassembly for a golf bag assembly.
Figure 19:
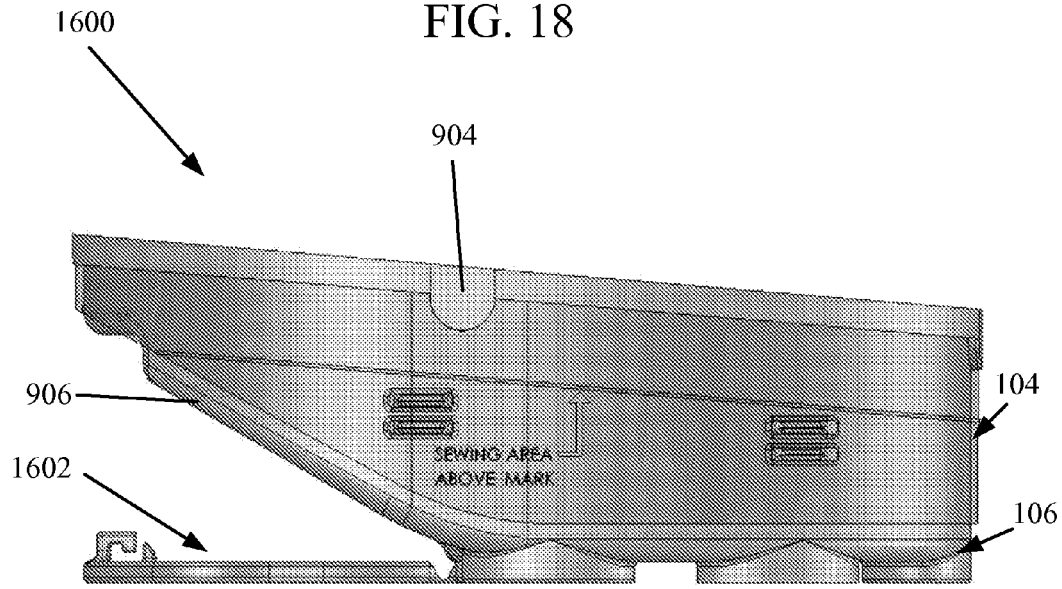
Figure 20:
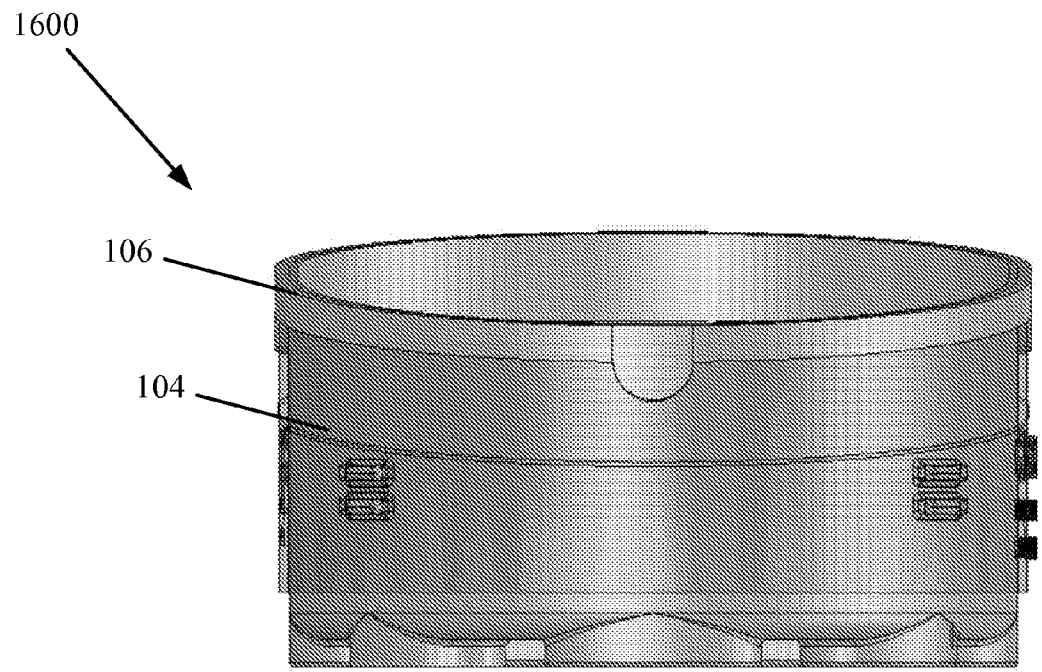
Figure 21:
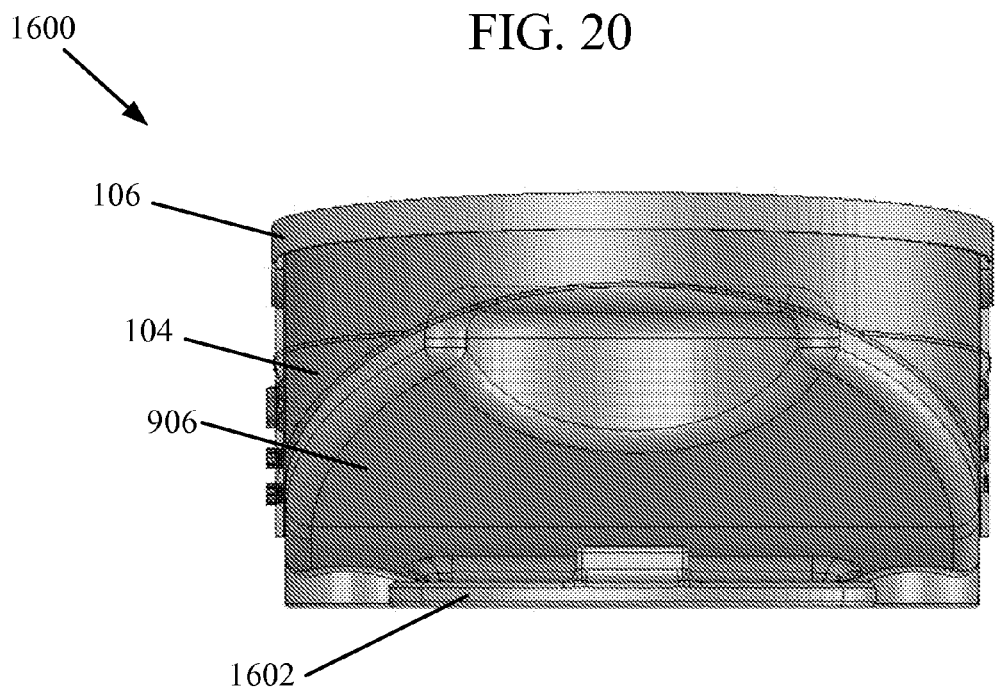

FIGS. 18-21 illustrate various views (left side, right side, back, and front) of one embodiment of the cuff-base subassembly 1600. FIGS. 18 and 19 illustrate opposite side views of the cuff-base subassembly 1600. FIGS. 20 and 21 illustrate opposite front and back views of the cuff-base subassembly 1600. Note that the outer perimeter lip 916 of the base member 106 abuts or engages against the upper cuff perimeter rim 308 of the cuff, thereby securing the base member 106 within the golf bag body 102.

Figure 22:
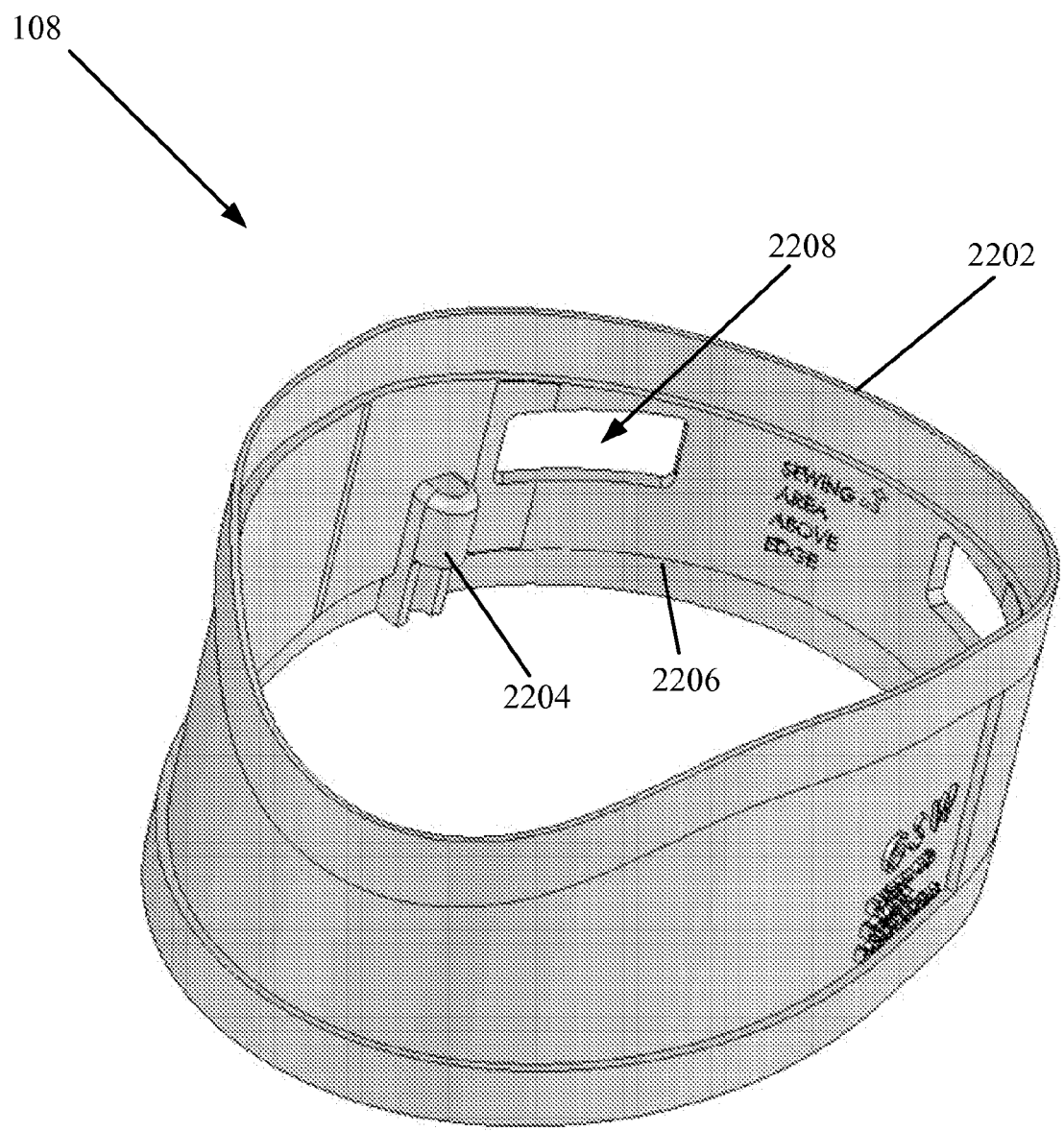
FIGS. 22 and 23 illustrate top and bottom perspective views, respectively, of one embodiment of the collar of the golf bag assembly.
Figure 23:
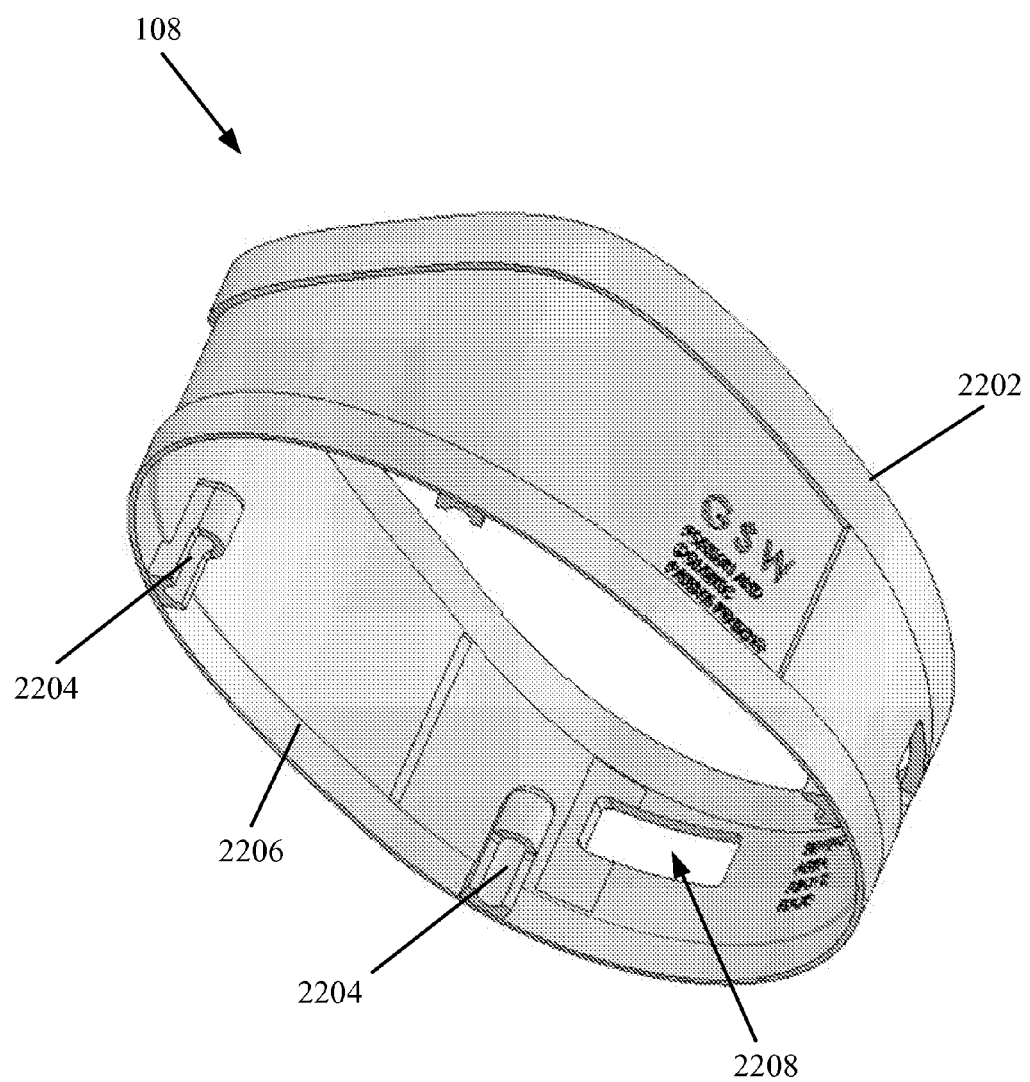

FIGS. 22 and 23 illustrate top and bottom perspective views, respectively, of one embodiment of the collar 108 of the golf bag assembly 100. The collar 108, also known as a top inner retaining ring, is approximately oval or circular in shape, and is sized to conform to the top opening 105 of the golf bag body 102. The collar 108 may be composed of a thin, wide band of flexible material, such as plastic or a foam, arranged in a ring formation. The collar 108 may include an upper collar perimeter rim 2202, one or more pole receiving collar ends 2204, a lower collar perimeter portion 2206, and one or more leg bracket collar slots 2208. The pole receiving collar ends 2204 are configured to receive and hold in place the connecting poles' top ends 116. The upper collar perimeter rim 2202 and the lower collar perimeter portion 2206 are configured to engage with corresponding portions of the top support 110. Moreover, the one or more leg bracket collar slots 2208 are designed to allow portions of a bracket used to support the legs of a kickstand to pass through.

Figure 24:
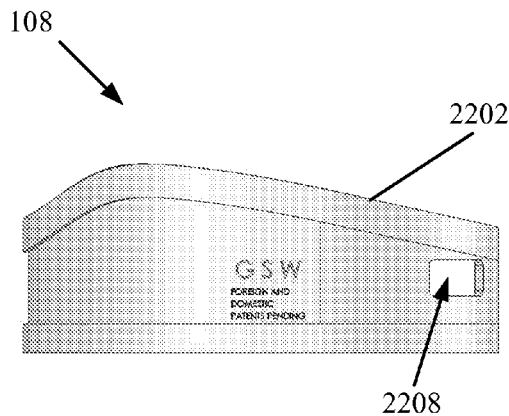
FIGS. 24-27 illustrate various views of one embodiment of the collar for the golf bag assembly.
Figure 25:
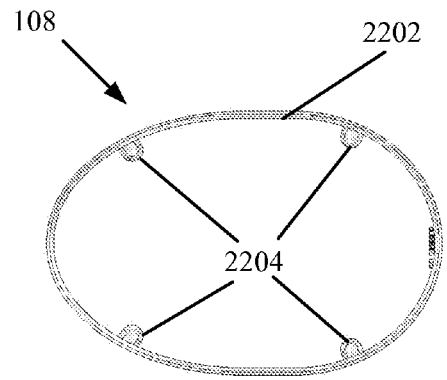
Figure 26:
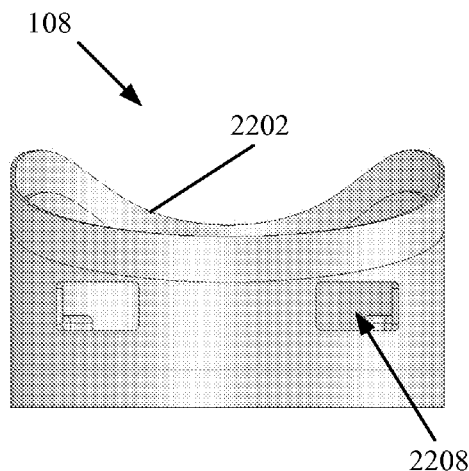
Figure 27:
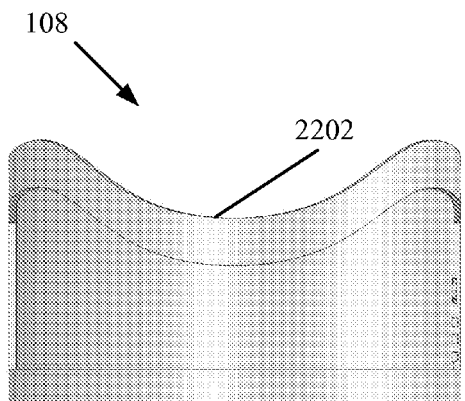

FIGS. 24-27 illustrate various views (side, top, front, and back) of one embodiment of the collar 108. FIG. 24 illustrates a side view of the collar 108 which may have symmetrical sides. FIG. 25 illustrates a top view of the collar 108. FIG. 26 illustrates a back view of the collar 108. FIG. 27 illustrates a front view of the collar 108.

Figure 28:
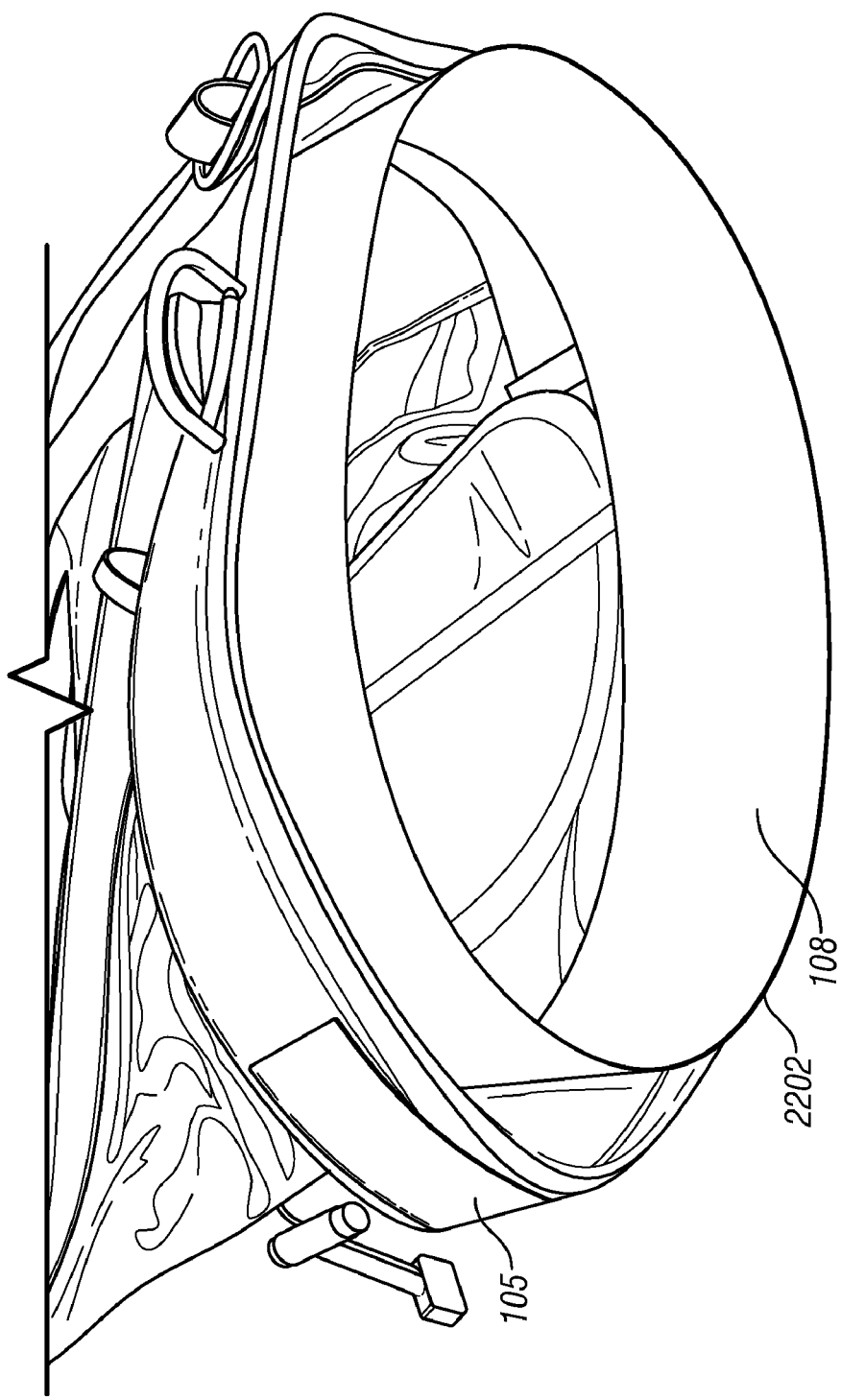
FIG. 28 illustrates the collar coupled to an inner surface of the top portion of the golf bag body.

As illustrated in FIG. 28, the collar 108 is attached/coupled to the top, inner-surface opening 105 of the golf bag body 102 during one stage of assembly of the golf bag. The collar 108 may be fixedly attached by stitches, rivets, glue, or any other adhesive techniques known in the art. The collar 108 may be attached to the top portion 105 of the golf bag body 102 during a manufacturing stage that precedes shipment of the golf bag assembly 100. The collar 108 is oriented such that upper collar perimeter rim 2202 faces away from the inside of the golf bag body 102. Since, the collar 108 is made of a flexible material, the golf bag body 102 including the collar 108 can still be compressed, and packaged accordingly to minimize the volume occupied during shipment.

Figure 29:
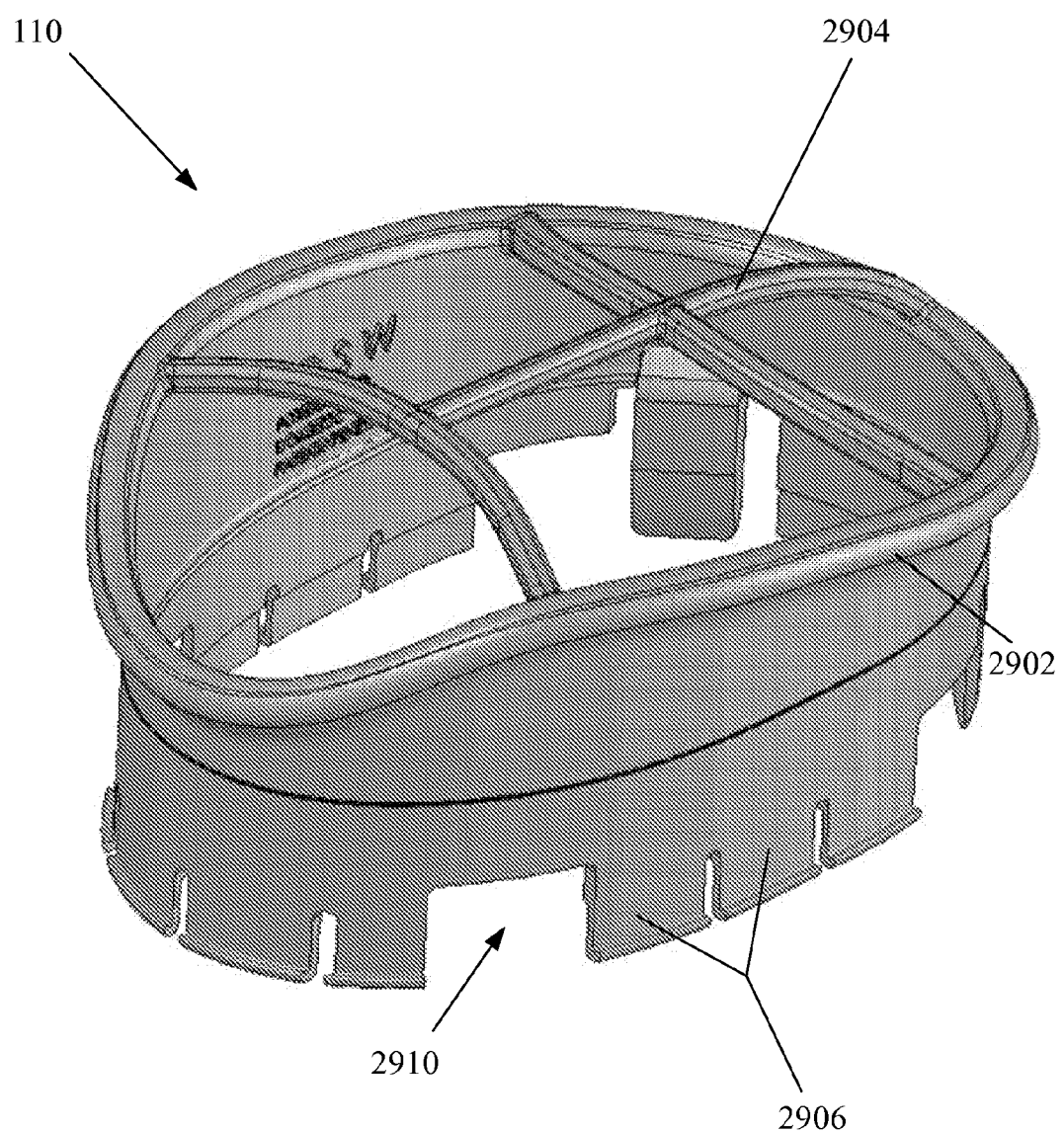
FIGS. 29 and 30 illustrate top and bottom perspective views, respectively, of the top support for the golf bag.
Figure 30:
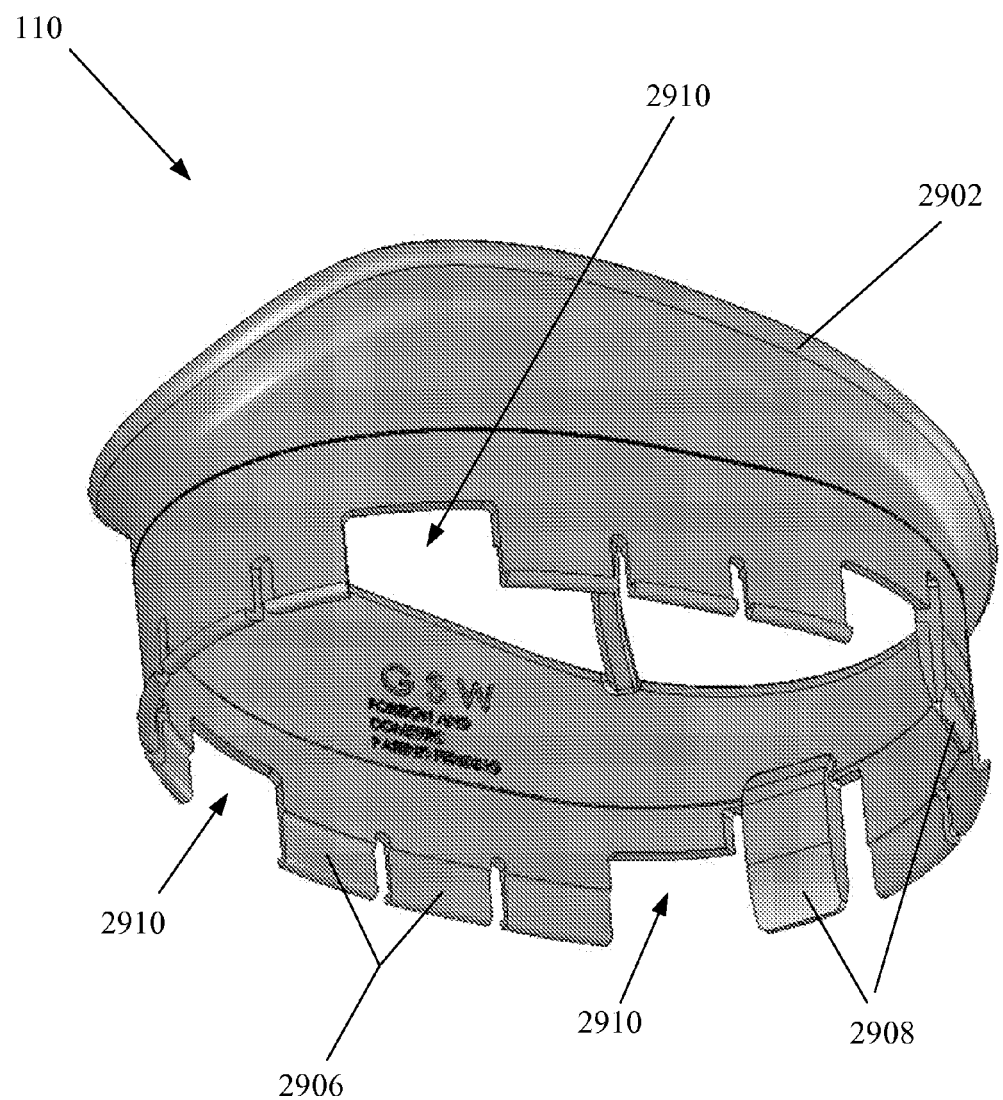
Figure 31:
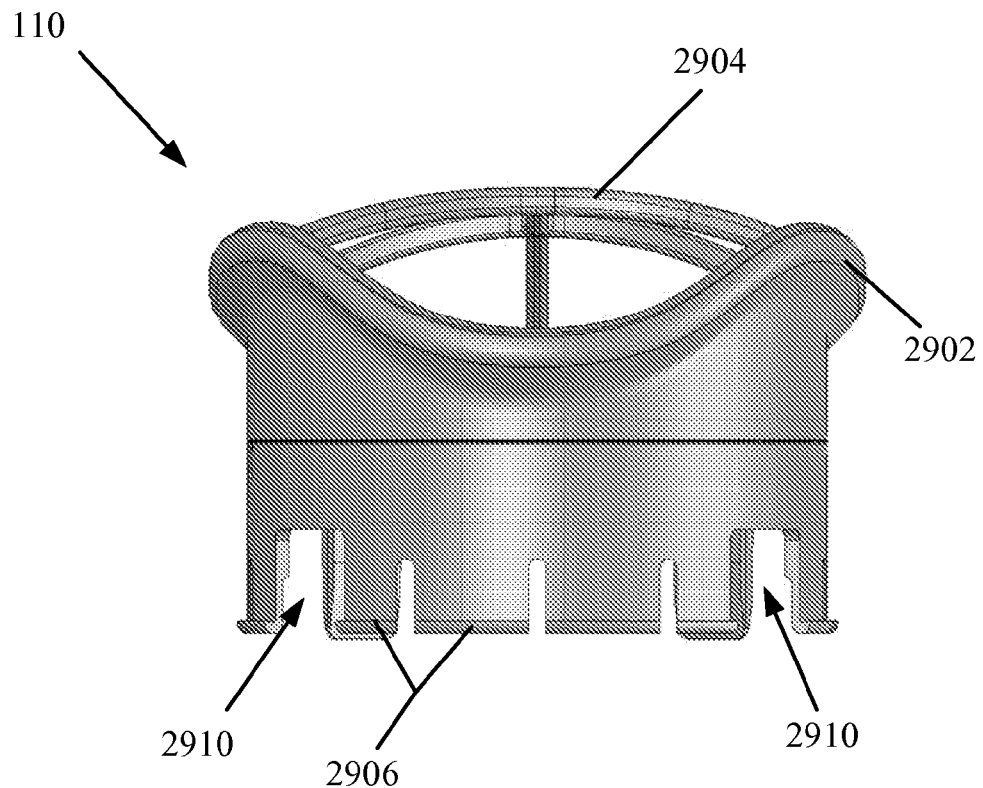
FIGS. 31-35 illustrate various views of the top support featuring a divider for the golf bag.
Figure 32:
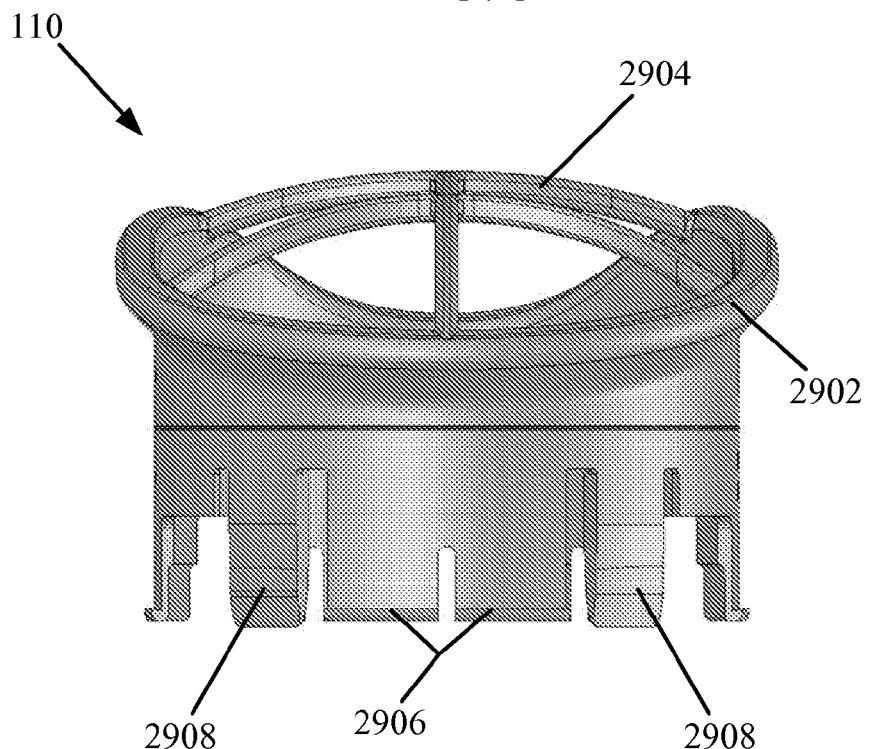
Figure 33:
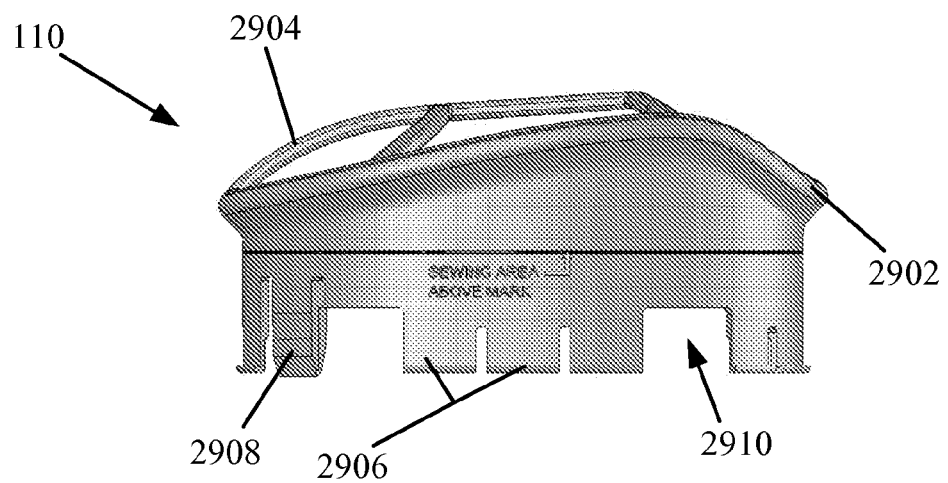
Figure 34:
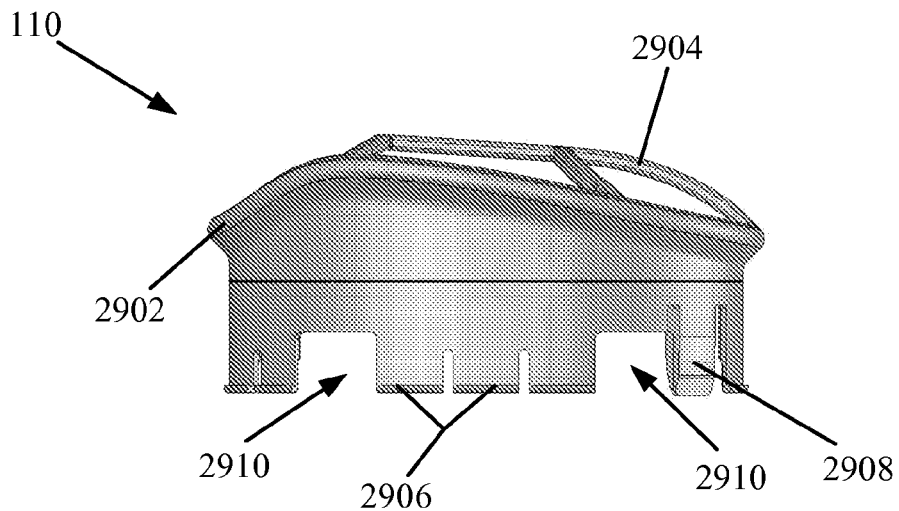
Figure 35:
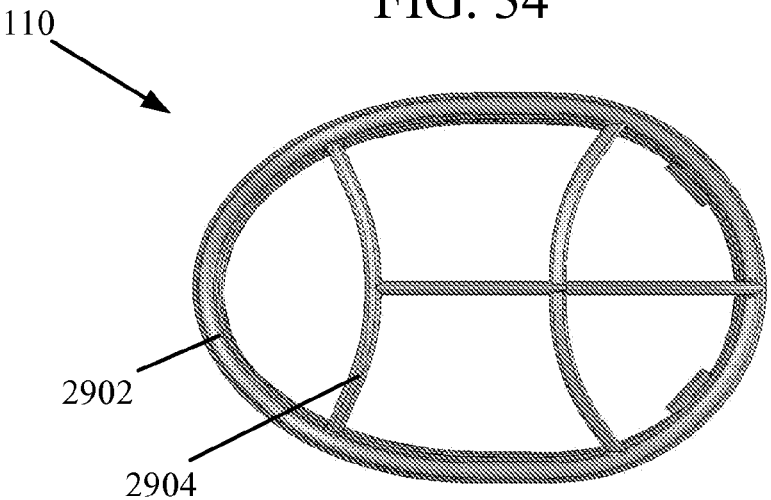

FIGS. 29 and 30 illustrate top and bottom perspective views, respectively, of the top support 110. The top support 110 adheres to the collar 108 at the top portion 105 of the golf bag body 102. The top support 110 comprises an outer perimeter lip 2902, a divider 2904, a plurality of clasps 2906, one or more leg bracket tabs 2908, and one or more pole receiving collar end slots 2910.

The top support 110 may be approximately circular or elliptical in configuration and made of a material which is sufficiently rigid to generally retain its shape and support the golf bag. The top support 110 couples to the collar 108 by mounting the top support 110 on top of the collar 108 near the top portion 105 of the golf bag 102. Specifically, the top support 110 is positioned so that upper collar perimeter rim 2202 of the collar 108 abuts the corresponding outer perimeter lip 2902 of the top support 110. This prevents the top support 110 from falling into the golf bag body 102. Moreover, the plurality of clasps 2906 of the top support 110 engage the lower collar perimeter portion 2206 of the collar 108 to lock the top support 110 in place and prevent it from falling into or out of the golf bag body 102.

The divider 2904 serves to apportion the top support 110 into a series of sections adapted to receive and separate the various types of golf clubs, such as, putters, drivers, irons, and so on. In the embodiment shown in FIGS. 29 and 30, the divider 2904 apportions the top support 110 into five separate sections. However, in other embodiments, the divider may apportion the top section into more or less sections. In yet other embodiments, the divider 2904 may be absent altogether such that the top support 110 consists of one large single section that does not divide a plurality of golf clubs.

FIGS. 31-35 illustrate various views (back, front, left side, right side, and top) of the top support 110 featuring a divider 2904.

Figure 36:
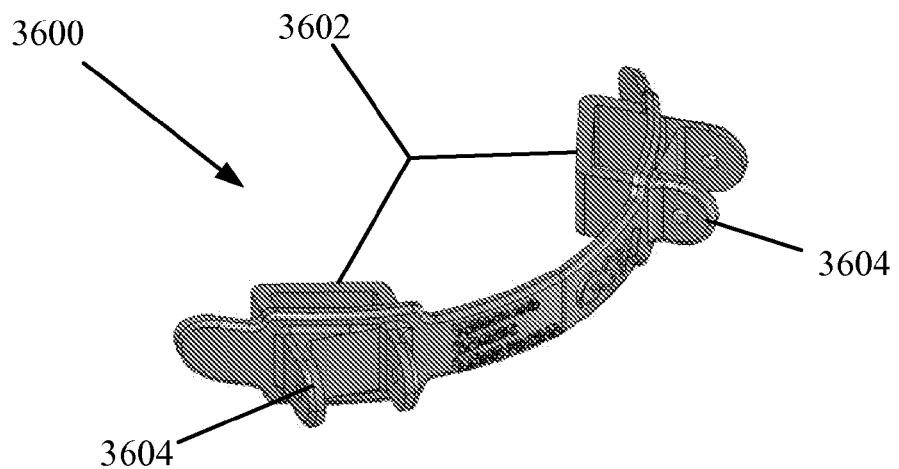
FIGS. 36-38 illustrate top and bottom perspective views of the leg bracket for the golf bag assembly.
Figure 37:
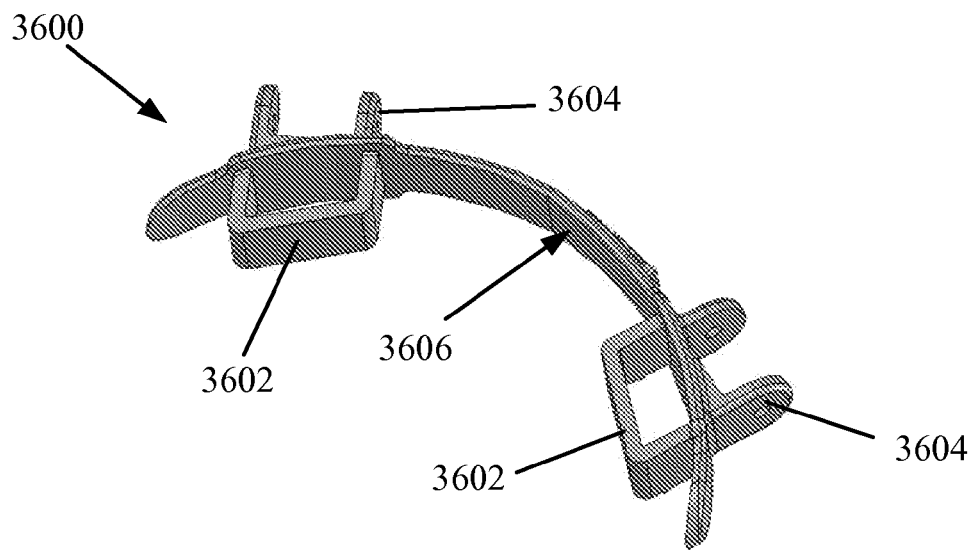
Figure 38:
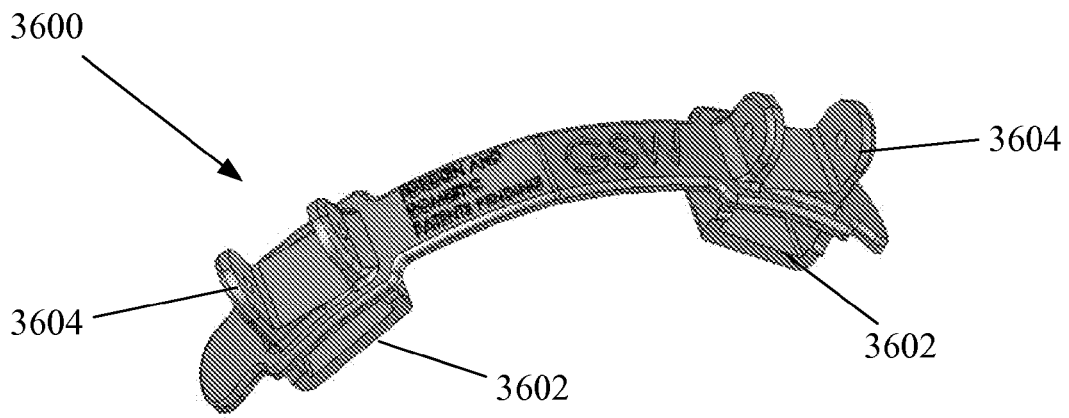

FIGS. 36-38 illustrate top and bottom perspective views of the leg bracket 3600. The leg bracket 3600 features one or more leg bracket tab receivers 3602, one or more leg bracket hinges 3604, and a curved inner surface 3606 that is shaped to adhere to the outside top portion of 105 of the golf bag body 102. The one or more leg bracket tab receivers 3602 pass through the leg bracket collar slots 2208 of the collar 108 and corresponding slots in the golf bag body 102 (not shown). The leg bracket tabs 2908 of the top support 110 then slide through the leg bracket tab receivers 3602 to lock the leg bracket 3600 in place onto the golf bag body 102.

Figure 39:
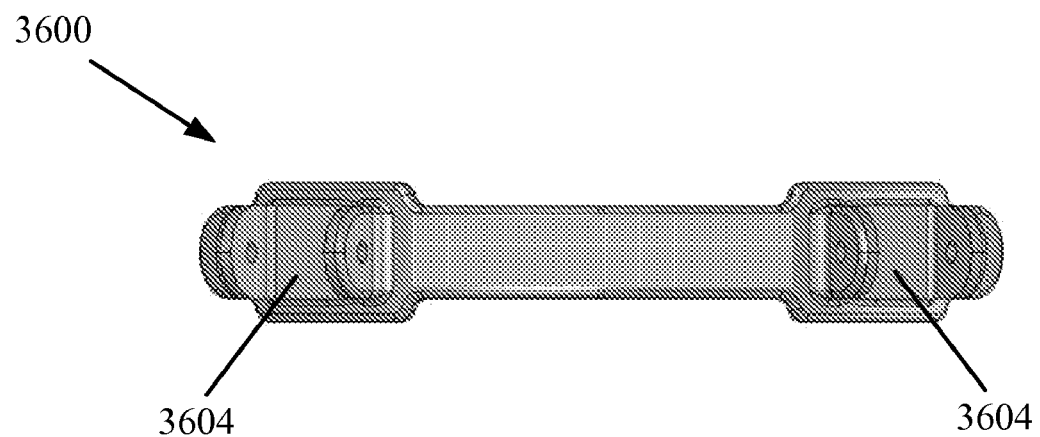
FIGS. 39 and 40 illustrate front and back views of the bracket for the golf bag assembly.
Figure 40:
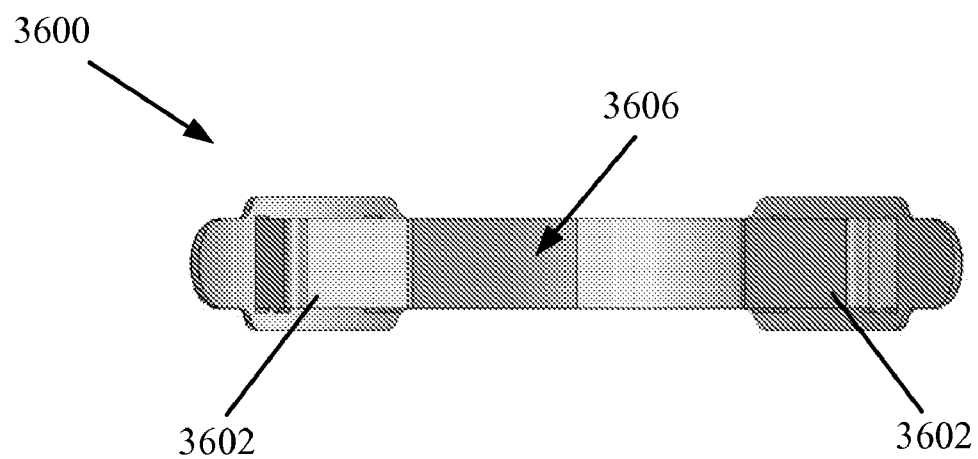

FIGS. 39 and 40 illustrate front and back views of the bracket 3600.

Figure 41:
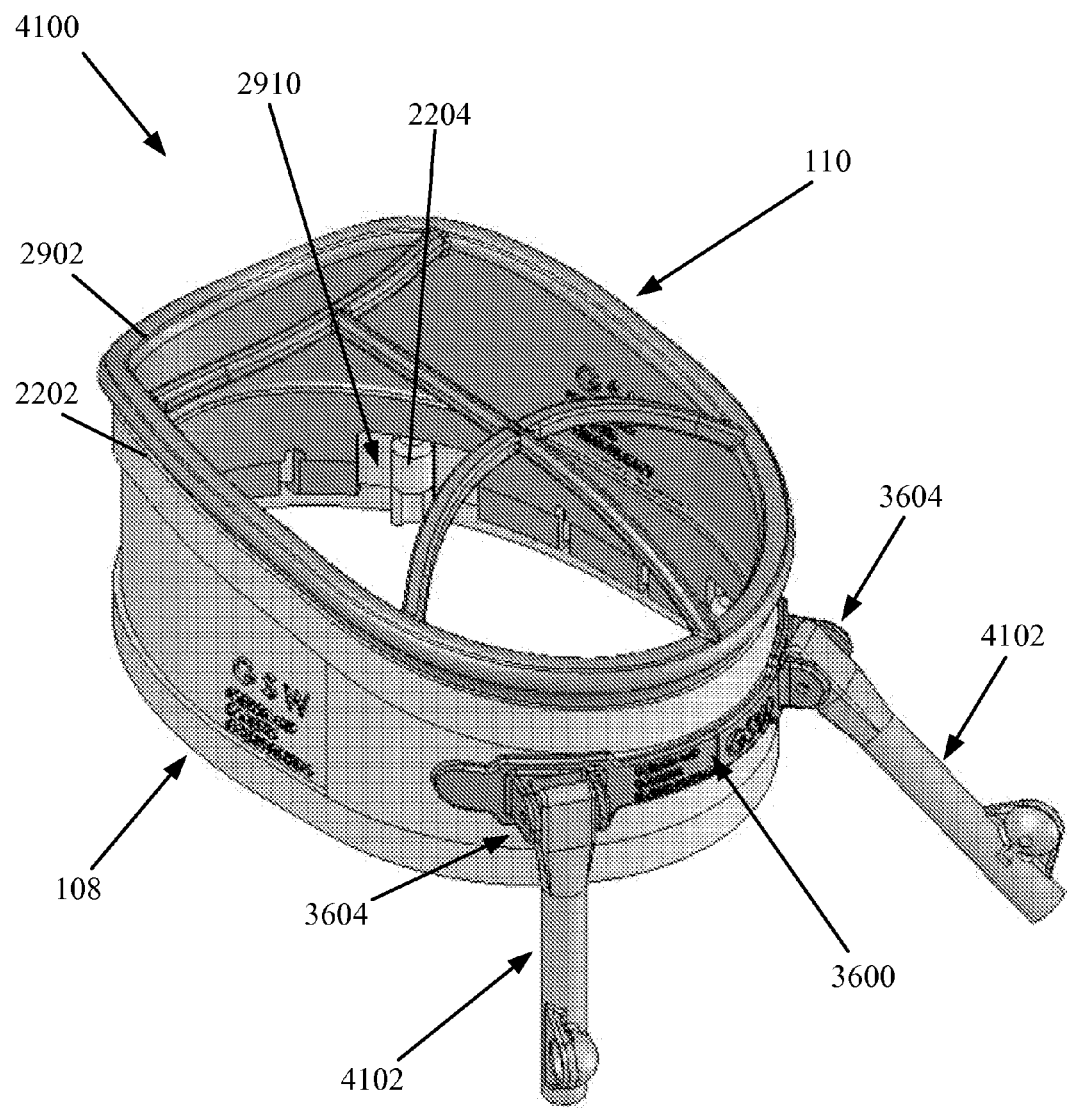
FIGS. 41 and 42 illustrate top and bottom perspective views, respectively, of the collar and the leg bracket engaged with the top support to form the collar-bracket-top support subassembly for the golf bag assembly.
Figure 42:
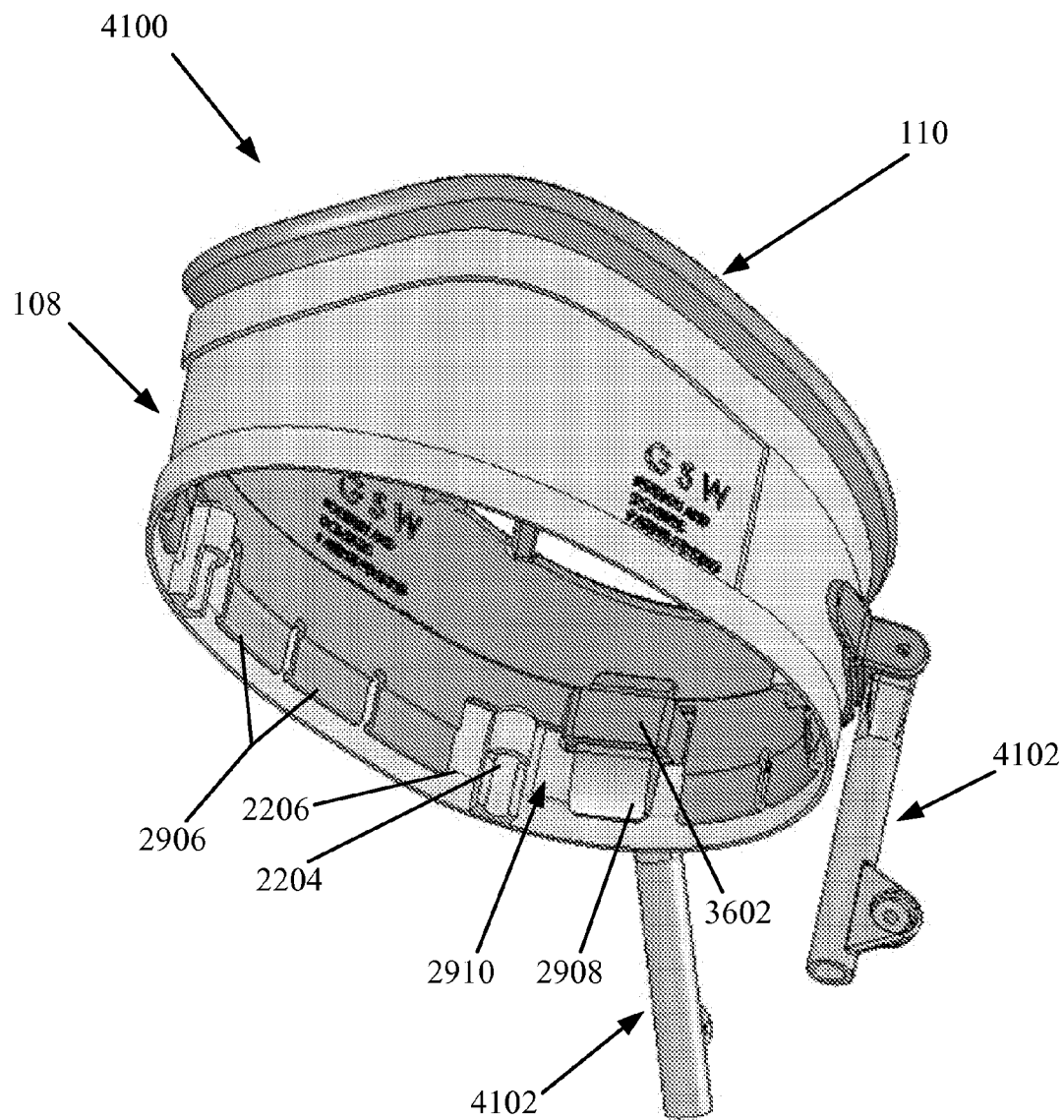
Figure 53:
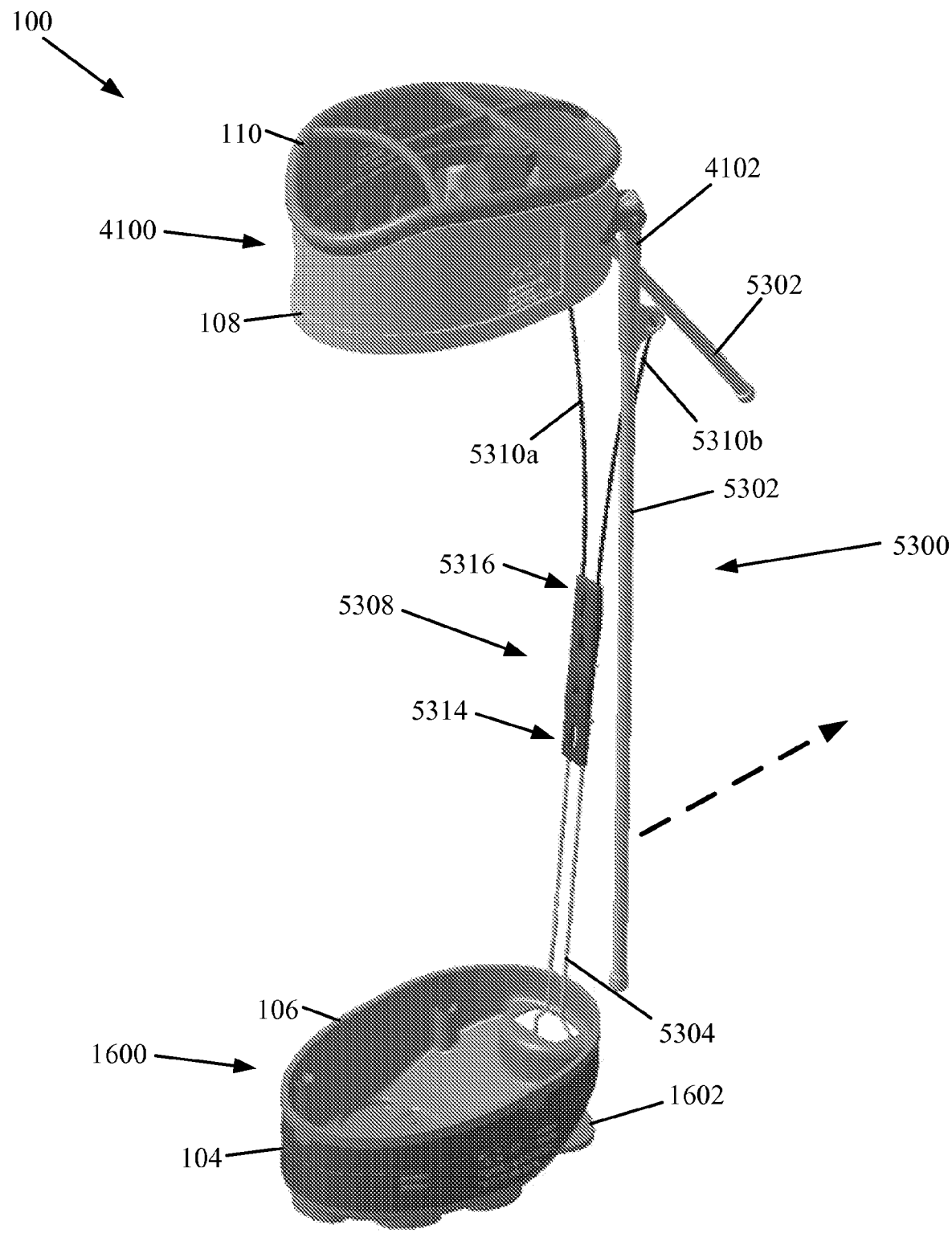
FIGS. 53-55 illustrate various views of one embodiment of the golf bag assembly featuring a golf bag kickstand assembly.
Figure 54:
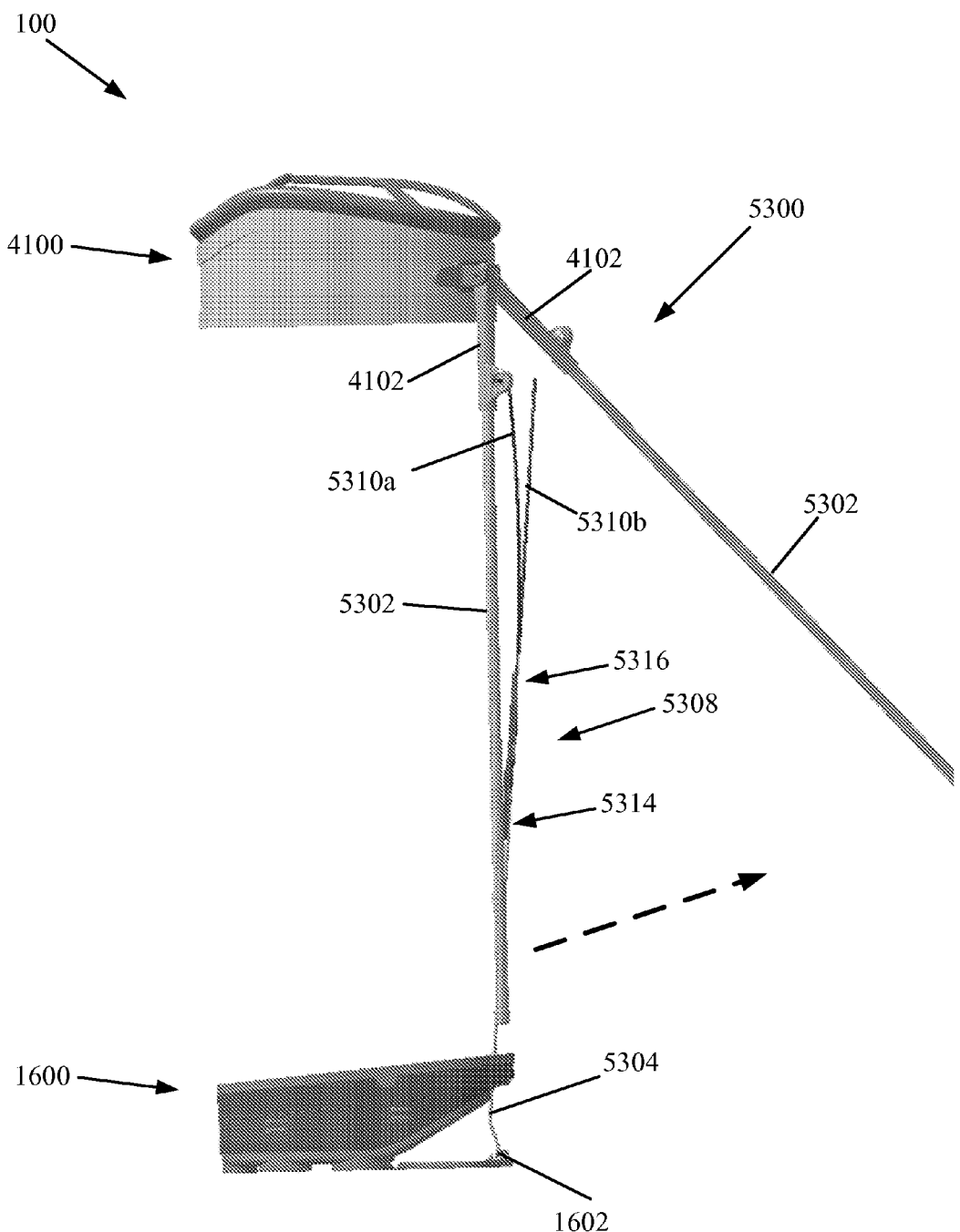
Figure 55:
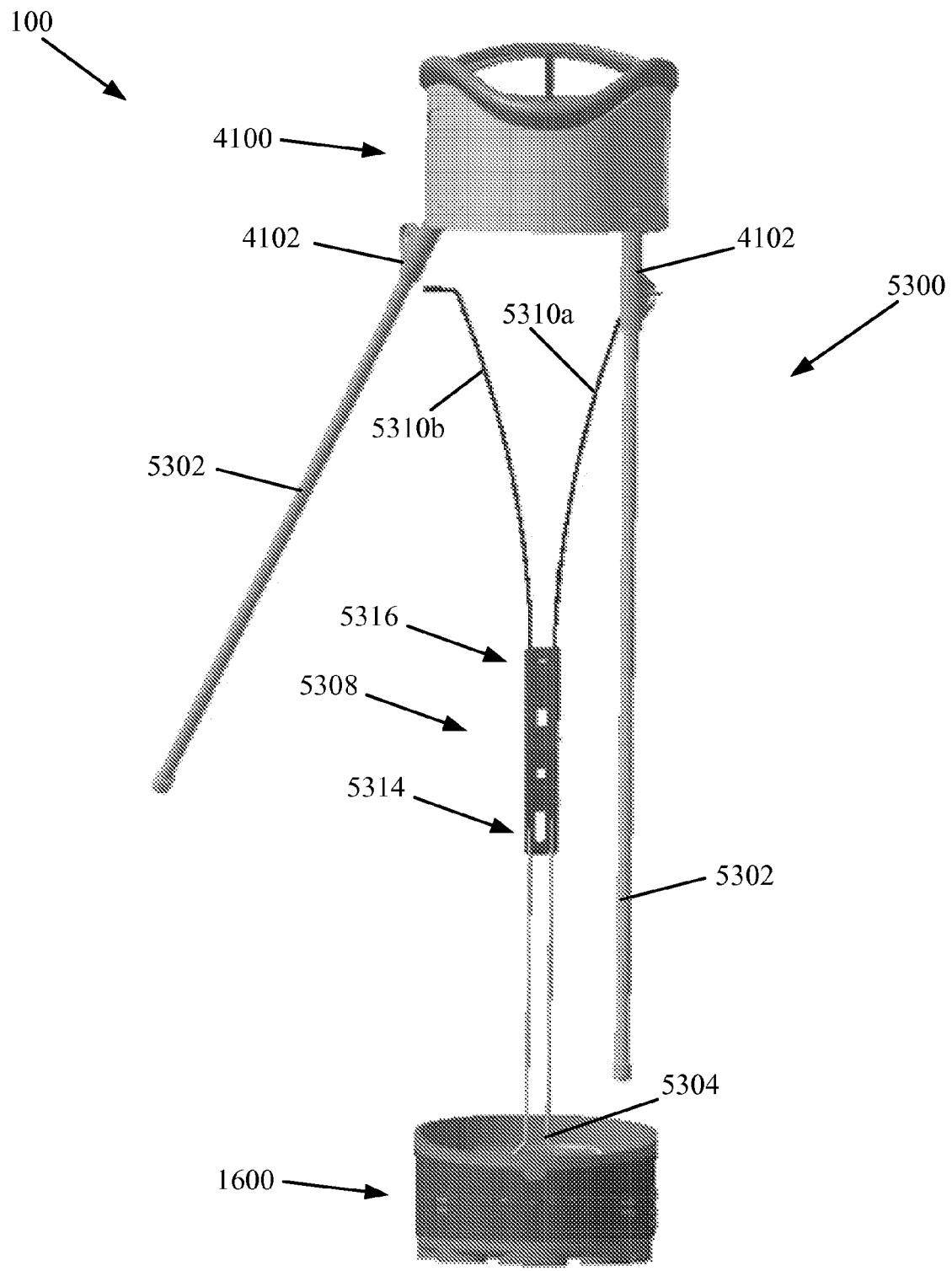

FIGS. 41 and 42 illustrate top and bottom perspective views, respectively, of the collar 108 and the leg bracket 3600 engaged with the top support 110 to form the collar-bracket-top support subassembly 4100. FIGS. 41 and 42 show how the upper collar perimeter rim 2202 and lower collar perimeter portion 2206 of the collar 108 engage with the outer perimeter lip 2902 and the plurality of clasps 2906 of the top support 110, respectively, to help keep the top support 110 secured to the collar 108. Moreover, the one or more pole receiving collar end slots 2910 of the top support 110 create space to accommodate the pole receiving collar ends 2204 of the collar 108. FIG. 41 also shows how the leg bracket hinges 3604 engage with the stand leg receivers 4102. The stand leg receivers 4102 engage with legs of a kickstand (e.g., as illustrated in FIGS. 53-55) to help support the golf bag when the golf bag rests at an angle on the angled support surface 906.

Figure 43:
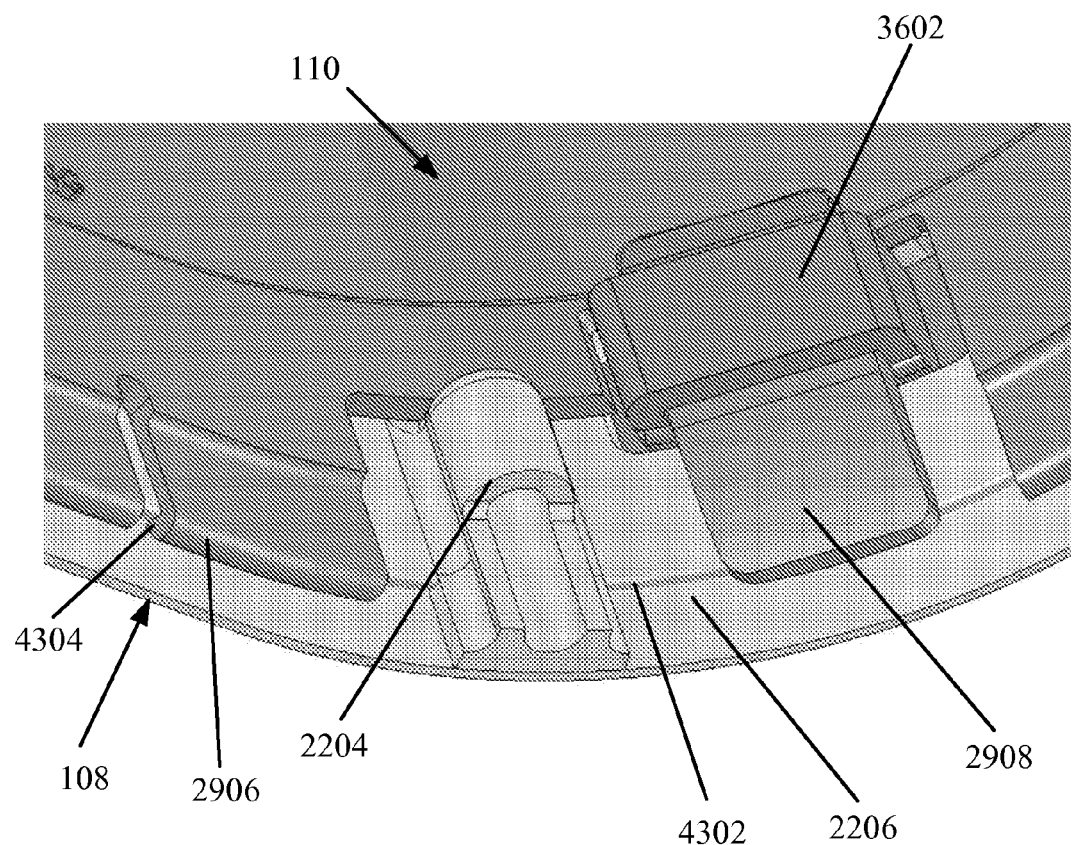

FIGS. 42 and 43 illustrate how the leg bracket tabs 2908 of the top support 110 slide through the leg bracket tab receivers 3602 to lock the leg bracket 3600 in place. The leg bracket collar slots 2208 in the collar 108, and similarly sized apertures within the top portion 105 of the golf bag body 102 (FIG. 1), allow the leg bracket tab receivers 3602 to pass through unobstructed. Also illustrated here is the lower collar perimeter portion 2206 of the collar 108 which forms a lip 4302. The plurality of clasps 2906 include an engaging finger or edge 4304 that engage the lip 4302 to secure the top support 110 to the collar 108.

Figure 44:
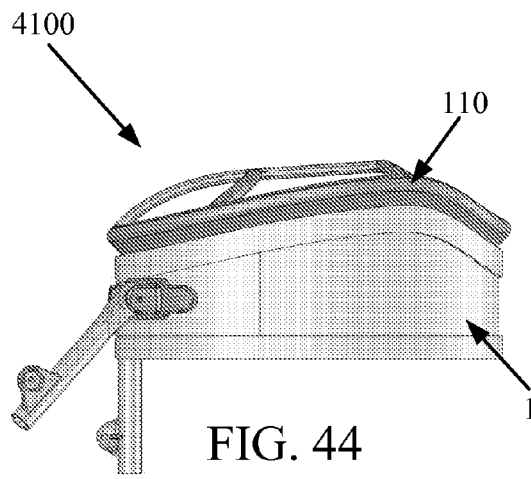
FIGS. 44-48 illustrate various views of the collar-bracket-top support subassembly for the golf bag assembly.
Figure 45:
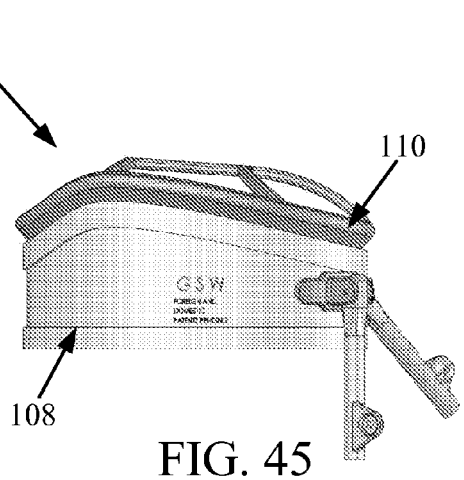
Figure 46:
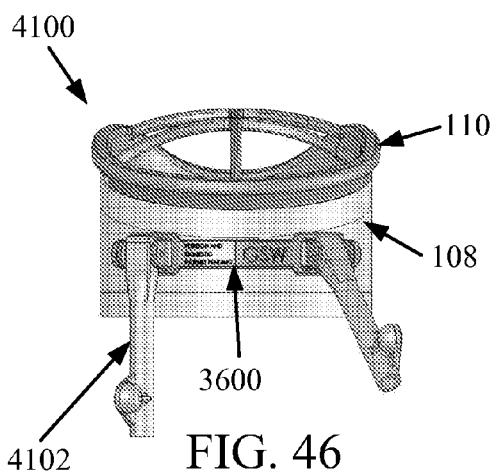
Figure 47:
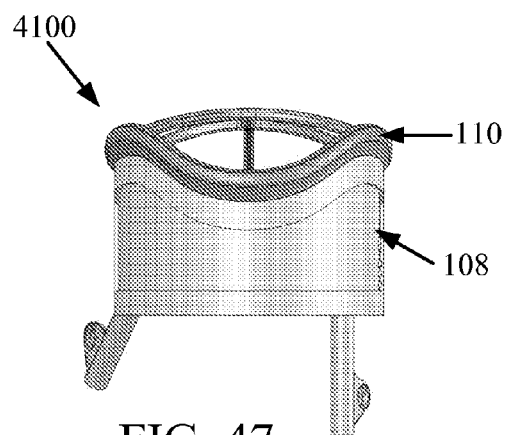
Figure 48:
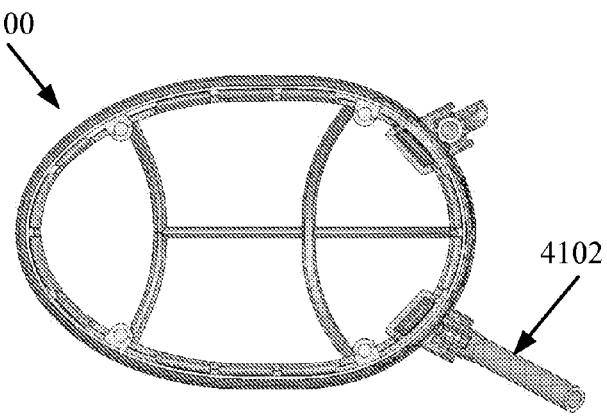

FIGS. 44-48 illustrate various views (left side, right side, front, back, and top) of the collar-bracket-top support subassembly 4100. FIGS. 44 and 45 illustrate opposite side views of the collar-bracket-top support subassembly 4100. FIGS. 46 and 47 illustrate opposite back and front views of the collar-bracket-top support subassembly 4100. FIG. 48 illustrates a bottom end view of the collar-bracket-top support subassembly 4100.

Figure 49:
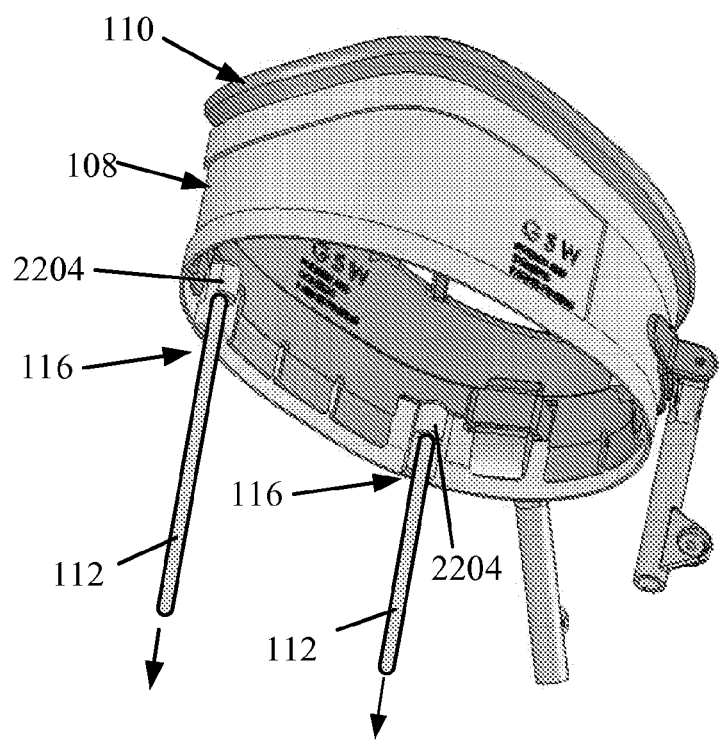
FIG. 49 illustrates a bottom perspective view of one embodiment of the collar-bracket-top support subassembly for the golf bag assembly.

FIG. 49 illustrates a bottom perspective view of one embodiment of the collar-bracket-top support subassembly 4100. In particular, FIG. 49 shows how the top portion 116 (e.g., first end) of the connecting poles 112 engage with the pole receiving collar ends 2204 of the collar 108. Similarly, FIG. 50, which illustrates a top perspective view of one embodiment of the cuff-base member subassembly 1600, shows how the bottom portion 114 (e.g., second end) of the connecting poles 112 engage with the pole receiving base ends 908 of the base member 106. The poles 112 are sized so that, when the base member 106 is inserted and engaged to the cuff 104, the poles 112 exert an outward or extension force between the base member 106 and the collar 108.

Figure 51:
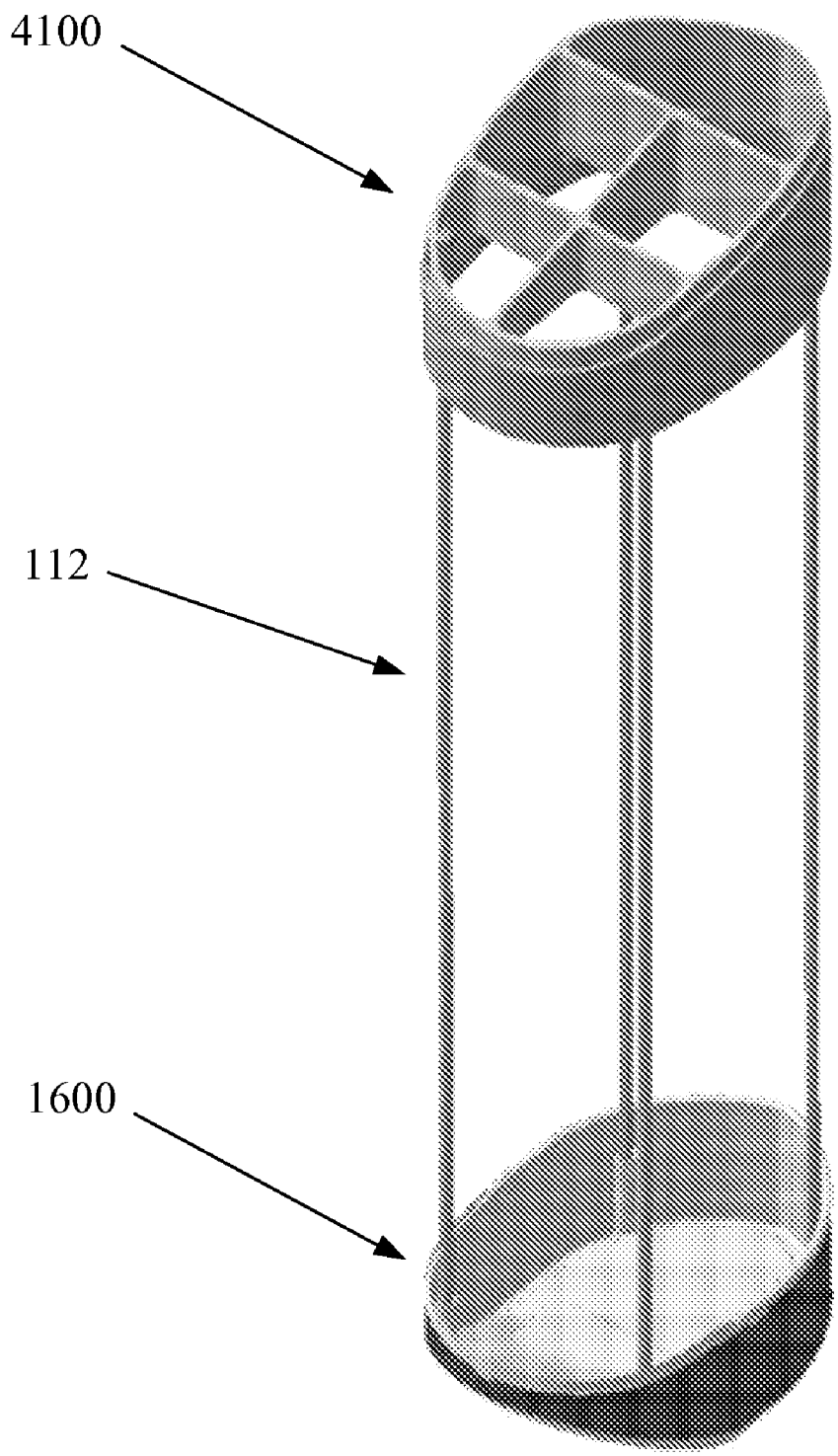
FIG. 51 illustrates a high level, perspective view of how the connecting poles join the collar-bracket-top support for the golf bag assembly.

FIG. 51 illustrates a high level, perspective view of how the connecting poles 112 join the collar-bracket-top support subassembly 4100 (bracket omitted for clarity) to the cuff-base member subassembly 1600. In one embodiment, the connecting poles 112 are, in part, composed of a flexible, high strength material, such as, graphite and/or fiberglass. The flexibility of the connecting poles 112 allows them to slightly bend during the assembly process in order to fit the top ends 116 of the connecting poles 112 into their respective pole receiving collar ends 2204 after the bottom ends 114 of the connecting poles 112 have been inserted into the pole receiving base ends 908. The connecting poles 112 should also provide sufficient rigidity along the axis parallel to the height of the golf bag so that it provides adequate extension force against the collar 108 and the base member 106 to prevent the top portion 105 of the golf bag body 102 from collapsing in on or folding into the bottom portion 103 of the golf bag body 102. In one embodiment, the connecting poles 112 are substantially similar in composition to conventional, flexible tent poles.

Assembly of the Modular Golf Bag

Assembly of one embodiment of the collapsible golf bag assembly 100 will now be described. As an initial matter, the flexible cuff 104 and the flexible collar 108 should already be fixedly attached to the golf bag body 102 via stitching, riveting, etc., as described above, in a prior assembly phase. The remaining assembly of structural components may then be manually assembled (e.g., tool-less assembly), e.g., without permanent fasters. For example, the base member 106 may be placed near the bottom portion 103 of the golf bag body 102 and secured to the cuff 104 by: abutting the upper cuff perimeter rim 308 of the cuff 104 to the outer perimeter lip 916 of the base member 106; engaging the base member's fitting ridges 902 with the corresponding fitting grooves 302 of the cuff 104; and engaging the base member's anti-rotation tabs 904 with the corresponding anti-rotation notches 304 found on the cuff 104. Note that, in one embodiment, the base member perimeter lip 916 may include a receiving groove that receives and/or engages the upper cuff perimeter rim 308.

Figure 50:
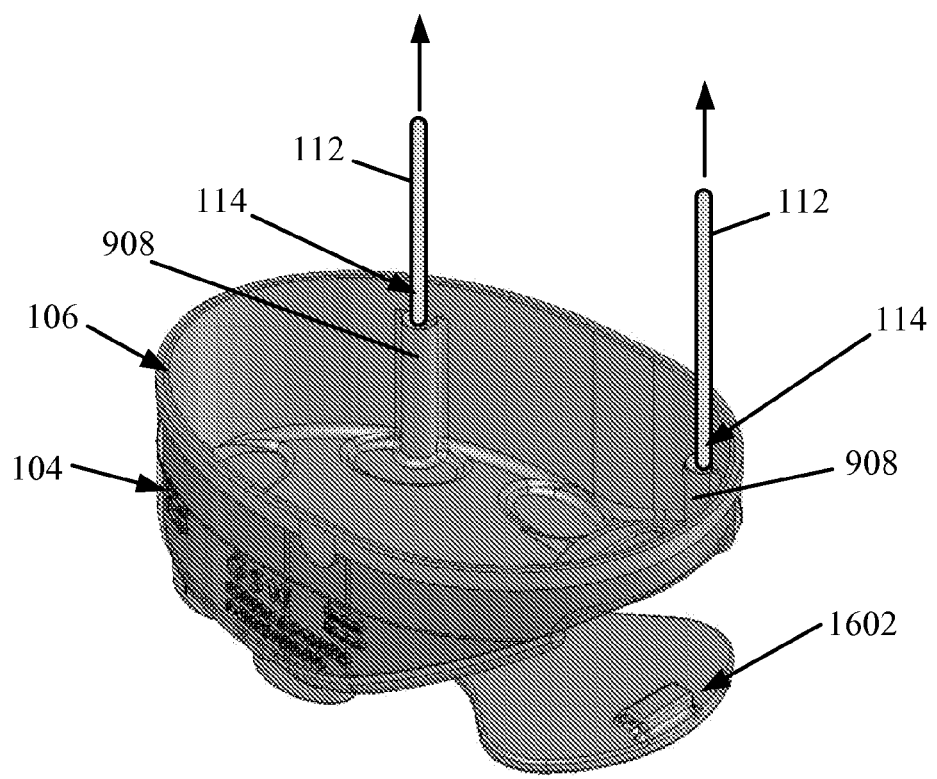
FIG. 50 illustrates a top perspective view of one embodiment of the cuff-base member subassembly for the golf bag assembly.

Once the base member 106 has been secured (at least temporarily or provisionally) to the cuff 104, the bottom portions 114 of the connecting poles 112 may be inserted into and secured by the plurality of pole receiving base ends 908 of the base member 106, as shown in FIG. 50. Next, the connecting poles 112 are slightly bent or flexed in order to direct the top ends 116 of the connecting poles 112 into their respective pole receiving collar ends 2204 belonging to the collar 108.

Once all the connecting poles 112 have been properly engaged with the pole receiving collar ends 2204 and pole receiving base ends 908 to connect the collar-bracket-top support subassembly 4100 to the cuff-base member subassembly 1600, an internal support structure (similar to the one in FIG. 51) for the golf bag body 102 results. The connecting poles 112 are thus extended in tension between the top subassembly 4100 and the lower subassembly 1600, thereby providing support to the golf bag body, and keeping the top subassembly 4100 and the lower subassembly 1600 secured in place. Such a design has the advantage of not having to rely on standard fasteners, such as screws, nails, etc., and associated tools to secure the components of the golf bag assembly 100 together. In this manner, the golf bags assembly (at least final assembly) may be performed completely manually and/or without tools or fasteners (e.g., tool-less assembly).

In the embodiment depicted in FIG. 51, four connecting poles 112 have been used. However, in other embodiments more or less connecting poles can be used to provide support between the top subassembly 4100 and the lower subassembly 1600. In yet other embodiments, the connecting poles 112 are absent altogether and another support means, for example, a collapsible, telescoping cylinder, or a tripod is used to stabilize and secure the top subassembly 4100 to the lower subassembly 1600 within the golf bag body 102.

Figure 52:
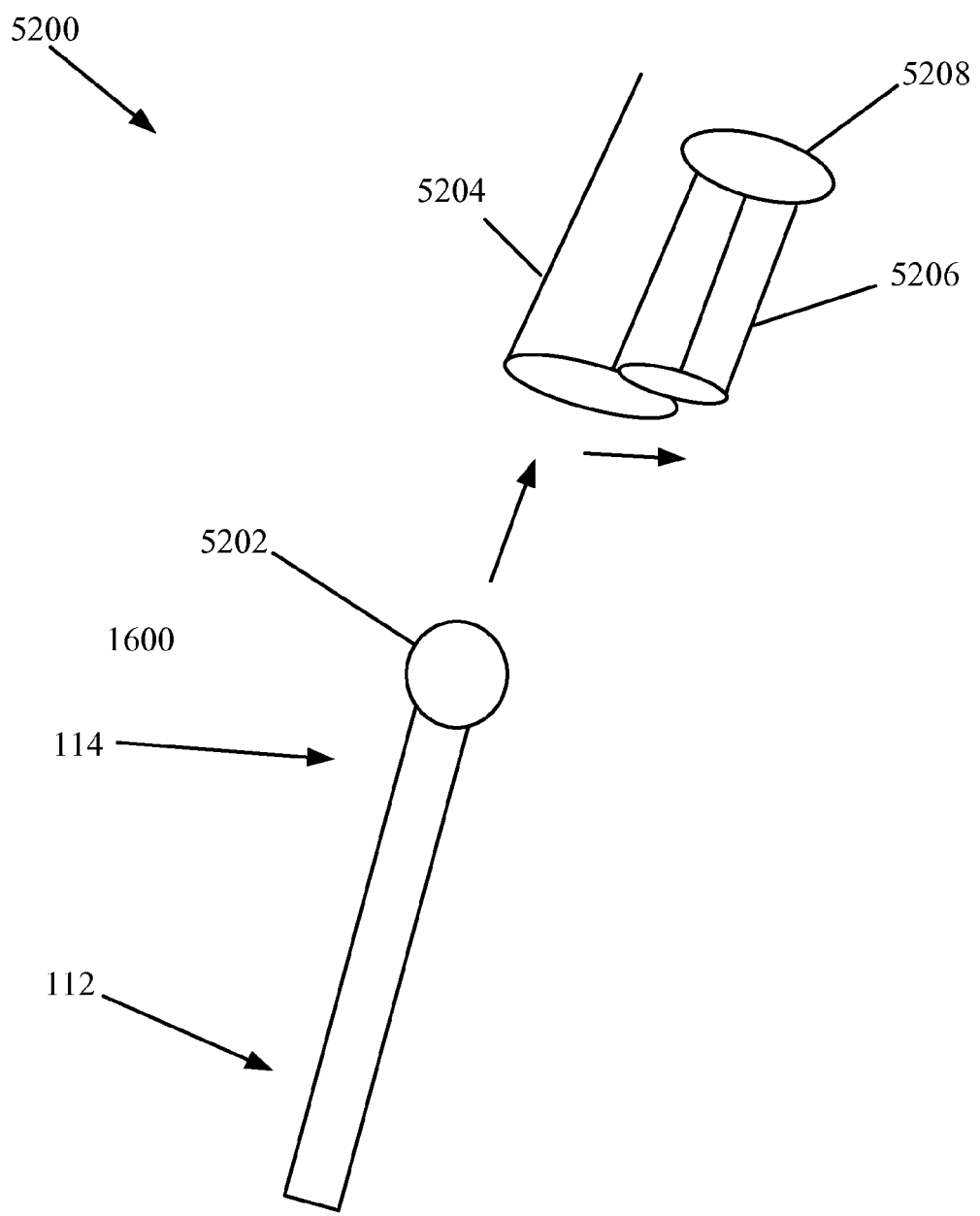
FIG. 52 illustrates a locking mechanism that may be used with the connecting poles for a golf bag assembly.

FIG. 52 illustrates how in some embodiments, the top and bottom end portions 116 and 114 of the connecting poles 112 may be locked into place within the pole receiving collar ends 2204 and pole receiving base ends 908, respectively, with the aid of a locking mechanism 5200. For example, the end portion 114 of a connecting pole 112 is shown having a bulbous tip 5202. The pole receiving base ends 908 and pole receiving collar ends 2204 may each be comprised by a pair of apertures shaped and positioned together like a figure-eight where one aperture is larger than the other. For example, the larger aperture, called the receiving aperture 5204, has a diameter that is larger than the diameter of the smaller aperture, called the locking aperture 5206. The locking aperture 5206 has a bulbous portion 5208 that substantially accommodates the diameter of the bulbous tip 5202 of the connecting pole end 114. The receiving aperture's diameter is large enough to accommodate the diameter of the bulbous tip 5202, and the locking aperture's diameter is large enough to accommodate the diameter of the connecting pole end 114, but not the bulbous tip 5202.

During assembly the connecting pole end 114, including the bulbous tip 5202, is inserted into the receiving aperture 5204 as indicated by the directional arrow. Then, the connecting pole end 114 is moved to the right (e.g., in the direction of the arrow) to snap the connecting pole end 114 into the chamber of the locking aperture 5206 and the bulbous tip 5202 into the matching bulbous portion 5208. Since the locking aperture 5206 has a diameter smaller than the bulbous tip 5202, the connecting pole 112 is locked in place because the diameter of the locking aperture 5206 restricts movement of the bulbous tip 5202 out of the locking aperture 5206.

According to one exemplary embodiment, a golf bag assembly (FIG. 1, 100) is disclosed, comprising: a golf bag body (FIG. 1, 102) having a top opening (FIG. 1, 105) and a bottom opening (FIG. 1, 103); a collar (FIG. 1, 108) coupled along an inner surface of the golf bag body adjacent to the top opening, the collar having a plurality of pole receiving collar ends (FIG. 22, 2204); a cuff (FIG. 1, 104) coupled along an inner surface of the golf bag body adjacent to the bottom opening; a base member (FIG. 1, 106) having a plurality of pole receiving base ends (FIG. 9, 914), the base member removeably coupled to the cuff; a top support (FIG. 1, 110) removeably coupled to the collar; and a plurality of connecting poles (FIG. 1, 112) that extend between the plurality of pole receiving base ends of the base member and the plurality of pole receiving collar ends of the collar thereby retaining the base member against the cuff and providing structural support to the golf bag body. The collar and the cuff of the golf bag assembly may be both flexible. In yet another embodiment, the golf bag assembly's collar and cuff are fixedly attached to the golf bag body. In yet another embodiment, the golf bag body, the cuff, and the collar are adapted to be substantially flattened for shipping. In other embodiments, the base member may include a flat support surface (FIG. 9, 910) and an angled support surface (FIG. 9, 906) that is angled relative to the flat support surface, wherein the flat support surface supports the golf bag assembly when the golf bag assembly is positioned in a substantially upright position, and the angled support surface supports the golf bag assembly when positioned at an angled position. The base member may include an outer perimeter lip (FIG. 9, 916) that abuts against and engages an upper cuff perimeter rim (FIG. 3, 308) of the cuff to restrict movement of the base member. In other embodiments, the top support includes an outer perimeter lip (FIG. 29, 2902) that abuts against an upper collar perimeter rim (FIG. 22, 2202) of the collar. The top support may include a plurality of clasps (FIG. 29, 2906) that engage with a lower collar perimeter portion (FIG. 22, 2206) of the collar to restrict movement of the top support. In another embodiment, the golf bag assembly's base member includes one or more anti-rotation tabs (FIG. 9, 904) that engage with one or more corresponding anti-rotation notches (FIG. 3, 304) of the cuff to prevent rotational movement of the base member relative to the cuff. The base member may include one or more fitting ridges (FIG. 9, 902) that engage with one or more fitting grooves (FIG. 3, 302) of the cuff to stabilize the base member relative to the cuff. In yet other embodiments, the top support includes a divider (FIG. 29, 2904) configured to separate a plurality of golf clubs into different sections.

According to one feature, the golf bag assembly may further comprise a stand assembly (FIG. 53, 5300) configured to support the golf bag assembly at an angle relative to a support surface (for example, the ground on which the golf bag may rest). In one embodiment, the stand assembly comprises: at least one stand leg (FIG. 53, 5302) for supporting the golf bag assembly at an angle; and an actuating mechanism (includes any one of or a combination of the following elements: FIG. 16, 1602; FIG. 53, 5304; FIG. 53, 5308; FIG. 53, 5314; FIG. 53, 5316; FIG. 53, 5310a, 5310b; FIG. 41, 4102; FIG. 36, 3600; and/or FIG. 36, 3604) coupled to the stand leg, the actuating mechanism causing to deploy the stand leg when the golf bag assembly is positioned at an angle, wherein the actuating mechanism includes separable modular pieces that are removeably coupled to each other along a length of the actuating mechanism. In another embodiment, the actuating mechanism may comprise: an elongated actuating member (including any one of or a combination of: FIG. 53, 5304; FIG. 53, 5308, FIG. 53, 5314; FIG. 53, 5316; FIG. 53, 5310a, 5310b) including a lever actuator (FIG. 53, 5304), a stand leg actuating rod (FIG. 53, 5310a or 5310b), and an actuator connector (FIG. 53, 5308) that couples a first end of the lever actuator to a first end of the stand leg actuating rod.

According to yet another exemplary embodiment, a collapsible golf bag (FIG. 1, 100) is disclosed that comprises: a collapsible golf bag body having a top portion (FIG. 1, 105) and a bottom portion (FIG. 1, 103); a collar fixedly coupled along an inner surface of the top portion of the golf bag body, the collar having a plurality of pole receiving collar ends; a base member adapted to removeably couple to the bottom portion of the golf bag body, the base member having a plurality of pole receiving base ends; and a plurality of connecting poles that extend between the plurality of pole receiving base ends of the base member and the plurality of pole receiving collar ends of the collar, the connecting poles providing an extension force in an outward direction between the collar and the base member to provide structural rigidity to the golf bag body. In one embodiment, the collapsible golf bag may further comprise: a top support configured to removeably couple to the collar, the top support providing structural rigidity to the top portion of the golf bag body; and a cuff fixedly coupled along an inner surface of the bottom portion of the golf bag body, wherein the base member is configured to removeably couple to the cuff, and the base member provides structural rigidity to the bottom portion of the golf bag body. The cuff and the collar are flexible. In another embodiment, the top support includes a divider that comprises a plurality of sectional separators that allow separating golf clubs. In another embodiment, the golf bag body, the cuff, and the collar are adapted to be substantially flattened for shipping. In yet other embodiments, the base member includes an outer perimeter lip that abuts against and engages an upper cuff perimeter rim of the cuff to restrict movement of the base member, the top support includes an outer perimeter lip that abuts against an upper collar perimeter rim of the collar, and the top support includes a plurality of clasps that engage with a lower collar perimeter portion of the collar to restrict movement of the top support. In yet another embodiment, the base member includes one or more anti-rotation tabs that engage with one or more ant-rotation notches of the cuff to prevent rotational movement of the base member relative to the cuff, and the base member includes one or more fitting ridges that engage with one or more fitting grooves of the cuff to stabilize the base member relative to the cuff.

According to yet another exemplary embodiment, a kit (FIG. 73, 7300) for assembling a golf bag is disclosed, the kit comprising: a collapsible golf bag body having a top portion and a bottom portion; a collar fixedly coupled along an inner surface of the top portion of the golf bag body, the collar having a plurality of pole receiving collar ends; a base member adapted to removeably couple to the bottom portion of the golf bag body, the base member having a plurality of pole receiving base ends; and a plurality of connecting poles that extend between the plurality of pole receiving base ends of the base member and the plurality of pole receiving collar ends of the collar, the connecting poles providing an extension force in an outward direction between the collar and the base member to provide structural rigidity to the golf bag body. In other embodiment, the kit may further comprise: a top support configured to removeably couple to the collar, the top support providing structural rigidity to the top portion of the golf bag body; and a cuff fixedly coupled along an inner surface of the bottom portion of the golf bag body, wherein the base member is configured to removeably couple to the cuff, and the base member provides structural rigidity to the bottom portion of the golf bag body. In other embodiments, the cuff and the collar are flexible. The top support of the kit may include a divider that comprises a plurality of sectional separators that allow separating golf clubs. In another embodiment, the golf bag body, the cuff, and the collar are adapted to be substantially flattened for shipping. In yet another embodiment of the kit, the base member includes an outer perimeter lip that abuts against and engages an upper cuff perimeter rim of the cuff to restrict movement of the base member, the top support includes an outer perimeter lip that abuts against an upper collar perimeter rim of the collar, and the top support includes a plurality of clasps that engage with a lower collar perimeter portion of the collar to restrict movement of the top support. In yet another embodiment of the kit, the base member includes one or more anti-rotation tabs that engage with one or more ant-rotation notches of the cuff to prevent rotational movement of the base member relative to the cuff, and the base member includes one or more fitting ridges that engage with one or more fitting grooves of the cuff to stabilize the base member relative to the cuff. In yet another embodiment of the kit, the golf bag body, the top support, the base member, and the connecting poles are packaged within a clamshell package.

Also disclosed herein is a method of assembling a golf bag, the method comprising: receiving a golf bag body having a flexible collar fixedly attached to a top portion of the golf bag body, and a flexible cuff attached to a bottom portion of the golf bag body, the golf bag body adapted to be compressed to occupy less volume during shipping; inserting a base member into the golf bag body to removeably couple the base member to the cuff, the base member providing rigidity to the bottom portion of the golf bag body; inserting a plurality of connecting poles into the golf bag body, the connecting poles each having a top end and a bottom end; removeably coupling each bottom end of the plurality of connecting poles to a corresponding pole receiving base end of the base member; removeably coupling each top end of the plurality of connecting poles to a corresponding pole receiving collar end of the collar by temporarily bending the connecting poles to secure the top end of each of the plurality of connecting poles; and/or removeably coupling a top support to the collar, the top support providing rigidity to the top portion of the golf bag body. In one embodiment of the method, the connecting poles provide an extension force to push the collar and base member outward in opposite directions to provide the golf bag body with structural support. In another embodiment of the method, the method comprises the step of removeably coupling a stand assembly to the top portion of the golf bag body.

Golf Bag Kickstand Assembly

FIGS. 53-55 illustrate various views (top perspective, side, and front) of one embodiment of the golf bag assembly 100 featuring a novel kickstand assembly 5300, also referred to as a stand assembly 5300. The stand assembly 5300 helps support the golf bag when positioned at an angle. For example, the golf bag assembly 100 may include a bendable kickstand lever 1602, one or more stand legs 5302, a lever actuator 5304, an actuator connecting piece 5308, and a pair of stand leg actuating rods 5310a, 5310b. (For clarity, the connecting poles 112 of the golf bag assembly 100 have been omitted from FIGS. 53-55). When the golf bag assembly 100 is positioned to rest at an angle, the bendable kickstand lever 1602 in turn bends to raise the lever actuator 5304 toward the actuator slot 914. In response, the pair of stand leg actuating rods 5310a, 5310b deploy the stand legs 5302.

Figure 56:
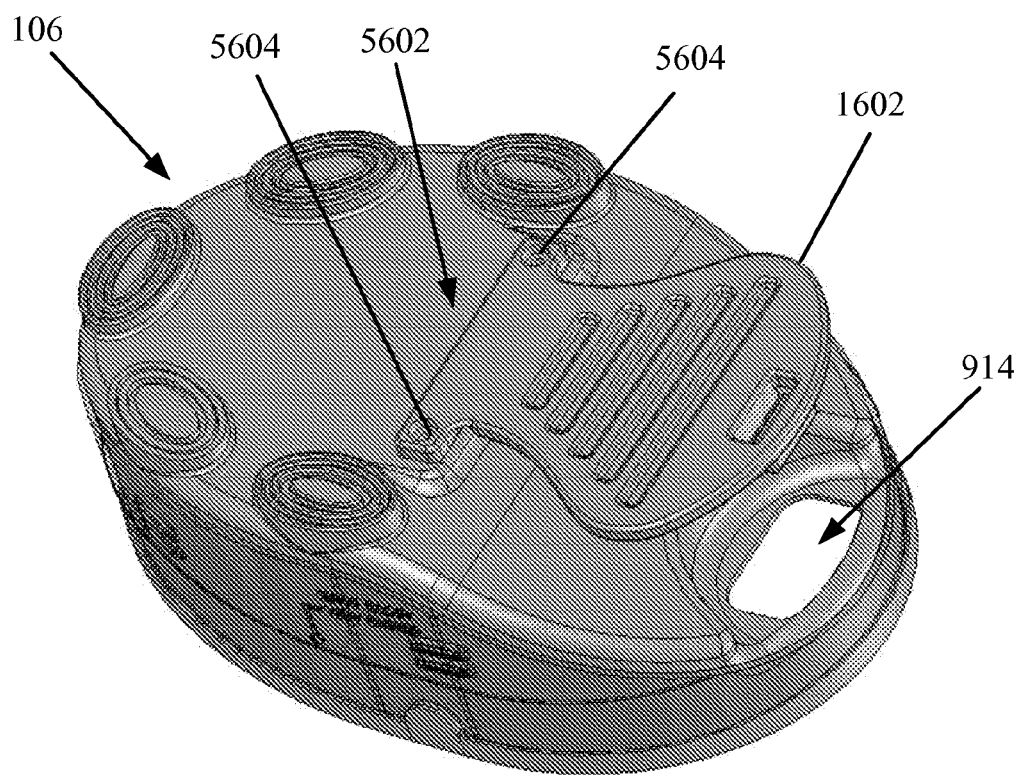
FIG. 56 illustrates the bendable kickstand lever attached to the cuff-base member subassembly of a golf bag.

As shown in FIG. 56, the bendable kickstand lever 1602 is attached to the bottom surface 5602 of the base member 106 at one or more connection points 5604. The bendable kickstand lever 1602 may be attached to the base member 106 at the one or more connection points 5604 using a variety of methods. For example, in one embodiment the bendable kickstand lever 1602 snaps into place at the connection points 5604 without the use of fasteners. In other embodiments, fasteners, such as screws or the like may be used to attach the bendable kickstand lever 1602 to the bottom surface 5602 of the base member 106 at the connection points 5604.

Figure 57:
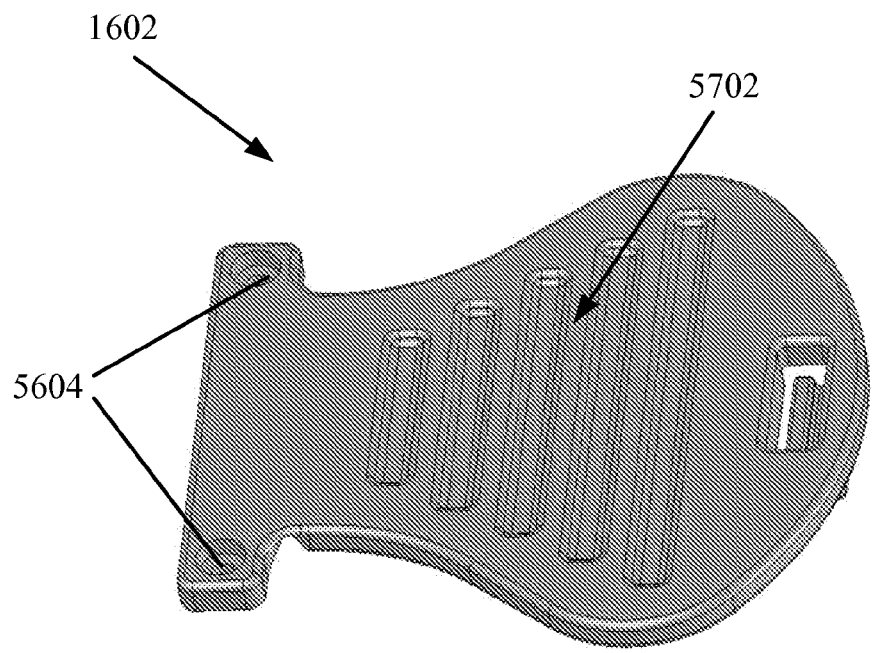
FIGS. 57-59 illustrate various views of the bendable kickstand lever for a golf bag kickstand.
Figure 58:
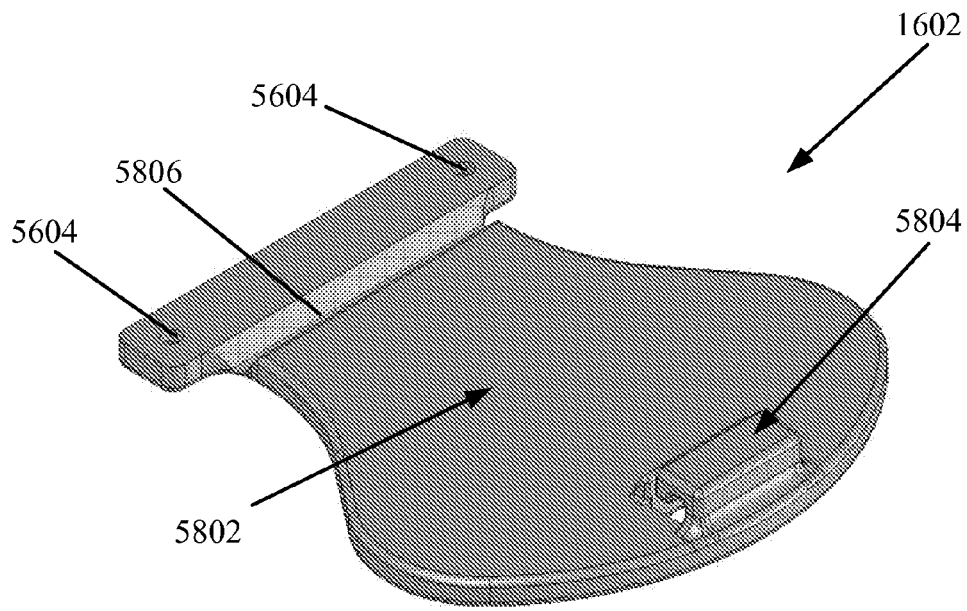
Figure 59:
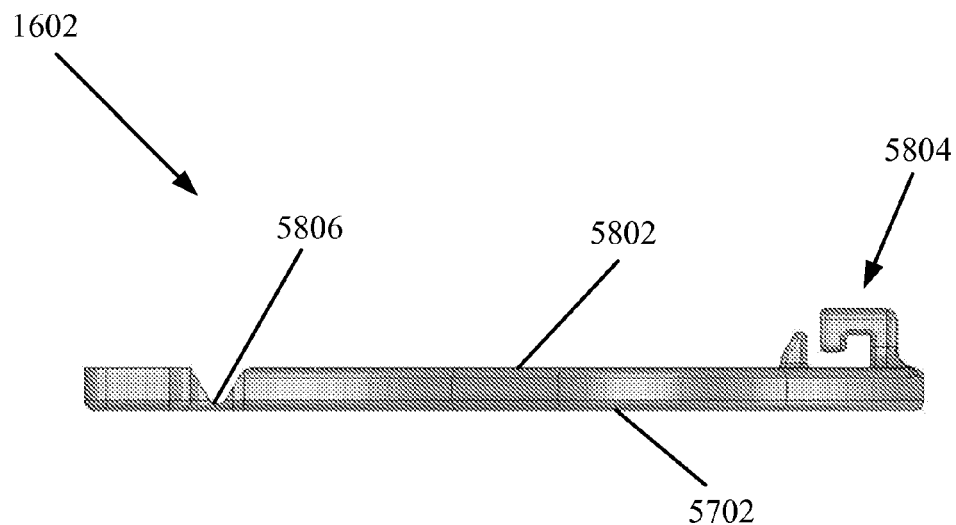
Figure 60:
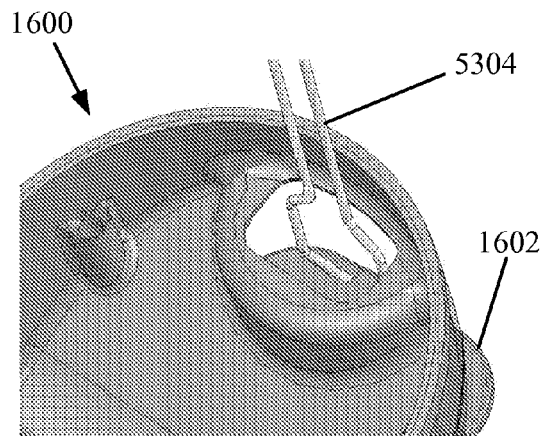
FIGS. 60-63 illustrate various views of the cuff-base member subassembly featuring the bendable kickstand lever, the first actuator, and the second actuator.
Figure 61:
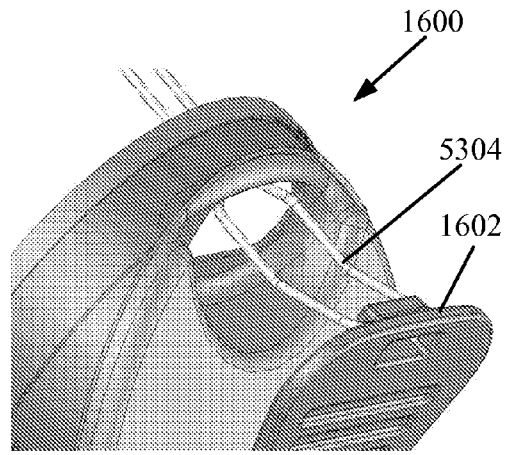
Figure 62:
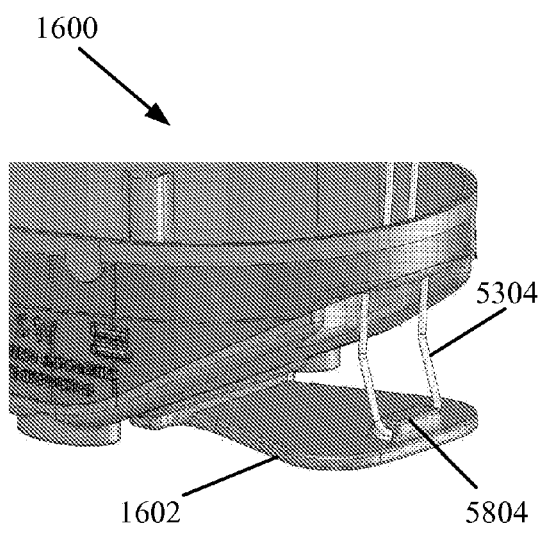
Figure 63:
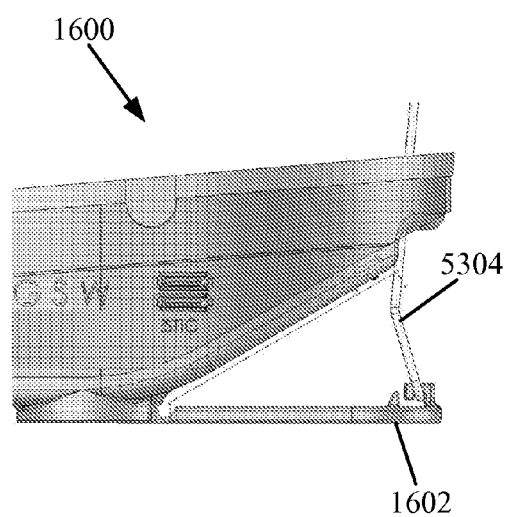

As illustrated in FIGS. 57-59, the bendable kickstand lever 1602 is a bendable flap composed of a relatively flexible material, such as, rubber or plastic that is capable of bending when pressure is exerted on the bottom surface 5702 of the bendable kickstand lever 1602. For example, if the golf bag is tilted from a standing upright position to an angled position, the bendable kickstand lever 1602 bends to an angle substantially parallel to the angled support surface 906 of the base member 106. In one embodiment, the bendable kickstand lever 1602 bends along a flex line bend line 5806. The bendable kickstand lever 1602 may also partially assist the golf bag to rest at an upright position by acting as a support in addition to the flat support surface. The top surface 5802 of the bendable kickstand lever 1602 may also include an anchor 5804 that is coupled to one end of the lever actuator 5304.

FIGS. 60-63 illustrate various views (top perspective, bottom perspective, side perspective, and side) of the cuff-base member subassembly 1600 featuring the bendable kickstand lever 1602 and the lever actuator 5304. The lever actuators 5304 may be comprised of a substantially rigid material such has plastic or metal. In one embodiment, the lever actuator 5304 may be comprised of spring steel. In the embodiments shown in FIGS. 60-63, the lever actuator 5304 is a rod substantially shaped in a "U" formation. In other embodiments, the lever actuator 5304 may be another shape, or may be a flat bar anchored to the bendable kickstand lever 1602.

In one embodiment, one end of the lever actuator 5304 is coupled to the lower portion 5314 of the actuator connecting piece 5308, and the other end of the lever actuator 5304 extends through the actuator slot 914 (see FIG. 56) of the base member 106 to couple to the anchor 5804 of the bendable kickstand lever 1602. If the golf bag is tilted from an upright position to an angled position, the bendable kickstand lever 5804 begins to bend causing the anchor 5804 to depress in toward the actuator slot 914. Since the lever actuator 5304 is connected to the anchor 5804, the lever actuator 5304 begins to rise up toward the actuator slot 914. This in turn causes the actuator connecting piece 5308 to rise so as to cause the pair of stand leg actuating rods 5310a, 5310b to push out on and deploy the stand legs 5302 to which each actuating rod 5310a, 5310b is attached.

Figure 80:
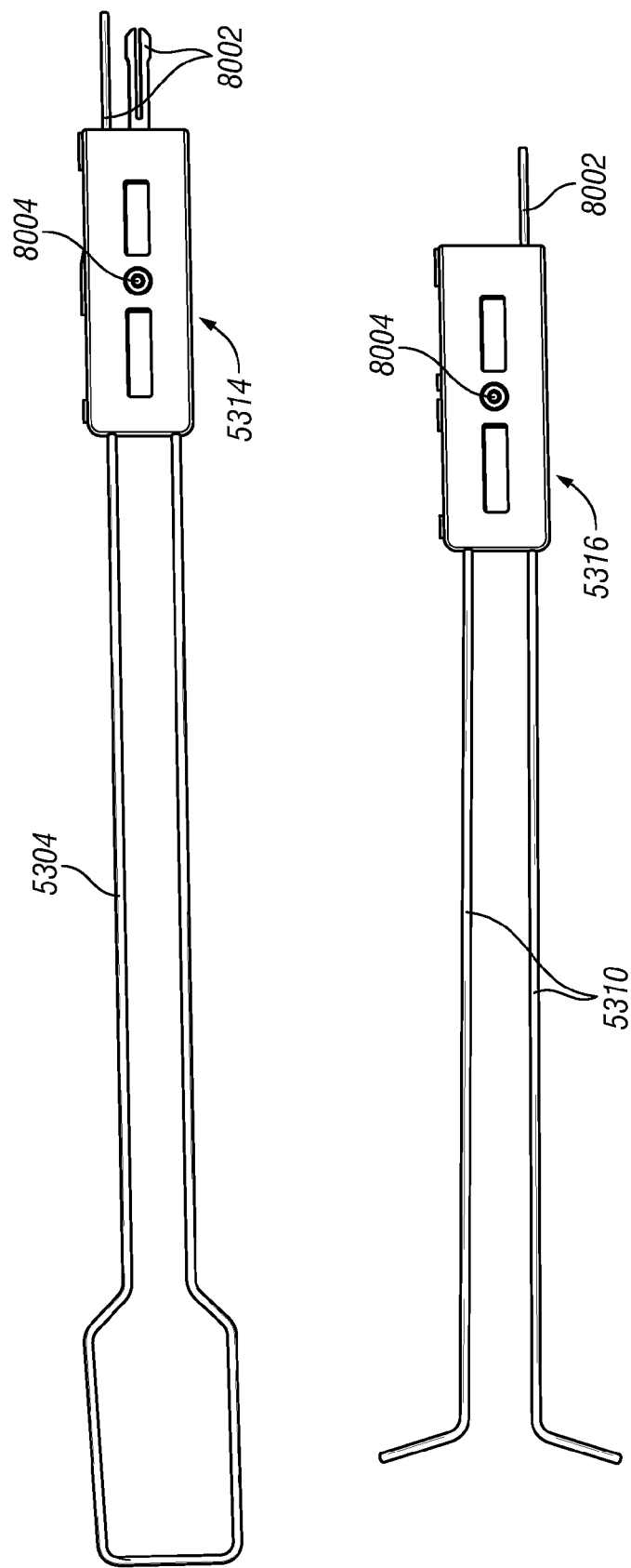
FIGS. 80-82 illustrate the modular nature of the actuator connecting piece and its "open" and "closed" configurations.
Figure 81:
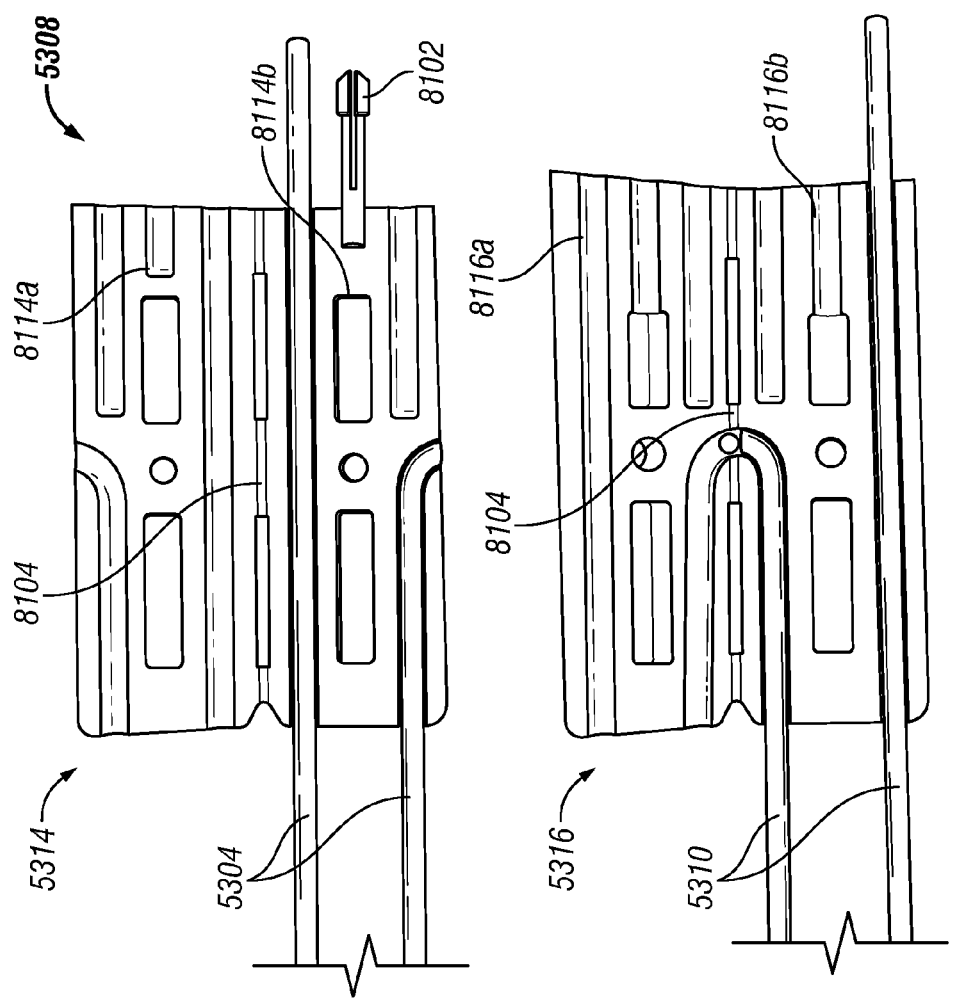
Figure 82:
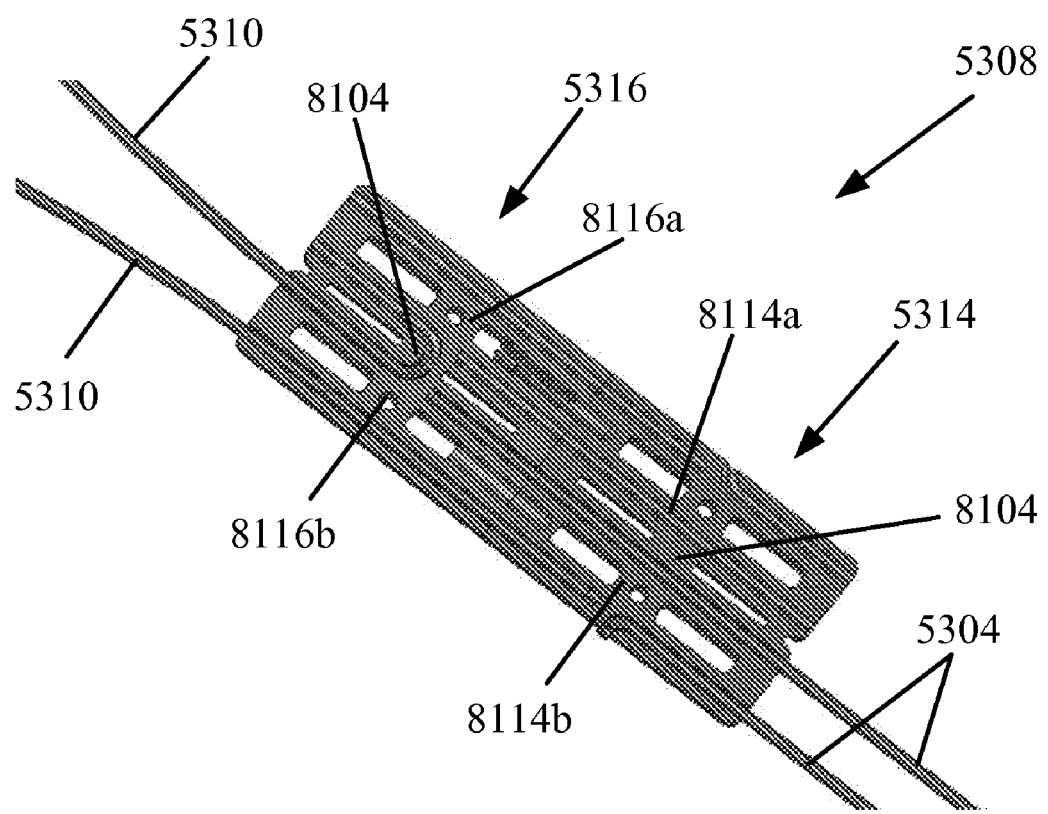

FIGS. 80-82 illustrate the modular nature of the actuator connecting piece 5308 and its "open" and "closed" configurations. For example, the actuator connecting piece 5308 may be comprised of two separate parts, specifically, the lower portion 5314 and the upper portion 5316 of the actuator connecting piece 5308 that mate together via connecting clasps and bars 8002. Having two separate portions 5314 and 5316 that comprise the actuator connecting piece 5308 allows for a more compact package that reduces shipping volume and associated expenses. As described above, the lower portion 5314 couples to one end of the lever actuator 5304 and the upper portion 5316 couples to one end of each of the stand leg actuating rods 5310a, 5310b. The actuator connecting piece 5308 may be composed of plastic, metal, polypropylene, or any other sufficiently rigid material.

FIGS. 81 and 82 illustrate the actuator connecting piece 5308 in an "open configuration" that allows the lever actuator 5304 and the pair of leg stand actuating rods 5310a, 5310b to be inserted into and locked into place within the actuator connecting piece 5308. The lower portion 5314 of the actuator connecting piece 5308 has two sides 8114a and 8114b that open and close about a hinge 8104. The two sides 8114a and 8114b may either be snapped shut without the use of a fastener. In some embodiments a nut and screw 8004 (see FIG. 80) on the outside of the lower portion 5314 is used to keep the two sides 8114a and 8114b closed to withhold one end of the lever actuator 5304 inside. As shown in FIGS. 81 and 82, one end of the lever actuator 5304 may be curved to help secure it within a corresponding recess in the lower portion 5316 of the actuator connecting piece 5308.

Similarly, the upper portion 5316 of the actuator connecting piece 5308 has two sides 8116a and 8116b that open and close about a hinge 8104. The two sides 8116a and 8116b may either be snapped shut without the use of a fastener. In some embodiments a nut and screw 8004 (see FIG. 80) on the outside of the upper portion 5316 is used to keep the two sides 8116a and 8116b closed to withhold one side of the lever actuator 5304 inside. As shown in FIGS. 81 and 82, one end of the stand leg actuating rods 5310 may be curved to help secure it within a corresponding recess in the upper portion 5316 of the actuator connecting piece 5308.

Figure 64:
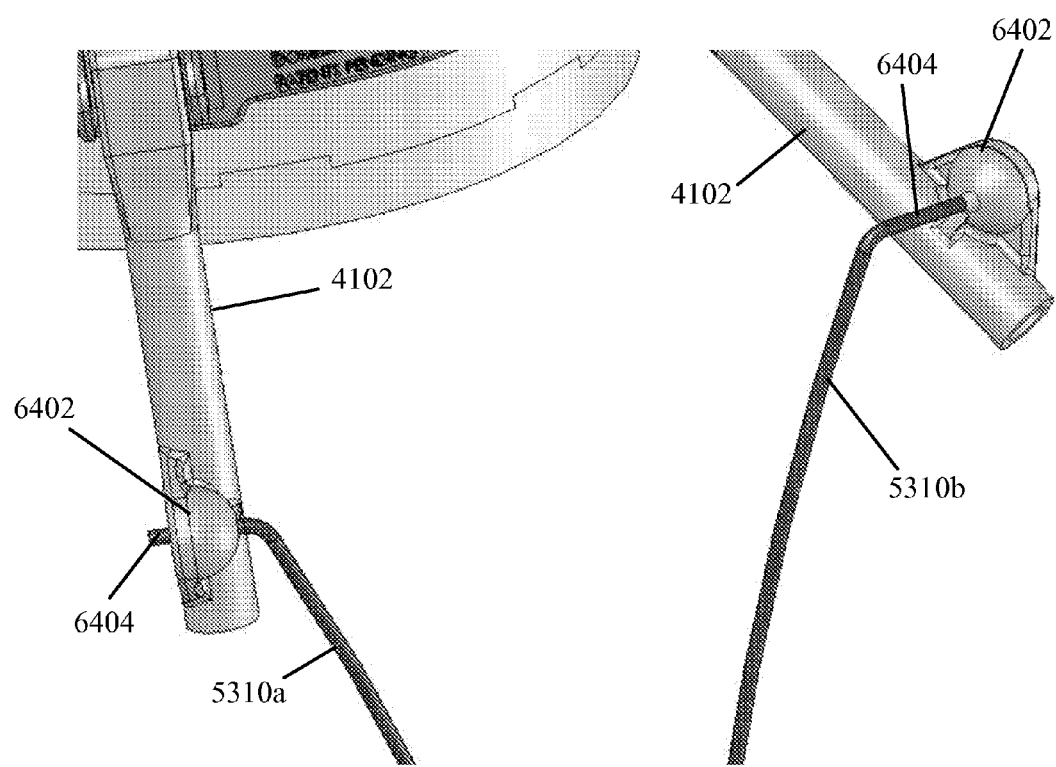
FIG. 64 illustrates the stand leg receivers and the top ends of the first and second pairs of the stand leg actuating rods.

FIG. 64 illustrates the stand leg receivers 4102 and the top ends 6404 of the stand leg actuating rods 5310a, 5310b. The top ends 6404 of the stand leg actuating rods 5310a, 5310b mate with the corresponding connector portions 6402 of the stand leg receivers 4102. In one embodiment, the top ends of the stand leg actuating rods 5310a, 5310b have an "L" shape to couple with the connector portions 6402. In other embodiments, the top ends 6404 may be coupled to the connector portions 6402 by other means.

Figure 65:
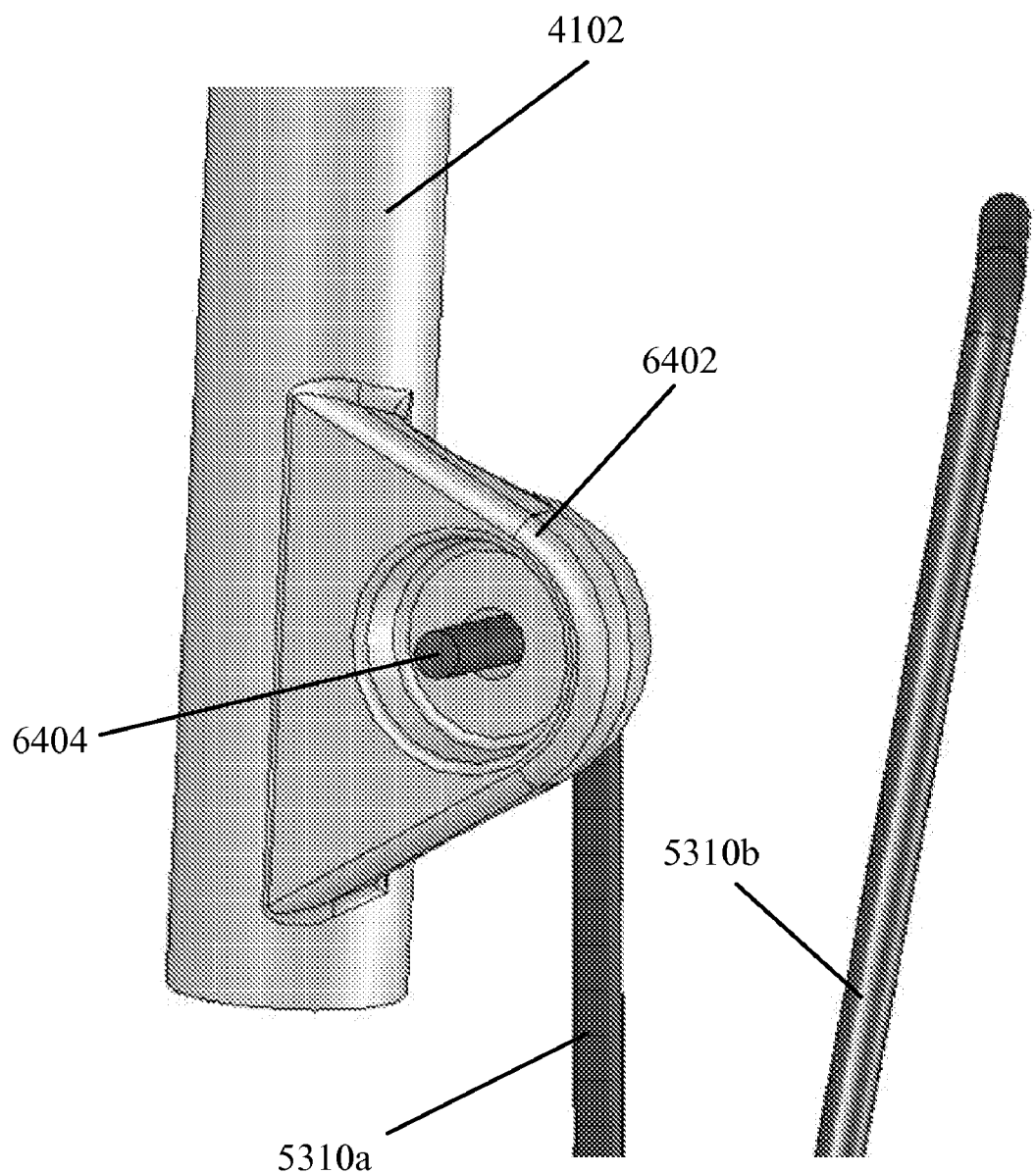
FIG. 65 illustrates a close-up view of the stand leg receiver connector of the stand leg actuating rod coupled to the connector receiving portion.
Figure 66:
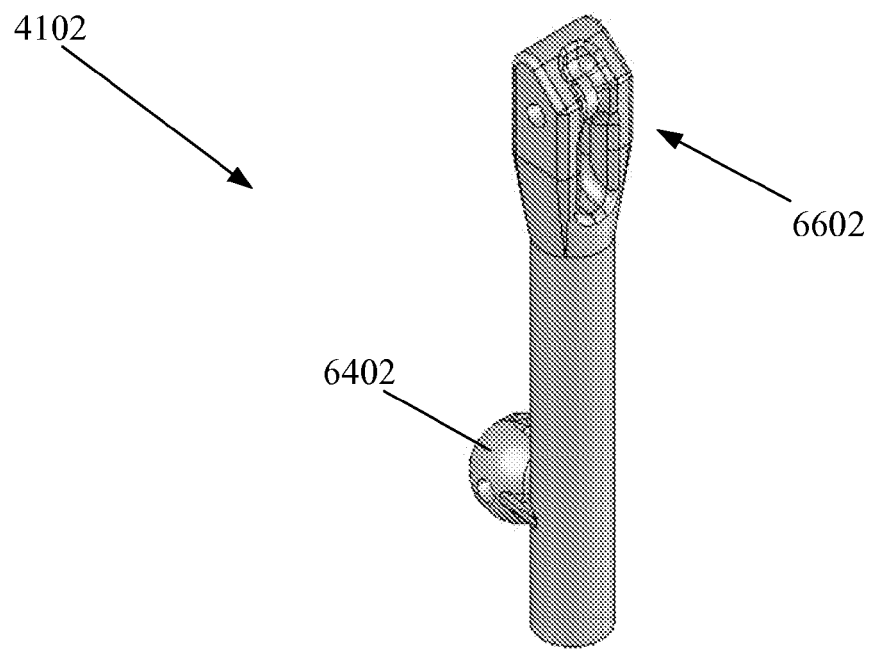
Figure 67:
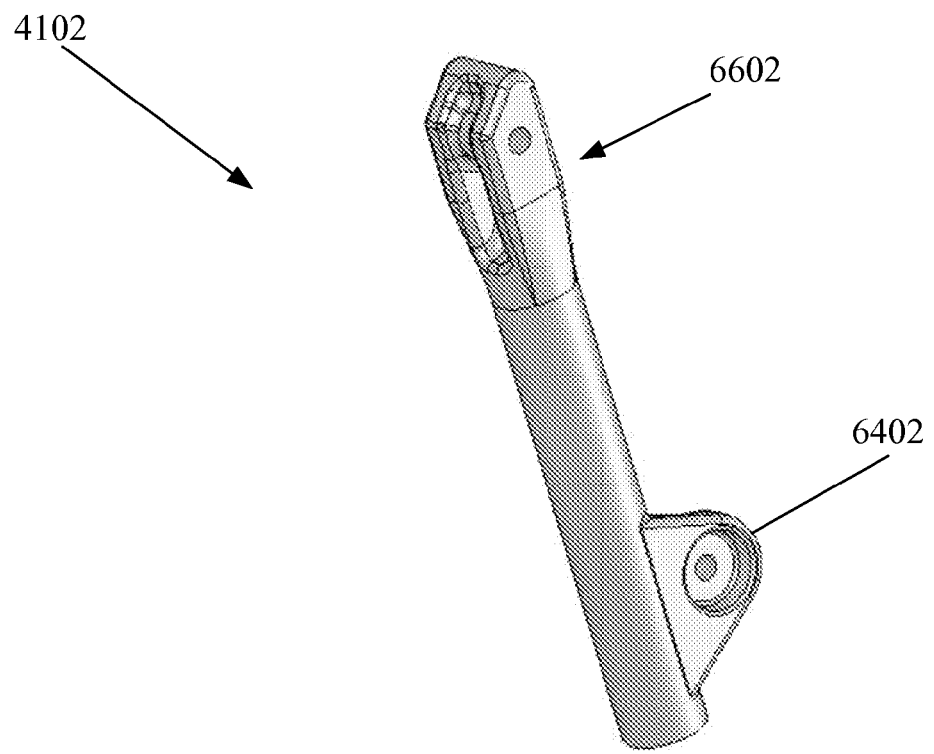

FIG. 65 illustrates a close-up view of the top end 6404 of a stand leg actuating rod 5310a coupled to the connector portion 6402. In the embodiment shown, the top end 6404 of the stand leg actuating rod 5310a is bent into an "L" shape that can be inserted into the connector portion 6402 without the use of any fasteners. The outward tension force of the pair of stand leg actuating rods 5310a and 5310b keeps the top ends 6404 of the rods 5310a, 5310b in place within the receiving hole of the connector portion 6402 so that it does not easily dislodge.

FIGS. 66-72 illustrate various views of one embodiment of the stand leg receiver 4102. For example, the stand leg receiver 4102 may have a connector portion 6402, and a hinge 6602 that couples with the leg bracket hinge 3604 (see FIG. 36) of the leg bracket 3600. In one embodiment, the hinge 6602 may couple with the leg bracket hinge 3604 without the use of a fastener such as a screw, and instead may snap in place into a corresponding receiving region of the leg bracket hinge 3604. In other embodiments, a rod may pass through an aperture located through the leg bracket hinge 3604 and the hinge 6602. In yet other embodiments, the rod passing through the apertures of the hinge 6602 and leg bracket hinge 3604 may require a fastener on one end of the rod to secure the rod in place.

The stand leg receiver 4102 may also feature a hollow interior 7202 with an opening at the stand leg receiver's bottom end (opposite end of the hinge 6602) designed to receive the top end of a stand leg 5302. The hollow interior 7202 may be threaded to allow a corresponding threaded portion of the top end of the stand leg 5302 to be screwed into the hollow interior 7202. In other embodiments, the hollow interior 7202 may be smooth so that it secures the stand leg 5302 merely by friction. In yet other embodiments, the top end of the stand leg 5302 may have a spring loaded ball that is first depressed before the top end of the stand leg 5302 is inserted into the hollow interior 7202. Then, once inserted, the stand leg 5302 is pushed into the shaft of the hollow interior 7202 until the spring loaded ball snaps into place with a corresponding receiving portion within the stand leg receiver 4102 designed to lock the spring loaded ball into place.

Figure 83:
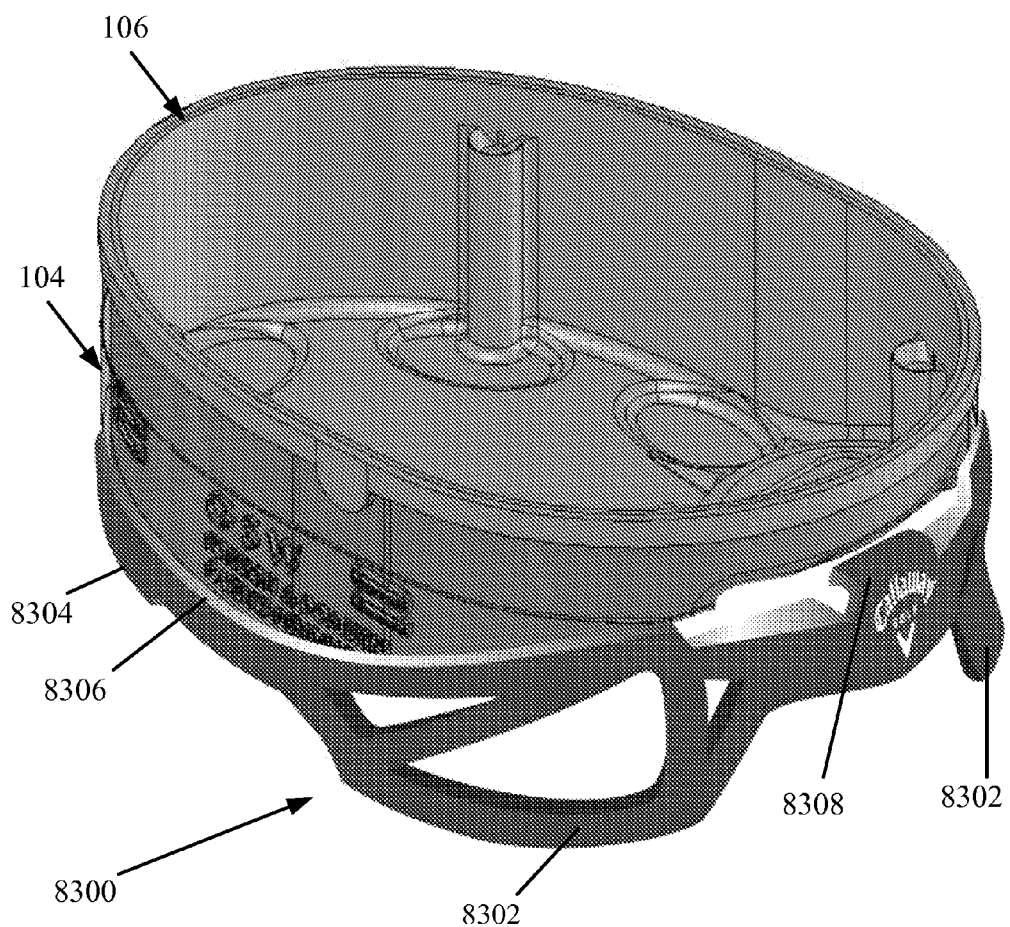
FIGS. 83-84 illustrate top and bottom perspective views, respectively, of one embodiment of an optional base member pedestal that may be coupled to the bottom side of the base member.
Figure 84:
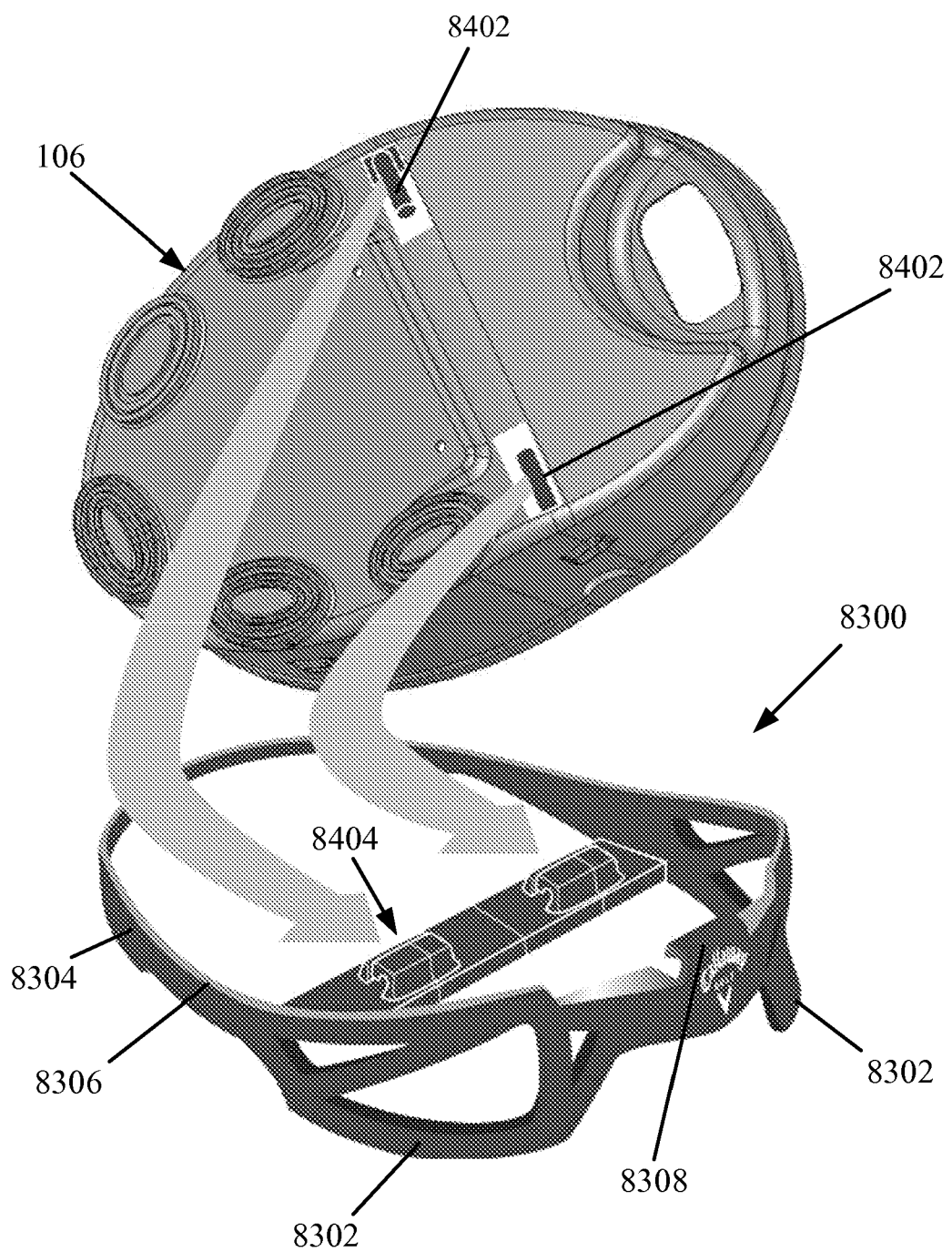

FIGS. 83-84 illustrate top and bottom perspective views, respectively, of one embodiment of an optional base member pedestal 8300 that may be coupled to the bottom side of the base member 106. The base member pedestal 8300 has a front bottom portion 8302 and a back bottom portion 8304 on which the base member pedestal 8300 may rest. The pedestal 8300 defines a perimeter band 8306 that is wider in diameter than the bottom portion of the golf bag (e.g., wider than the base member 106 and/or cuff 104). This allows the golf bag to swivel within the base member pedestal 8300 between an upright and angled/tilted position. Moreover, in this embodiment the base member 106 does not have bendable kickstand lever 1602 (see FIG. 16). Instead, the base member pedestal 8300 has an anchor 8308 that attaches to one end of the lever actuator 5304, similar to the anchor 5804 of the bendable kickstand lever 1602. In the embodiment shown in FIGS. 83-85 the lever actuator 5304 does not pass through the actuator slot 914 of the base member, but rather passes external to the base member 106 as it connects to the anchor 8308 on the base member pedestal 8300.

Figure 85:
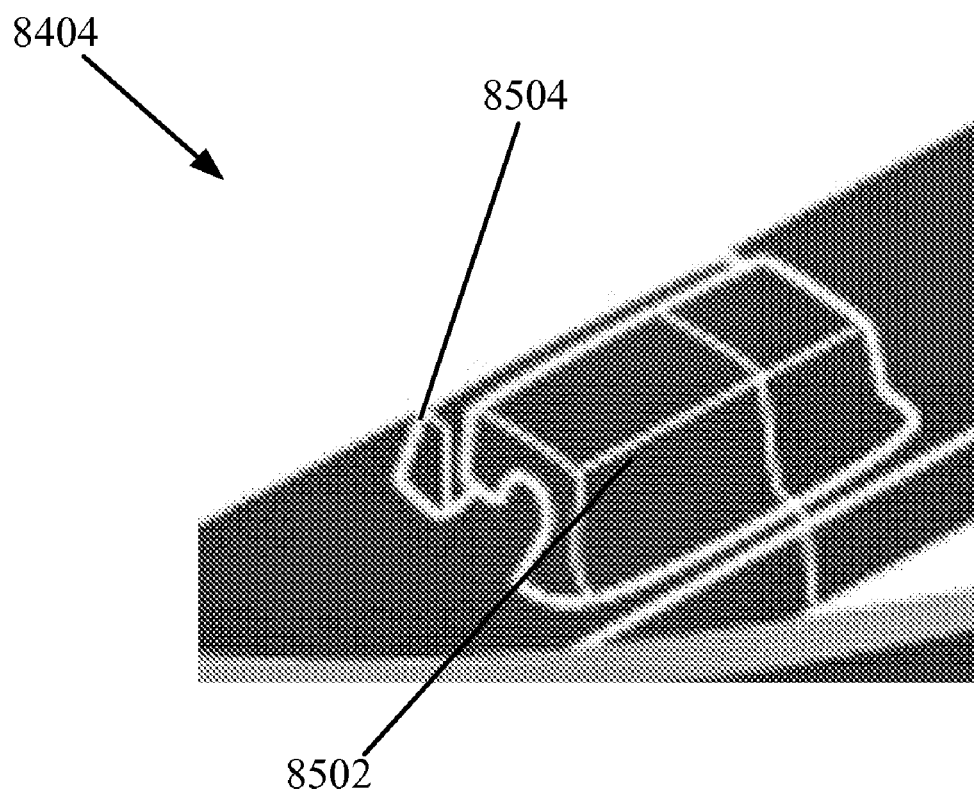
FIG. 85 illustrates the pin receivers of the base member pedestal.

FIG. 84 illustrates a bottom perspective view of the base member 106 featuring one or more pins 8402 that couple to one or more corresponding pin receivers 8404 located on the base member pedestal 8300. As illustrated in FIG. 85, the pin receivers 8404 feature a hook portion 8502 and a blocking member 8504 that creates a small aperture between the two. The base member 106 couples to the base member pedestal 8300 by pushing the base member pins 8402 past the apertures located between the hook portions 8502 and blocking members 8504. Once the pins 8402 are engaged within the pin receivers 8404, the base member pedestal 8300 is secured to the base member 106. The pin 8402 and pin receiver 8404 components secure the two without requiring the use of fasteners which assists in expedited and easy assembly.

The base member pedestal 8300 may still allow for the automatic deployment of the stand legs 5302 of the kickstand assembly 5300. Since the base member pedestal 8300 is larger in diameter than the base member 106, the bottom portion of the golf bag (e.g., base member 106 and/or cuff 104) is still free to pivot, swivel, or rock about the base member pins 8402 thereby allowing the base member 106 (and corresponding golf bag assembly 110) to tilt at an angle. As the base member 106 tilts with respect to the base member pedestal 8300, the lever actuator 5304 is pushed upward, causing the attached actuator connecting piece 5308, the pair of stand leg actuating rods 5310a, 5310b, and the stand legs 5302 to rise outward as well. As a result, the one or more stand legs 5302 are deployed in a fashion similar to that described above.

Referring to FIGS. 53-55, the bendable kickstand lever 1602, the lever actuator 5304, the actuating connecting piece 5308, the stand leg actuating rods 5310a, 5310b, the leg stand receivers 4102, and the stand legs 5302 all work together to automatically deploy the stand legs 5302 is the direction of the dashed arrow when the golf bag is tilted at an angle so that it rests on its angled support surface 906. When the golf bag is tilted at an angle, the bendable kickstand lever 1602 is depressed inward and upward causing the lever actuator 5304 to move up toward the actuator slot 914. This in turn raises the actuator connecting piece 5308 to which the lever actuator 5304 is connected, which correspondingly causes the stand leg actuating rods 5310a, 5310b to be raised in response. If the top ends 6404 of the stand leg actuating rods 5310a, 5310b are engaged with the connector portions 6402 of the stand leg receivers 4102 (e.g., in FIGS. 54-55 rod 5310b is not engaged) then stand leg receivers 4102 are also pushed up and outward in response. Since the stand legs 5302 are connected to the stand leg receivers 4102, the stand legs 5302 are deployed outward and serve as an angle support mechanism for the golf bag.

Thus, the various components that may comprise the stand assembly 5300, such as the bendable kickstand lever 1602, the one or more stand legs 5302, the lever actuator 5304, the lower portion 5314 of the actuator connecting piece 5308, the upper portion 5316 of the actuator connecting piece 5308, the stand leg actuating rods 5310*a*, 5310*b*, the stand leg receivers 4102, and the leg bracket 3600 may be shipped as separate individual pieces that can be assembled together to form the stand assembly 5300. As a result, packaging and shipment of the stand assembly 5300 may be more cost efficient because the components can be packed together into a smaller package that occupies less volume. Moreover, manufacturing costs may be lowered since final assembly of the golf bag may take place by the user or at another final assembly plant. Also, to further promote the modular design of the stand assembly 5300, the stand legs 5302 may each be composed of two separable pieces that couple together to form one long stand leg each. This again may help decrease the overall length of the package in which the golf bag assembly 100 and/or stand assembly 5300 is shipped in if the two pieces of the stand leg are separated and shipped in such a manner.

According to one exemplary embodiment, a kickstand assembly (FIG. 53, 5300) for a golf bag (FIG. 1, 100) is disclosed, the kickstand assembly comprising: at least one stand leg for supporting the golf bag at an angle; an actuating mechanism coupled to the stand leg, the actuating mechanism causing to deploy the stand leg when the golf bag is positioned at an angle, wherein the actuating mechanism includes separable modular pieces that are removeably coupled to each other along a length of the actuating mechanism. The actuating mechanism of the kickstand assembly may also comprise: an elongated actuating member including a lever actuator, a stand leg actuating rod, and an actuator connector that couples a first end of the lever actuator to a first end of the stand leg actuating rod. In one embodiment, the actuator connector comprises: a first portion (FIG. 53, 5314) of the actuator connector coupled to the lever actuator; and a second portion (FIG. 53, 5316) of the actuator connector coupled to the stand leg actuating rod, wherein a detachable fastening mechanism (FIG. 80, 8002) couples the first portion of the actuator connector to the second portion of the actuator connector. In another embodiment of the kickstand assembly, the lever actuator, the first portion of the actuator connector, the second portion of the actuator connector, and the stand leg actuating rod couple together substantially using snap-on fastening techniques. "Snap-on fastening techniques" generally refers to those types of fastening mechanisms/techniques that can be substantially be done by hand and does not require the need for tools, such as, screwdrivers, hammers, etc. The first portion of the actuator connector may be configured to open (such as the "open configuration" shown in FIG. 81) about a hinge (FIG. 81, 8104) to receive the lever actuator, and the second portion of the actuator connector is configured to open (such as the "open configuration" shown in FIG. 81) about another hinge (FIG. 81, 8104) to receive the stand leg actuating rod. In yet another embodiment the kickstand assembly may further comprise: at least one stand leg receiver having a first end (e.g., the "hinge" shown in FIG. 66, 6602) and an opposite second end, wherein the first end of the stand leg receiver couples to a leg bracket hinge (FIG. 36, 3604) of a leg bracket (FIG. 36, 3600), and the opposite second end of the stand leg receiver couples to the stand leg. In yet another embodiment, the kickstand assembly may further comprise: a bendable kickstand lever (FIG. 16, 1602) having an anchor (FIG. 58, 5804) that is coupled at one end to an elongated actuating member (FIG. 53, 5304), the bendable kickstand lever also coupled to a base member of the golf bag at an opposite end (FIG. 56, 5604) of bendable kickstand lever, wherein response to positioning the golf bag at an angle relative to the bendable kickstand lever, the bendable kickstand lever is configured to, bend thereby allowing an angled support surface of the base member to approach the bendable kickstand lever; and push on the elongated actuating member to deploy the stand leg in an outward direction away from the golf bag to support the golf bag. The length of the actuating mechanism may be parallel to a longitudinal direction of the golf bag. In other words, the longitudinal direction of the golf bag is the height of the golf bag when it is, for example, standing upright. In yet another embodiment, the kickstand assembly may further comprise: a base member pedestal (FIG. 83, 8300) having a diameter larger than a base member (or the diameter of the base member, the cuff, and the golf bag body together in combination) and of the golf bag and configured to couple to an underside portion of the base member of the golf bag and allow the golf bag to pivot at an angle within the base member pedestal, one end of an elongated actuating member (for example, FIG. 53, 5304) coupled to an anchor (FIG. 83, 8308) of the base member pedestal, wherein pivoting the golf bag at an angle relative to the anchor (FIG. 83, 8308) within the base member pedestal causes an opposite second end of the elongated actuating member to automatically deploy the stand leg in an outward direction away from the golf bag body.

In one embodiment, a kickstand assembly for a golf bag is disclosed, the kickstand assembly comprising: at least one stand leg for supporting the golf bag at an angle; and a base member pedestal that couples to a base member of the golf bag and allows the golf bag to pivot at an angle with respect to the base member pedestal, the base member pedestal having a perimeter with a diameter larger than the golf bag and an anchor positioned along the perimeter configured to couple to an actuating mechanism that automatically deploys the stand leg when the golf bag pivots at an angle with respect to the base member pedestal. In another embodiment, the actuating mechanism may comprise: a lever actuator having a first end and a second end, the first end of the lever actuator coupled to the anchor of the base member pedestal, and the second end of the lever actuator coupled to a first portion of an actuator connector; and a stand leg actuating rod having a first end and a second end, the first end of the stand leg actuating rod coupled to a second portion of the actuator connector. In another embodiment, the kickstand assembly may comprise: at least one stand leg receiver having a first end and an opposite second end, wherein the first end of the stand leg receiver couples to a leg bracket hinge of a leg bracket, and the opposite second end of the stand leg receiver couples to the stand leg. In yet another embodiment, a detachable fastening mechanism couples the second portion of the actuator connector to the first portion of the actuator connector. In yet another embodiment, one or more pins (FIG. 84, 8402) located on an underside of the base member of the golf bag pivotably couple to at least one pin receiver (FIG. 84, 8404) located on the base member pedestal. In yet another embodiment, the lever actuator, the first portion of the actuator connector, the second portion of the actuator connector, the stand leg actuating rod, the base member pedestal, and the stand leg are configured to couple substantially using snap-on fastening techniques. In yet another embodiment, the first portion of the actuator connector is configured to open about a hinge to receive the lever actuator, and the second portion of the actuator connector is configured to open about another hinge to receive the stand leg actuating rod.

According to an exemplary embodiment, a modular golf bag stand is disclosed, comprising: at least one stand leg; a first section having a lever actuator, the lever actuator having a first end and a second end; a second section having a stand leg actuating rod, the stand leg actuating rod each having a first end and a second end; and an actuator connector removeably couples the first section to the second section, and the second section is coupled to the at least one stand leg. In one embodiment, the first end of the lever actuator removeably couples to a first portion of the actuator connector, and the first end of the stand leg actuating rod couples to a second portion of the actuator connector. In another embodiment, the modular stand may further comprise: a leg bracket having at least one hinge; and at least one stand leg receiver, the stand leg receiver having a first end and a hollow second end, the first end of the stand leg receiver configured to couple to the hinge of the leg bracket and the hollow second end of the stand leg receiver configured to couple to the stand leg, wherein the second end stand leg actuating rod removeably couples to a connector portion of the stand leg receiver. In another embodiment, the second end of the lever actuator couples to an actuator device that causes the stand leg to deploy when the golf bag is tilted.

Golf Bag Kit

FIGS. 73-75 illustrate a golf bag kit 7300 and associated packaging that allows a user to assemble a golf bag using components included conveniently within the kit 7300. Referring to FIGS. 2, 8, 28, and 73-75, the golf bag kit 7300 may include, for example: the golf bag body 102 that comprises the cuff 104 and collar 108 pre-affixed to the inner bottom portion 103 and inner top portion 105 of the golf bag body 102, respectively; the base member 106; the top support 110; and the plurality of connecting poles 112. In other embodiments, the kit 7300 may further include the stand assembly 5300, which may include, for example, the bendable kickstand lever 1602, the leg bracket 3600, the stand leg receivers 4102, the one or more stand legs 5302, the first actuator 5304, the second actuator 5306, the actuator connecting piece 5308, the first pair of stand leg actuating rods 5310a, 5310b, and the second pair of stand leg actuating rods 5312a, 5312b.

FIGS. 73-75 illustrate how a golf bag kit 7300 may be packaged according to embodiments disclosed herein. FIG. 73 shows the outside of packaging which may be used to house one or more of the aforementioned components illustrated in FIGS. 1-71. In various embodiments, the packaging for the kit may be a box or clamshell configuration. In yet other embodiments, other forms of packaging that allow for efficient utilization of packaging volume and cost may be used as known in the art of packaging.

Note that because the base member 106 and the top support 110 are separate from the golf bag body 102, the golf bag body 102, including the flexible cuff 104 and flexible collar 108, may be flattened for shipping or storage purposes, thereby occupying less space. That is, even though the golf bag body 102 may have longitudinal supports, the golf bag body 102 may be flattened for purposes of storage, packaging, and/or shipping. This allows for the compact packaging and shipment of the golf bag in separate pieces. Additionally, when sold as a kit all components may be shipped to a consumer/buyer in a box in a substantially compact form and/or partially assembled (e.g., the collar and cuff are coupled to the golf bag body, but the base member, top support, and/or kickstand unassembled) for distribution or shipping.

In one example, the golf bag kit may be packaged in "clamshell" packaging. Clamshell packaging may generally refer to plastic-molded, transparent packaging in which a consumer may easily view the product therein and easily access the product therein by opening at least three sides thereof. Clamshell packaging is generally inexpensive and therefore provides the benefit of lower cost associated with the packaged product therein. However, with respect to conventional golf bags, clamshell packaging was not suitable because conventional golf bags are typically sold fully assembled, and as a result take up substantial volume. By contrast, a golf bag kit 7300 containing the modular components described in the various embodiments disclosed herein may be packaged in clamshell packaging because the golf bag is sold unassembled, in compact component parts. FIG. 74 illustrates the packaging of FIG. 73 in a closed position. FIG. 75 illustrates the packaging of FIG. 73 in an open position.

Thus, according to embodiments of the golf bag assembly disclosed herein, a golf bag kit can be packaged containing individual, compact golf bag component parts to be later assembled by a user. This substantially reduces the volume the golf bag occupies for shipping, storage, and/or packaging purposes and results in a lower cost passed on to the consumer.

Customization of a Collapsible Golf Bag Using an Online Website

The modular nature of the collapsible golf bag design disclosed in the various embodiments herein allows for several features of the golf bag assembly 100 to be readily customized based on a user's preferences. For example, in one embodiment, a website may allow users to select a desired combination of features for the golf bag body 102, the cuff 104, the base member 106, the collar 108, the top portion 110, the leg bracket 3600, the stand leg receivers 4102, and the stand assembly 5300. That is, a user may customize the golf bag by selecting, among other things, different colors, sizes, and/or styles of, including but not limited to, the golf bag body 102, the cuff 104, the base member 106, the collar 108, the top portion 110, the leg bracket 3600, the stand leg receivers 4102, and/or the stand assembly 5300.

The website may display to the consumer a catalog of the various choices available for each component that is customizable, including which components are in stock and those that may have to be specially ordered. Once the consumer (e.g., user, purchaser, ordering party, etc.) has selected the desired components, a customized golf bag kit 7300 may be put together that comprises the unassembled golf bag components selected by the consumer. The golf bag kit 7300 may then be shipped to the consumer where the consumer completes final assembly of the golf bag by substantially utilizing "snap on" fasteners that do not require the use of tools, such as screw drivers, hammers, etc. In other words, final assembly of the golf bag from the kit should be made as easy as possible for the consumer. To this end, the golf bag may be constructed from modular components (as illustrated in various of the FIGS. 1-85) which may be partially assembled (e.g., golf bag body fixedly coupled to the collar and cuff) in a first stage, and fully assembled manually and without tools in a final stage (e.g., where the base member, top support, poles, and/or kickstand are added).

For example, once a consumer receives the golf bag kit 7300, he/she may manually (and without tools) attaches the base member 106, the top support 110, the connecting poles 112, the leg bracket 3600, the stand leg receivers 4102, and the stand assembly 5300 to the golf bag body 102, thereby forming a structurally strong golf bag. Also, because this final stage of assembly of the golf bag is done by the consumer and not by the manufacturer, the manufacturer may save in manufacturing time/costs for the golf bag as well as shipping costs (due to shipment of the golf bag components in a small box).

Among the features that the website may allow a consumer to customize a golf bag, include, but are not limited to: the color, size, style, and number of dividing sections of the top portion 110; the color, size, style, and accessory compartments, such as a rain hood, of the golf bag body 102; the color, size, style, and number of the stand legs 5302, the leg bracket 3600, and stand leg receivers 4102 of the stand assembly 5300, assuming a stand assembly 5300 is desired; the color, size, and style of the base member 106; the color of the cuff 104 and collar 108; and the color, size, and style of any embroidery on the golf bag body 102, including lettering and logos. The website may prompt the consumer of the various selections available for each feature that may be customized during a purchase order process. Alternatively, or in addition, the website may display all the various options available for the various customizable features before any purchase order is initiated.

Figure 76:
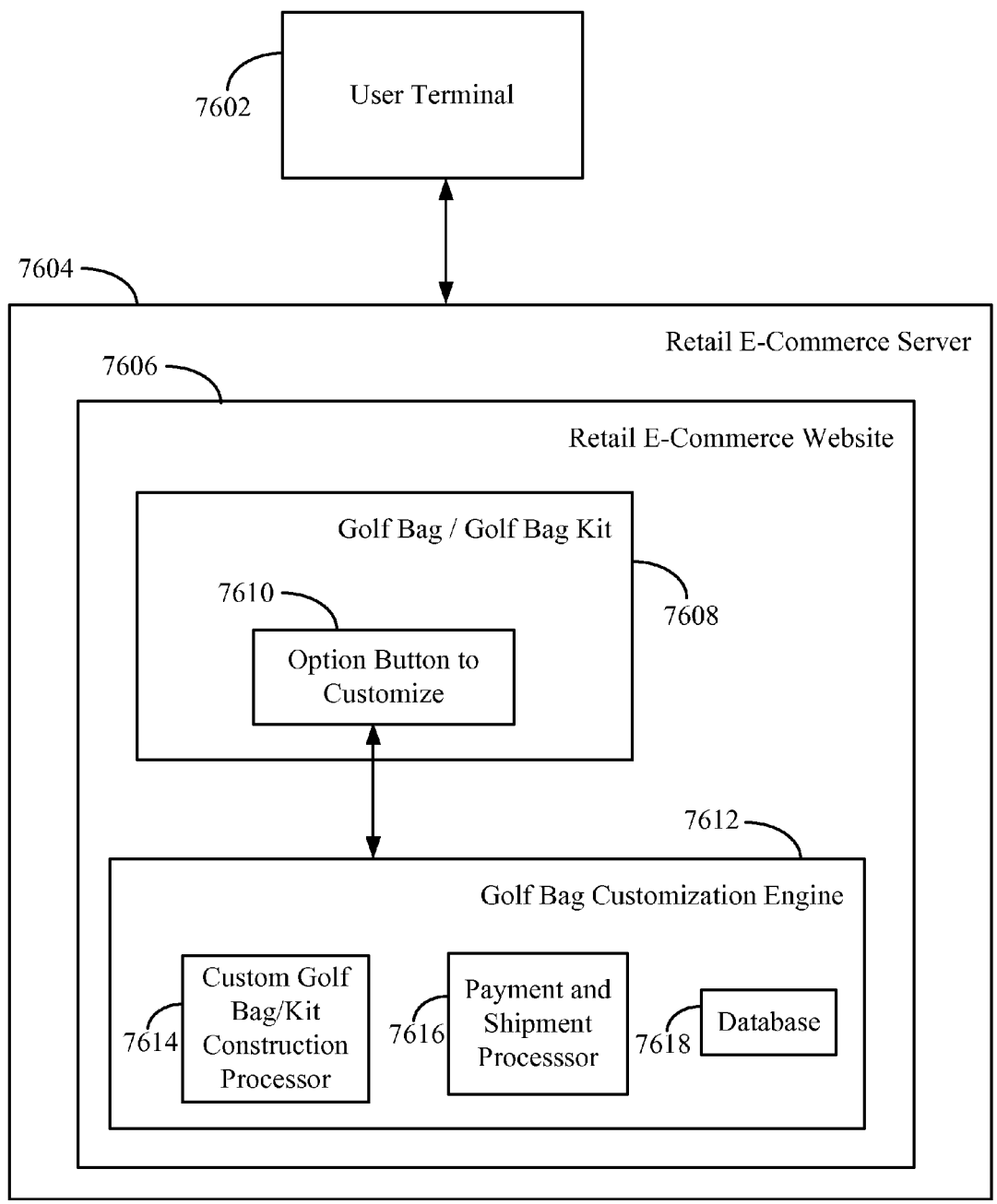
FIGS. 76 and 78 illustrate functional block diagrams of a website allowing customization of a golf bag.

FIG. 76 illustrates a functional block diagram of a system for ordering custom golf bags 100 and/or golf bag kits 7300 through a website. In one embodiment, an online retail e-commerce website 7606 sells, among other products, a customizable golf bag/kit 7608. The retail e-commerce website 7606 may be hosted by a retail e-commerce server 7604 that allows a third party user terminal 7602 to access the contents of the retail e-commerce website 7606. The website 7606 features an option button 7610 that allows the user 7602 to customize any of the aforementioned features and components of the golf bag/kit 7608. Selection of the option button 7610 executes a golf bag customization engine 7612 that is responsible for customizing the golf bag/kit 7608 item according to the user's 7602 specifications. In this context, the golf bag/kit 7608 means that the user 7602 may purchase either a fully assembled golf bag customized to the user's specifications, or the user 7602 may purchase a golf bag kit that includes custom components according to the user's specifications. If the user 7602 purchases the custom golf bag kit, the user 7602 completes final assembly of the golf bag.

In one embodiment, the golf bag customization engine 7612 may comprise a custom golf bag/kit construction processor 7614, a payment and shipment processor 7616, and a database 7618. The custom golf bag/kit construction processor 7614 may prompt the user 7602 with various choices and options for features of the golf bag or golf bag kit that are customizable. For example, the custom golf bag/kit construction processor 7614 may walk the user 7602 through a series of menu options regarding what color golf bag body 102, the number of dividing sections the top support 110, etc. the user desires to construct the assembled golf bag or the unassembled golf bag kit. The payment and shipment processor 7616 acquires payment information from the user 7602 and shipping information from the user 7602. The golf bag customization engine 7612 may also maintain a database 7618 that stores and keeps track of all the various sizes, styles, colors, etc. that are in stock or available by special order for the customizable features. Thus, the customization engine 7612 can notify the user whether a particular desired custom feature is or is not available. In one embodiment, the golf bag customization engine 7612 may be resident to the website 7606 and/or the server 7604 hosting the website 7606.

Figure 77:
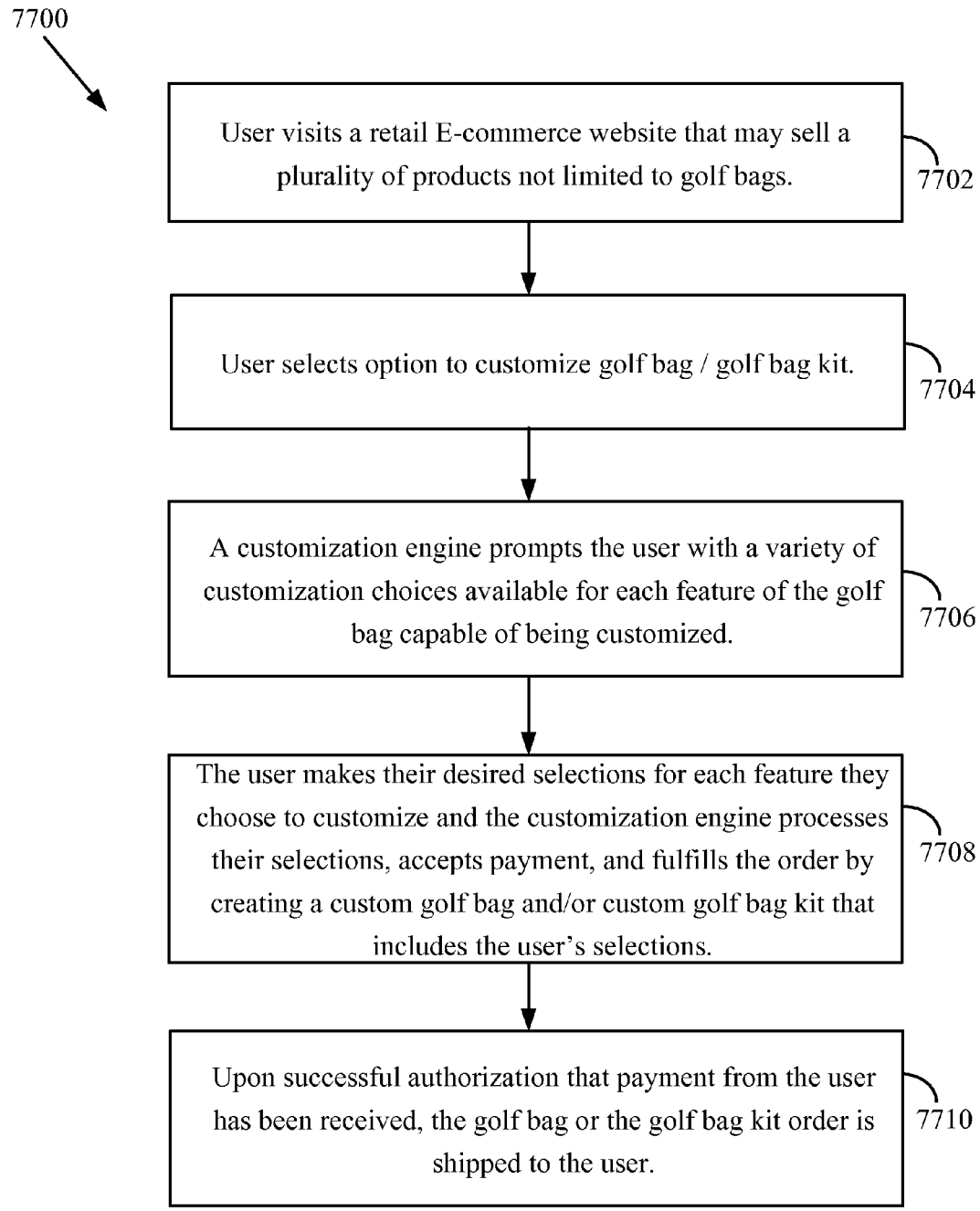
FIG. 77 and FIGS. 79A and 79B illustrate flow charts of methods for customizing a collapsible golf bag and/or collapsible golf bag kit.

FIG. 77 illustrates a flow chart of one embodiment of a method 7700 for customizing a golf bag 100 and/or a golf bag kit 7300. At step 7702, a user visits a retail e-commerce website that may sell a plurality of products not limited to golf bags. At step 7704, the user selects to customize one or more golf bags 100 and/or golf bag kits 7300 displayed on the retail e-commerce website by choosing the customization option button.

At step 7706, the customization engine prompts the user with a variety of customization choices available for each feature of the collapsible golf bag capable of being customized. At step 7708, the user makes their desired selection for each feature they choose to customize and the customization engine processes their selections, accepts payment, and fulfills the order by creating a custom golf bag 100 and/or custom golf bag kit 7300 that includes the user's selections. At step 7710, upon successful authorization that payment from the user has been received, the custom golf bag 100 and/or the custom golf bag kit 7300 is shipped to the user.

Figure 78:
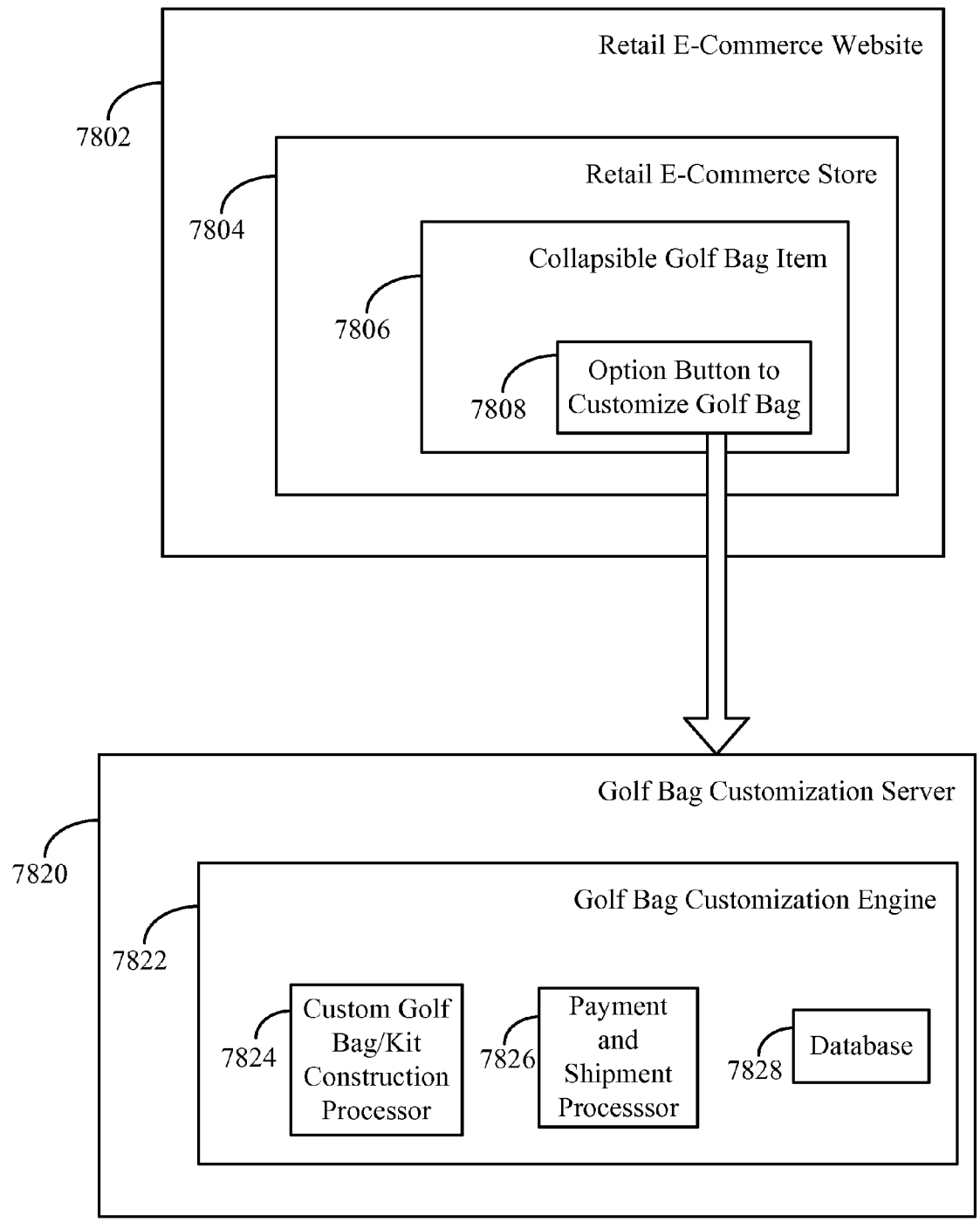

FIG. 78 illustrates a functional block diagram of another embodiment of a system for ordering custom golf bags 100 and/or golf bag kits 7300 through a website. In this embodiment, the golf bag customization engine 7822 that processes golf bag and golf bag kit customization is independent from the retail e-commerce website 7802 that offers the golf bags 100 and/or golf bag kits 7300 for sale. For example, in one embodiment a retail e-commerce website 7802 may host a retail e-commerce store 7804 that may offer a multitude of services and products for sale. Among other things, the retail e-commerce store 7804 may also offer for sale a golf bag 100 and/or a golf bag kit 7300 as described in the various embodiments disclosed herein. The retail e-commerce store 7804 may allow the user to execute an option button 7808 to customize the collapsible golf bag 100.

Rather than carrying out the customization processes and inventory checks (e.g., verifying what colors, styles, etc. of the various components are in stock) directly through the retail e-commerce website 7802 and/or its associated servers, the customization request can be forwarded to a golf bag customization server 7820. In one embodiment, the customization server 7820 is independent from the server hosting the retail e-commerce website 7802. The golf bag customization server 7820 hosts a golf bag customization engine 7822 that includes, among other things, a custom golf bag/kit construction processor 7824, and a payment and shipment processor 7826. For example, the custom golf bag/kit construction processor 7824 may prompt the user of the various selections available for each component of the collapsible golf bag 100, such as the customizable features discussed above, and constructs a golf bag 100 and/or golf bag kit 7300 accordingly (assuming proper payment is received by the payment and shipment processor 7826). The payment and shipment processor 7826 handles payment processing and user information to facilitate shipment of the constructed customized golf bag 100 and/or kit 7300.

The golf bag customization engine 7822 may also maintain a database 7828 that stores and keeps track of all the various sizes, styles, colors, etc. that are in stock or available by special order for the customizable features of the collapsible golf bag 100. Thus, the customization engine 7822 can notify the user whether a particular desired custom feature is or is not available. In other embodiments one server may host both the retail e-commerce website 7802 and the customization engine 7822. In yet other embodiment, the user may elect to receive a fully constructed golf bag based on the custom features selected instead of kit 7300 or unassembled components of the collapsible golf bag 100.

Figure 79A:
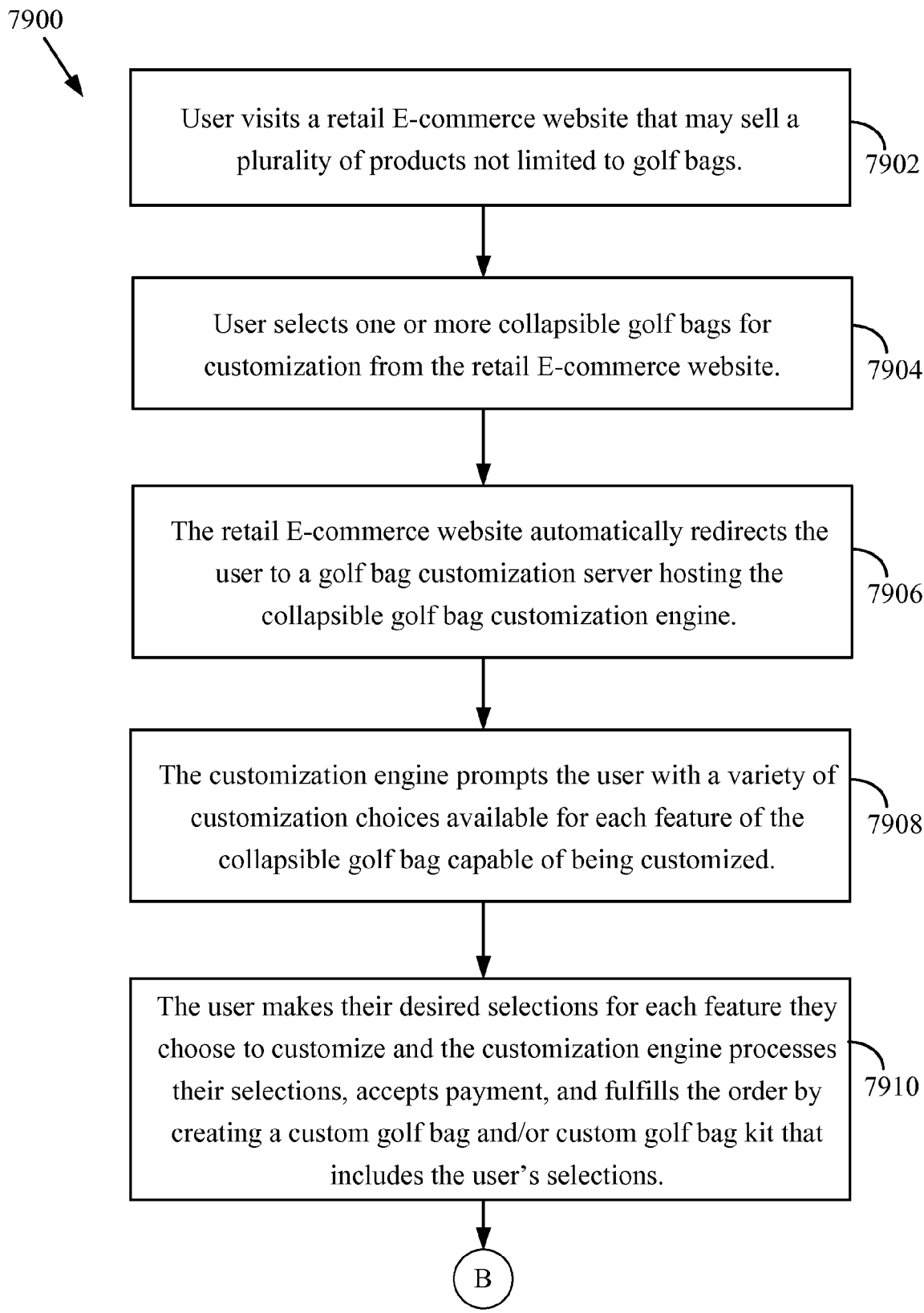
Figure 79B:
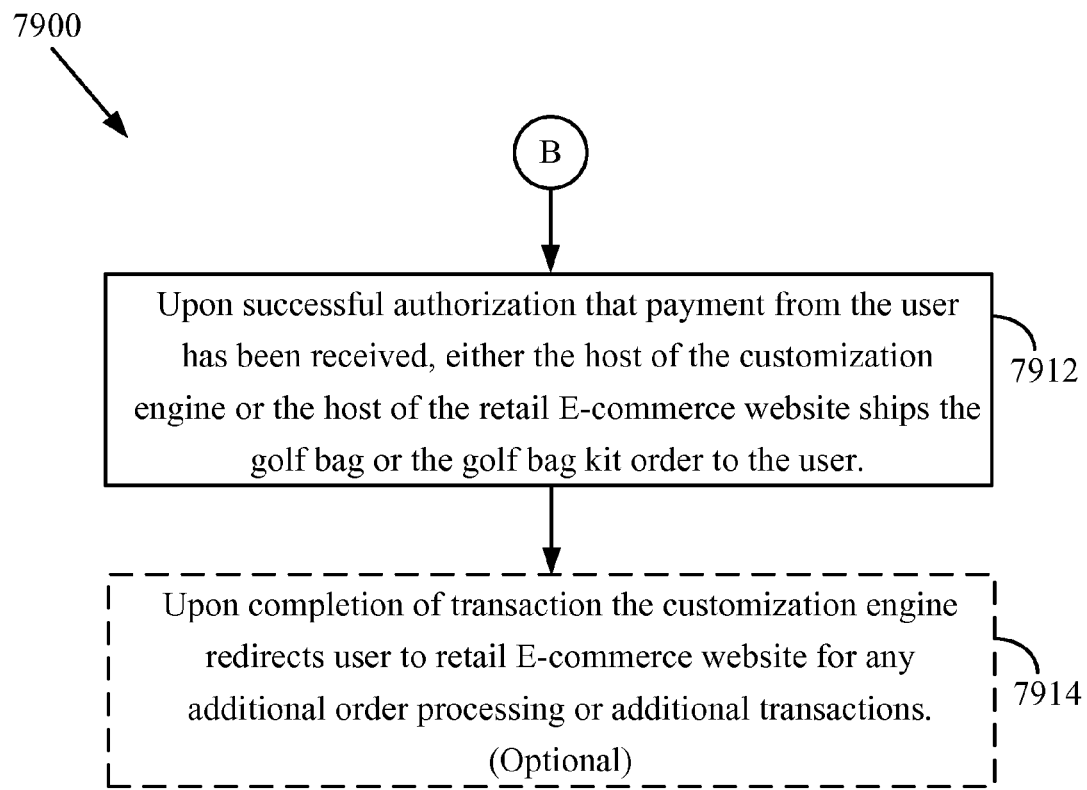

FIGS. 79A and 79B illustrate a flow chart of one embodiment of a method 7900 for customizing a collapsible golf bag 100 and/or collapsible golf bag kit 7300. At step 7902, a user visits a retail e-commerce website 7802 that may sell a plurality of products not limited to golf bags on its retail e-commerce store 7804. At step 7904, the user selects to customize one or more collapsible golf bags 7806 displayed on the retail e-commerce store 7804 by choosing the customization option button 7808.

At step 7906, the retail e-commerce website 7802 automatically redirects the user to a golf bag customization server 7820 hosting the collapsible golf bag customization engine 7822. At step 7908, the customization engine 7822 prompts the user with a variety of customization choices available for each feature of the collapsible golf bag capable of being customized. At step 7910, the user makes their desired selection for each feature they choose to customize and the customization engine 7822 processes their selections, accepts payment, and fulfills the order by creating a custom golf bag and/or custom golf bag kit that includes the user's selections. The custom golf bag engine 7822 may be assisted by a custom golf bag/kit construction processor 7824, payment and shipment processor 7826, and a database 7828. At step 7912, upon successful authorization that payment from the user has been received, either the host of the customization engine 7822 or the host of the retail e-commerce website 7802 may ship the custom golf bag or the golf bag kit ordered to the user. At optional step 7914, upon completion of transaction the customization engine 7822 may redirect the user back to the retail e-commerce website 7802 for any additional order processing or additional transactions they may choose to make.

One advantage of the modular golf bag assembly is that it permits providing customized golf bags to a consumer or group of consumers at a relatively low cost since very little or no additional labor is needed at the manufacturer/retailer to customize and fulfill an order for a customized golf bag. Additionally, this also allows the manufacturer/retailer to deploy golf bags with limited-edition colors or components. For instance, golf bags may be readily assembled in the colors of a consumer's favorite sport team. Additionally, special event golf bags may also be customized by placing logos or coloring of the base member pedestal 8300 (FIG. 83) to include the company logo. Because the base member pedestal 8300 is a modular component that can be manually coupled to the base member 106 of the golf bag assembly, this base member pedestal 8300 can be customized in limited numbers, this allows a low-cost way to provide customized golf bags.

In one embodiment, a method effectuated over an online ordering system for customized golf bags, comprising: prompting a consumer with one or more options for one or more components of the golf bag that are customizable through an online website; receiving selections made by the consumer for the one or more options for the one or more components through the online website; packaging the selected one or more components of the golf bag as a kit; and distributing the consumer to the consumer for final assembly of the golf bag. In one embodiment, a final assembly of the golf bag by the consumer is substantially completed using manual and tool-less techniques. In another embodiment, the one or more options for the one or more components comprises at least one of: a color of a golf bag body, a color of a cuff, a color of a collar, a color of a top portion. In another embodiment, the one or more options for the one or more components comprises inclusion of a golf bag stand within the kit. In another embodiment, the one or more options for the one or more components comprises the number of dividing section of a top support portion of the golf bag. In another embodiment, the one or more options for the one or more components comprises embroidery of a name or logo on a golf bag body. The method may further comprise: receiving payment and shipping information from the consumer; and accessing inventory status information from a database. In another embodiment, the method further comprises: accessing a golf bag customization engine stored on a golf bag customization server that is independent to a server hosting the online website. In another embodiment, the golf bag of the method comprises: a collapsible golf bag body having a top portion and a bottom portion; a collar fixedly coupled along an inner surface of the top portion of the golf bag body, the collar having a plurality of pole receiving collar ends; a base member adapted to removeably couple to the bottom portion of the golf bag body, the base member having a plurality of pole receiving base ends; and a plurality of connecting poles that extend between the plurality of pole receiving base ends of the base member and the plurality of pole receiving collar ends of the collar, the connecting poles providing an extension force in an outward direction between the collar and the base member to provide structural rigidity to the golf bag body.

In an exemplary embodiment, an apparatus for customizing a golf bag is disclosed, comprising: means for prompting the consumer with one or more options for one or more components of the golf bag that are customizable through an online website; means for receiving selections made by the consumer for the one or more options for the one or more components through the online website; means for packaging the selected one or more components of the golf bag as a kit; and; and means for distributing the kit to the consumer for final assembly of the golf bag. In one embodiment, a final assembly of the golf bag by the consumer is substantially completed using manual and tool-less techniques. In one embodiment, the one or more options for the one or more components comprises at least one of: a color of a golf bag body, a color of a cuff, a color of a collar, a color of a top portion. In one embodiment, the one or more options for the one or more components comprises inclusion of a golf bag stand within the kit. In one embodiment, the one or more options for the one or more components comprises the number of dividing section of a top portion. In one embodiment, the apparatus may further comprise: means for receiving payment and shipping information from the consumer; and means for accessing inventory status information from a database. The apparatus may further comprise: a golf bag body having a top opening and a bottom opening; a collar coupled along an inner surface of the golf bag body adjacent to the top opening, the collar having a plurality of pole receiving collar ends; a cuff coupled along an inner surface of the golf bag body adjacent to the bottom opening; a base member having a plurality of pole receiving base ends, the base member removeably coupled to the cuff; a top support removeably coupled to the collar; and a plurality of connecting poles that extend between the plurality of pole receiving base ends of the base member and the plurality of pole receiving collar ends of the collar thereby retaining the base member against the cuff and providing structural support to the golf bag body.

In one embodiment, a retail e-commerce server adapted to allow a consumer to order a golf bag kit is disclosed, comprising: a retail e-commerce website featuring the golf bag kit available for customization; an option button configured to initiate customization of the golf bag kit; and a golf bag customization engine configured to customize the golf bag kit according to consumer-selected modular components of a golf bag. In one embodiment, the golf bag customization engine comprises a custom golf bag kit construction processor configured to: prompt the consumer with one or more options for one or more modular components of the golf bag kit that are customizable; receive selections made by the consumer for the one or more options for the one or more modular components through the online website; and package the one or more components of the golf bag kit based on the selections received. In one embodiment, the golf bag customization engine further comprises a payment and shipment processor configured to: receive payment and shipping information from the consumer; and distribute the kit to the consumer for final assembly of the golf bag. In one embodiment, the golf bag comprises: a golf bag body having a top opening and a bottom opening; a collar coupled along an inner surface of the golf bag body adjacent to the top opening, the collar having a plurality of pole receiving collar ends; a cuff coupled along an inner surface of the golf bag body adjacent to the bottom opening; a base member having a plurality of pole receiving base ends, the base member removeably coupled to the cuff; a top support removeably coupled to the collar; and a plurality of connecting poles that extend between the plurality of pole receiving base ends of the base member and the plurality of pole receiving collar ends of the collar thereby retaining the base member against the cuff and providing structural support to the golf bag body.

Those of skill would further appreciate that the various illustrative logical blocks, modules, circuits, and algorithm steps described in connection with the embodiments disclosed herein, for example the online golf bag/kit customization website, may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments disclosed herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

While certain exemplary embodiments have been described and shown in the accompanying drawings, it is to be understood that such embodiments are merely illustrative of and not restrictive on the broad invention, and that this invention is not to be limited to the specific constructions and arrangements shown and described, since various other modifications may occur to those ordinarily skilled in the art.

What is claimed is:

1. A method operational at a server for ordering and customizing a golf bag, the method comprising:
   providing a user with a plurality of options for at least one customizable component of a plurality of components of the golf bag;
   receiving from the user an option selection from the plurality of options provided;
   processing instructions at the server to customize the golf bag according to the option selection; and
   processing additional instructions at the server to assemble a golf bag kit, the golf bag kit including the plurality of components of the golf bag, the plurality of components packaged together for sale in an unassembled state ready for a final assembly into the golf bag by the user, wherein the plurality of components of the golf bag includes
   a collapsible golf bag body having a top portion and a bottom portion, the top portion of the golf bag body having a plurality of pole receiving top ends, and the bottom portion of the golf bag body having a plurality of pole receiving bottom ends, and
   a plurality of connecting poles, wherein each of the plurality of connecting poles has a first end and a second end, the first end adapted to removeably couple to one of the plurality of pole receiving top ends, and the second end adapted to removeably couple to one of the plurality of pole receiving bottom ends, the plurality of connecting poles adapted to provide an extension force in an outward direction between the top portion of the golf bag body and the bottom portion of the golf bag body to provide structural rigidity to the golf bag body.

2. The method of claim 1, wherein the plurality of options for the customizable component includes at least one of: a color of the golf bag body, a size of the golf bag body, a style of the golf bag body, and an embroidery on the golf bag body.

3. The method of claim 1, wherein the plurality of components of the golf bag further includes a top support configured to couple to the top portion of the golf bag body, and the method further comprises promting the user to select a number of dividing sections of the top support.

4. The method of claim 1, further comprising:
   accessing a database to check option availability of the customizable component before providing the user with the plurality of options.

5. The method of claim 1, wherein the plurality of components further includes:
   a collar fixedly coupled along an inner surface of the top portion of the golf bag body, the collar having the plurality of pole receiving top ends; and
   a base member adapted to removeably couple to the bottom portion of the golf bag body, the base member having the plurality of pole receiving bottom ends.

6. The method of claim 1, wherein the providing the user with the plurality of options for the at least one customizable component is performed via a website hosted by the server, and the receiving the option selection from the user is performed via the website.

7. The method of claim 1, wherein the final assembly into the golf bag is configured to be substantially completed using snap on fasteners.

8. A server for ordering and customizing a golf bag, the server comprising:
   a memory configured to store data associated with the golf bag; and
   a processor coupled to the memory and configured to
      provide a user with a plurality of options for at least one customizable component of a plurality of components of the golf bag,
      receive from the user an option selection from the plurality of options provided,
      process instructions to customize the golf bag according to the option selection, and
      process additional instructions at the server to assemble a golf bag kit, the golf bag kit including the plurality of components of the golf bag, the plurality of components packaged together for sale in an unassembled state ready for a final assembly into the golf bag by the user, wherein the plurality of components of the golf bag includes
   a collapsible golf bag body having a top portion and a bottom portion, the top portion of the golf bag body having a plurality of pole receiving top ends, and the bottom portion of the golf bag body having a plurality of pole receiving bottom ends, and
   a plurality of connecting poles, wherein each of the plurality of connecting poles has a first end and a second end, the first end adapted to removeably couple to one of the plurality of pole receiving top ends, and the second end adapted to removeably couple to one of the plurality of pole receiving bottom ends, the plurality of connecting poles adapted to provide an extension force in an outward direction between the top portion of the golf bag body and the bottom portion of the golf bag body to provide structural rigidity to the golf bag body.

9. The server of claim 8, wherein the plurality of options for the customizable component includes at least one of: a color of the golf bag body, a size of the golf bag body, a style of the golf bag body, and an embroidery on the golf bag body.

10. The server of claim 8, further comprising a payment and shipment processor communicatively coupled to the golf bag customization processor, the payment and shipment processor configured to:
    receive payment and shipping information from the user; and
    facilitate distribution of the golf bag to the user.

11. The server of claim 8, wherein the plurality of components further includes:
    a collar coupled along an inner surface of the top portion of the golf bag body, the collar having the plurality of pole receiving top ends; and
    a base member adapted to removeably couple to the bottom portion of the golf bag body, the base member having the plurality of pole receiving bottom ends.

12. The server of claim 8, wherein the processor provides the user with the plurality of options via a website hosted by the server, and the processor receives the option selection from the user via the website.

13. A non-transitory processor-readable medium having one or more instructions for ordering and customizing a golf bag kit, the instructions which when executed by at least one processor causes the processor to:
    provide a user with a plurality of options for at least one customizable component of a plurality of components of the golf bag kit;
    receive from the user an option selection from the plurality of options provided; and
    execute commands at the processor to customize the golf bag kit according to the option selection, and packaging the plurality of components together for sale in an unassembled state ready for a final assembly into a golf bag by the user, wherein the plurality of components includes
    a collapsible golf bag body having a top portion and a bottom portion, the top portion of the golf bag body having a plurality of pole receiving top ends, and the bottom portion of the golf bag body having a plurality of pole receiving bottom ends, and
    a plurality of connecting poles, wherein each of the plurality of connecting poles has a first end and a second end, the first end adapted to removeably couple to one of the plurality of pole receiving top ends, and the second end adapted to removeably couple to one of the plurality of pole receiving bottom ends, the plurality of connecting poles adapted to provide an extension force in an outward direction between the top portion of the golf bag body and the bottom portion of the golf bag body to provide structural rigidity to the golf bag body.

14. The non-transitory processor-readable medium of claim 13, wherein the final assembly into the golf bag is configured to be substantially completed using snap on fasteners.

15. The non-transitory processor-readable medium of claim 13, wherein providing the user with the plurality of options for the at least one customizable component is performed via a website, and receiving the option selection from the user is performed via the website.

16. The non-transitory processor-readable medium of claim 13, wherein the plurality of options for the customizable component includes at least one of: a color of the golf bag body, a size of the golf bag body, and a style of the golf bag body.

17. The non-transitory processor-readable medium of claim 13, wherein the plurality of components further includes:
    a collar fixedly coupled along an inner surface of the top portion of the golf bag body, the collar having the plurality of pole receiving top ends; and
    a base member adapted to removeably couple to the bottom portion of the golf bag body, the base member having the plurality of pole receiving bottom ends.

18. The non-transitory processor-readable medium of claim 17, wherein the golf bag body and the collar are adapted to be substantially flattened for shipping.

\* \* \* \* \*